US012804514B2

(12) United States Patent
Cohn et al.

(10) Patent No.: US 12,804,514 B2
(45) Date of Patent: Nov. 17, 2026

(54) ACTIVATION OF A HOME AUTOMATION CONTROLLER

(71) Applicant: iControl Networks, Inc., Philadelphia, PA (US)

(72) Inventors: Alan Wade Cohn, Austin, TX (US); Gary Robert Faulkner, Liberty Hill, TX (US); James Edward Kitchen, Round Rock, TX (US); David Leon Proft, Austin, TX (US); Corey Wayne Quain, Lago Vista, TX (US)

(73) Assignee: iControl Networks, Inc., Philadelphia, PA (US)

(*) Notice: Subject to any disclaimer, the term of this patent is extended or adjusted under 35 U.S.C. 154(b) by 0 days.

(21) Appl. No.: 18/630,397

(22) Filed: Apr. 9, 2024

(65) Prior Publication Data

US 2024/0349169 A1 Oct. 17, 2024

Related U.S. Application Data

(63) Continuation of application No. 16/150,973, filed on Oct. 3, 2018, now Pat. No. 11,997,584, which is a (Continued)

(51) Int. Cl.
*H04W 40/28* (2009.01)
*G06F 11/07* (2006.01)
(Continued)

(52) U.S. Cl.
CPC ......... *H04W 40/28* (2013.01); *G06F 11/0736* (2013.01); *G06F 11/0757* (2013.01); (Continued)

(58) Field of Classification Search
CPC ..... H04W 40/28; H04W 40/34; H04W 76/50; G06F 11/0736; G06F 11/0757; (Continued)

(56) References Cited

U.S. PATENT DOCUMENTS 686,838 A 11/1901 Appel
1,738,540 A 12/1929 Replogle et al.
(Continued)

FOREIGN PATENT DOCUMENTS

AU 2005223267 B2 12/2010
AU 2010297957 A1 5/2012
(Continued)

OTHER PUBLICATIONS

Valtchev, D., and I. Frankov. "Service gateway architecture for a smart home." Communications Magazine, IEEE 40.4 (2002): 126-132.

(Continued)

*Primary Examiner* — Daryl C Pope
(74) *Attorney, Agent, or Firm* — BakerHostetler

(57) ABSTRACT

Embodiments of the present invention provide a single platform that provides controller functionality for each of security, monitoring and automation, as well as providing a capacity to function as a bidirectional internet gateway. Embodiments of the present invention provide such functionality by virtue of a configurable architecture that enables a user to adapt the system for the user's specific needs. Embodiments of the present invention further provide for a software-based installation workflow to activate and provision the controller and associated sensors and network. Embodiments of the present invention also provide for downloading of previously-stored configuration data to the controller from a remote server, and for activation and provisioning of the controller from the previously-stored configuration data.

20 Claims, 24 Drawing Sheets

Related U.S. Application Data continuation of application No. 14/810,667, filed on Jul. 28, 2015, now Pat. No. 10,237,806, which is a continuation of application No. 12/770,365, filed on Apr. 29, 2010, now Pat. No. 9,100,446.

(60) Provisional application No. 61/174,366, filed on Apr. 30, 2009.

(51) Int. Cl.

| | |
|---|---|
| ***G08B 3/10*** | (2006.01) |
| ***G08B 13/00*** | (2006.01) |
| ***G08B 19/00*** | (2006.01) |
| ***G08B 25/00*** | (2006.01) |
| ***G08B 25/08*** | (2006.01) |
| ***G08B 25/10*** | (2006.01) |
| ***G08B 25/14*** | (2006.01) |
| ***G08B 29/02*** | (2006.01) |
| ***G08B 29/08*** | (2006.01) |
| ***G08B 29/16*** | (2006.01) |
| ***H04L 12/28*** | (2006.01) |
| ***H04L 67/025*** | (2022.01) |
| ***H04L 67/12*** | (2022.01) |
| ***H04L 67/125*** | (2022.01) |
| ***H04L 69/00*** | (2022.01) |
| ***H04W 40/34*** | (2009.01) |
| ***H04W 76/50*** | (2018.01) |

(52) U.S. Cl.

CPC ............... *G08B 3/10* (2013.01); *G08B 13/00* (2013.01); *G08B 19/005* (2013.01); *G08B 25/001* (2013.01); *G08B 25/004* (2013.01); *G08B 25/008* (2013.01); *G08B 25/08* (2013.01); *G08B 25/10* (2013.01); *G08B 25/14* (2013.01); *G08B 29/02* (2013.01); *G08B 29/08* (2013.01); *H04L 12/2807* (2013.01); *H04L 12/2809* (2013.01); *H04L 12/2816* (2013.01); *H04L 12/2818* (2013.01); *H04L 12/2825* (2013.01); *H04L 12/2827* (2013.01); *H04L 12/2832* (2013.01); *H04L 12/2834* (2013.01); *H04L 67/125* (2013.01); *H04L 69/26* (2013.01); *H04W 40/34* (2013.01); *H04W 76/50* (2018.02); *G05B 2219/2642* (2013.01); *G08B 29/16* (2013.01); *H04L 12/2803* (2013.01); *H04L 67/025* (2013.01); *H04L 67/12* (2013.01)

(58) Field of Classification Search

CPC ........ G08B 3/10; G08B 13/00; G08B 19/005; G08B 25/001; G08B 25/004; G08B 25/008; G08B 25/08; G08B 25/10; G08B 25/14; G08B 29/02; G08B 29/08; G08B 29/16; H04L 12/2807; H04L 12/2809; H04L 12/2816; H04L 12/2818; H04L 12/2825; H04L 12/2827; H04L 12/2832; H04L 12/2834; H04L 67/125; H04L 69/26; H04L 12/2803; H04L 67/025; H04L 67/12; G05B 2219/2642

See application file for complete search history.

(56) References Cited

U.S. PATENT DOCUMENTS 3,803,576 A 4/1974 Dobrzanski et al.
3,852,541 A 12/1974 Altenberger
4,006,460 A 2/1977 Hewitt et al.
4,141,006 A 2/1979 Braxton
4,206,449 A 6/1980 Apsell et al.
4,257,038 A 3/1981 Rounds et al.
4,286,331 A 8/1981 Anderson et al.
4,304,970 A 12/1981 Fahey et al.
4,351,023 A 9/1982 Richer
4,363,031 A 12/1982 Reinowitz
4,459,582 A 7/1984 Sheahan et al.
4,465,904 A 8/1984 Gottsegen et al.
4,520,503 A 5/1985 Kirst et al.
4,559,526 A 12/1985 Tani et al.
4,559,527 A 12/1985 Kirby
4,567,557 A 1/1986 Burns
4,574,305 A 3/1986 Campbell et al.
4,581,606 A 4/1986 Mallory
4,591,834 A 5/1986 Kyle
D284,084 S 6/1986 Ferrara, Jr.
4,641,127 A 2/1987 Hogan et al.
4,652,859 A 3/1987 Van Wienen
4,670,739 A 6/1987 Kelly, Jr.
4,683,460 A 7/1987 Nakatsugawa
4,694,282 A 9/1987 Tamura et al.
4,716,973 A 1/1988 Cobern
4,730,184 A 3/1988 Bach
4,754,261 A 6/1988 Marino
4,755,792 A 7/1988 Pezzolo et al.
4,779,007 A 10/1988 Schlanger et al.
4,785,289 A 11/1988 Chen
4,801,924 A 1/1989 Burgmann et al.
4,812,820 A 3/1989 Chatwin
4,818,970 A 4/1989 Natale et al.
4,833,339 A 5/1989 Luchaco et al.
4,833,449 A 5/1989 Gaffigan
4,855,713 A 8/1989 Brunius
4,860,185 A 8/1989 Brewer et al.
4,887,064 A 12/1989 Drori et al.
4,897,630 A 1/1990 Nykerk
4,918,623 A 4/1990 Lockitt et al.
4,918,717 A 4/1990 Bissonnette et al.
4,951,029 A 8/1990 Severson
4,959,713 A 9/1990 Morotomi et al.
4,962,473 A 10/1990 Crain
4,980,666 A 12/1990 Hwang
4,993,059 A 2/1991 Smith et al.
4,994,787 A 2/1991 Kratt et al.
4,996,646 A 2/1991 Farrington
5,023,901 A 6/1991 Sloan et al.
5,061,916 A 10/1991 French et al.
5,083,106 A 1/1992 Kostusiak et al.
5,086,385 A 2/1992 Launey et al.
5,091,780 A 2/1992 Pomerleau
5,109,278 A 4/1992 Erickson et al.
5,132,968 A 7/1992 Cephus
5,134,644 A 7/1992 Garton et al.
5,159,315 A 10/1992 Schultz et al.
5,160,879 A 11/1992 Tortola et al.
5,164,703 A 11/1992 Rickman
5,164,979 A 11/1992 Choi
D337,569 S 7/1993 Kando
5,227,776 A 7/1993 Starefoss
5,237,305 A 8/1993 Ishikuro et al.
5,245,694 A 9/1993 Zwern
5,247,232 A 9/1993 Lin
5,280,527 A 1/1994 Gullman et al.
5,283,816 A 2/1994 Gomez Diaz
5,299,971 A 4/1994 Hart
5,319,394 A 6/1994 Dukek
5,319,698 A 6/1994 Glidewell et al.
5,334,974 A 8/1994 Simms et al.
5,400,011 A 3/1995 Sutton
5,400,246 A 3/1995 Wilson et al.
5,406,260 A 4/1995 Cummings et al.
5,410,343 A 4/1995 Coddington et al.
5,412,708 A 5/1995 Katz
5,414,409 A 5/1995 Voosen et al.
5,414,833 A 5/1995 Hershey et al.
5,428,293 A 6/1995 Sinclair et al.
5,438,607 A 8/1995 Przygoda et al.
5,446,445 A 8/1995 Bloomfield et al.
5,448,290 A 9/1995 Vanzeeland
5,452,344 A 9/1995 Larson

(56) References Cited

U.S. PATENT DOCUMENTS

| | | | |
|---|---|---|---|
| 5,465,081 | A | 11/1995 | Todd |
| 5,471,194 | A | 11/1995 | Guscott |
| 5,481,312 | A | 1/1996 | Cash et al. |
| 5,483,224 | A | 1/1996 | Rankin et al. |
| 5,486,812 | A | 1/1996 | Todd |
| 5,499,014 | A | 3/1996 | Greenwaldt |
| 5,499,196 | A | 3/1996 | Pacheco |
| 5,510,975 | A | 4/1996 | Ziegler, Jr. |
| 5,519,878 | A | 5/1996 | Dolin, Jr. |
| RE35,268 | E | 6/1996 | Frolov et al. |
| 5,525,966 | A | 6/1996 | Parish |
| 5,526,428 | A | 6/1996 | Arnold |
| 5,534,845 | A | 7/1996 | Issa et al. |
| 5,541,585 | A | 7/1996 | Duhame et al. |
| 5,543,778 | A | 8/1996 | Stouffer |
| 5,546,072 | A | 8/1996 | Creuseremee et al. |
| 5,546,074 | A | 8/1996 | Bernal et al. |
| 5,546,447 | A | 8/1996 | Skarbo et al. |
| 5,548,646 | A | 8/1996 | Aziz et al. |
| 5,550,984 | A | 8/1996 | Gelb |
| 5,557,254 | A | 9/1996 | Johnson et al. |
| 5,565,843 | A | 10/1996 | Meyvis |
| 5,570,079 | A | 10/1996 | Dockery |
| 5,572,438 | A | 11/1996 | Ehlers et al. |
| 5,578,989 | A | 11/1996 | Pedtke |
| 5,579,197 | A | 11/1996 | Mengelt et al. |
| 5,579,221 | A | 11/1996 | Mun |
| D377,034 | S | 12/1996 | Matsushita |
| 5,586,254 | A | 12/1996 | Kondo et al. |
| 5,587,705 | A | 12/1996 | Morris |
| 5,598,086 | A | 1/1997 | Somerville |
| 5,602,918 | A | 2/1997 | Chen et al. |
| 5,604,493 | A | 2/1997 | Behlke |
| 5,606,615 | A | 2/1997 | Lapointe et al. |
| 5,621,662 | A | 4/1997 | Humphries et al. |
| 5,623,601 | A | 4/1997 | Vu |
| 5,625,338 | A | 4/1997 | Pildner et al. |
| 5,625,410 | A | 4/1997 | Washino et al. |
| 5,629,687 | A | 5/1997 | Sutton et al. |
| 5,630,216 | A | 5/1997 | McEwan |
| 5,631,630 | A | 5/1997 | McSweeney |
| 5,638,046 | A | 6/1997 | Malinowski |
| 5,650,773 | A | 7/1997 | Chiarello |
| 5,651,070 | A | 7/1997 | Blunt |
| 5,652,567 | A | 7/1997 | Traxler |
| 5,654,694 | A | 8/1997 | Newham |
| 5,675,321 | A | 10/1997 | McBride |
| 5,680,131 | A | 10/1997 | Utz |
| 5,682,133 | A | 10/1997 | Johnson et al. |
| 5,686,885 | A | 11/1997 | Bergman |
| 5,686,896 | A | 11/1997 | Bergman |
| 5,689,235 | A | 11/1997 | Sugimoto et al. |
| 5,689,708 | A | 11/1997 | Regnier et al. |
| 5,691,697 | A | 11/1997 | Carvalho et al. |
| 5,694,335 | A | 12/1997 | Hollenberg |
| 5,694,595 | A | 12/1997 | Jacobs et al. |
| 5,696,486 | A | 12/1997 | Poliquin et al. |
| 5,696,898 | A | 12/1997 | Baker et al. |
| D389,501 | S | 1/1998 | Mascarenas et al. |
| 5,706,191 | A | 1/1998 | Bassett et al. |
| 5,712,679 | A | 1/1998 | Coles |
| 5,714,933 | A | 2/1998 | Le Van Suu |
| 5,715,394 | A | 2/1998 | Jabs |
| 5,717,378 | A | 2/1998 | Malvaso et al. |
| 5,717,379 | A | 2/1998 | Peters |
| 5,717,578 | A | 2/1998 | Afzal |
| 5,719,551 | A | 2/1998 | Flick |
| 5,726,912 | A | 3/1998 | Krall et al. |
| 5,731,756 | A | 3/1998 | Roddy |
| 5,736,927 | A | 4/1998 | Stebbins et al. |
| 5,737,391 | A | 4/1998 | Dame et al. |
| 5,748,084 | A | 5/1998 | Isikoff |
| 5,748,089 | A | 5/1998 | Sizemore |
| 5,757,616 | A | 5/1998 | May et al. |
| 5,761,206 | A | 6/1998 | Kackman |
| 5,774,051 | A | 6/1998 | Kostusiak |
| 5,777,551 | A | 7/1998 | Hess |
| 5,777,837 | A | 7/1998 | Eckel et al. |
| 5,784,461 | A | 7/1998 | Shaffer et al. |
| 5,784,463 | A | 7/1998 | Chen et al. |
| 5,790,531 | A | 8/1998 | Ellebracht et al. |
| 5,793,028 | A | 8/1998 | Wagener et al. |
| 5,793,763 | A | 8/1998 | Mayes et al. |
| 5,794,128 | A | 8/1998 | Brockel et al. |
| 5,796,401 | A | 8/1998 | Winer |
| 5,798,701 | A | 8/1998 | Bernal et al. |
| 5,801,618 | A | 9/1998 | Jenkins |
| 5,805,056 | A | 9/1998 | Mueller et al. |
| 5,805,064 | A | 9/1998 | Yorkey |
| 5,808,547 | A | 9/1998 | Carney |
| 5,809,013 | A | 9/1998 | Kackman |
| 5,809,265 | A | 9/1998 | Blair et al. |
| 5,812,054 | A | 9/1998 | Cohen |
| 5,819,124 | A | 10/1998 | Somner et al. |
| 5,821,937 | A | 10/1998 | Tonelli et al. |
| 5,825,865 | A | 10/1998 | Oberlander et al. |
| 5,838,226 | A | 11/1998 | Houggy et al. |
| 5,844,599 | A | 12/1998 | Hildin |
| 5,845,070 | A | 12/1998 | Ikudome |
| 5,845,081 | A | 12/1998 | Rangarajan et al. |
| 5,854,588 | A | 12/1998 | Dockery |
| 5,859,966 | A | 1/1999 | Hayman et al. |
| 5,861,804 | A | 1/1999 | Fansa et al. |
| 5,864,614 | A | 1/1999 | Farris et al. |
| 5,867,484 | A | 2/1999 | Shaunfield |
| 5,867,495 | A | 2/1999 | Elliott et al. |
| 5,874,952 | A | 2/1999 | Morgan |
| 5,875,395 | A | 2/1999 | Holmes |
| 5,877,696 | A | 3/1999 | Powell |
| 5,877,957 | A | 3/1999 | Bennett |
| 5,880,775 | A | 3/1999 | Ross |
| 5,881,226 | A | 3/1999 | Veneklase |
| 5,886,697 | A | 3/1999 | Naughton et al. |
| 5,886,894 | A | 3/1999 | Rakoff |
| 5,892,442 | A | 4/1999 | Ozery |
| 5,898,831 | A | 4/1999 | Hall et al. |
| 5,905,438 | A | 5/1999 | Weiss et al. |
| 5,907,279 | A | 5/1999 | Bruins et al. |
| 5,909,183 | A | 6/1999 | Borgstahl et al. |
| 5,914,655 | A | 6/1999 | Clifton et al. |
| 5,923,731 | A | 7/1999 | McClure |
| 5,924,069 | A | 7/1999 | Kowalkowski et al. |
| 5,926,209 | A | 7/1999 | Glatt |
| 5,933,098 | A | 8/1999 | Haxton |
| 5,940,387 | A | 8/1999 | Humpleman |
| 5,943,394 | A | 8/1999 | Ader et al. |
| 5,952,815 | A | 9/1999 | Rouillard et al. |
| 5,955,946 | A | 9/1999 | Beheshti et al. |
| 5,958,053 | A | 9/1999 | Denker |
| 5,959,528 | A | 9/1999 | Right et al. |
| 5,959,529 | A | 9/1999 | Kail, IV |
| 5,963,916 | A | 10/1999 | Kaplan |
| 5,967,975 | A | 10/1999 | Ridgeway |
| 5,974,547 | A | 10/1999 | Klimenko |
| D416,910 | S | 11/1999 | Vasquez |
| 5,982,418 | A | 11/1999 | Ely |
| 5,986,548 | A | 11/1999 | McGregor |
| 5,991,795 | A | 11/1999 | Howard et al. |
| 5,995,838 | A | 11/1999 | Oda et al. |
| 5,999,525 | A | 12/1999 | Krishnaswamy et al. |
| 6,002,430 | A | 12/1999 | McCall et al. |
| 6,009,320 | A | 12/1999 | Dudley |
| 6,011,321 | A | 1/2000 | Stancu et al. |
| 6,011,921 | A | 1/2000 | Takahashi et al. |
| 6,032,036 | A | 2/2000 | Maystre et al. |
| 6,037,991 | A | 3/2000 | Thro et al. |
| 6,038,289 | A | 3/2000 | Sands |
| 6,040,770 | A | 3/2000 | Britton |
| 6,049,272 | A | 4/2000 | Lee et al. |
| 6,049,273 | A | 4/2000 | Hess |
| 6,049,598 | A | 4/2000 | Peters et al. |
| 6,052,052 | A | 4/2000 | Delmonaco |
| 6,052,594 | A | 4/2000 | Chuang et al. |
| 6,058,115 | A | 5/2000 | Sawyer et al. |

(56) References Cited

U.S. PATENT DOCUMENTS 6,060,994 A 5/2000 Chen
6,067,346 A 5/2000 Akhteruzzaman
6,067,440 A 5/2000 Diefes
6,069,655 A 5/2000 Seeley et al.
6,078,253 A 6/2000 Fowler
6,078,257 A 6/2000 Ferraro
6,078,649 A 6/2000 Small et al.
6,085,030 A 7/2000 Whitehead et al.
6,085,238 A 7/2000 Yuasa et al.
6,091,771 A 7/2000 Seeley et al.
6,094,134 A 7/2000 Cohen
6,097,429 A 8/2000 Seeley et al.
6,104,785 A 8/2000 Chen
6,107,918 A 8/2000 Klein et al.
6,107,930 A 8/2000 Behlke et al.
6,108,034 A 8/2000 Kim
6,112,015 A 8/2000 Planas et al.
6,112,237 A 8/2000 Donaldson et al.
6,117,182 A 9/2000 Alpert et al.
6,124,882 A 9/2000 Voois et al.
6,128,653 A 10/2000 Del et al.
6,134,303 A 10/2000 Chen
6,134,591 A 10/2000 Nickles
6,138,249 A 10/2000 Nolet
6,139,177 A 10/2000 Venkatraman et al.
6,140,987 A 10/2000 Stein et al.
6,144,993 A 11/2000 Fukunaga et al.
6,154,133 A 11/2000 Ross et al.
6,157,649 A 12/2000 Peirce et al.
6,157,943 A 12/2000 Meyer
6,161,182 A 12/2000 Nadooshan
6,163,680 A 12/2000 Bridle et al.
6,167,186 A 12/2000 Kawasaki et al.
6,167,253 A 12/2000 Farris et al.
6,181,341 B1 1/2001 Shinagawa
6,192,282 B1 2/2001 Smith et al.
6,192,418 B1 2/2001 Hale et al.
6,198,475 B1 3/2001 Kunimatsu et al.
6,198,479 B1 3/2001 Humpleman et al.
6,208,247 B1 3/2001 Agre et al.
6,208,379 B1 3/2001 Oya et al.
6,208,952 B1 3/2001 Goertzel et al.
6,209,011 B1 3/2001 Vong et al.
6,211,783 B1 4/2001 Wang
6,215,404 B1 4/2001 Morales
6,218,938 B1 4/2001 Lin
6,219,677 B1 4/2001 Howard
6,226,031 B1 5/2001 Barraclough et al.
6,229,429 B1 5/2001 Horon
6,230,271 B1 5/2001 Wadlow et al.
6,239,892 B1 5/2001 Davidson
6,243,683 B1 6/2001 Peters
6,246,320 B1 6/2001 Monroe
6,252,883 B1 6/2001 Schweickart et al.
6,259,440 B1 7/2001 Vaughan et al.
6,263,260 B1 7/2001 Bodmer et al.
6,268,789 B1 7/2001 Diamant et al.
6,271,752 B1 8/2001 Vaios
6,275,227 B1 8/2001 DeStefano
6,281,790 B1 8/2001 Kimmel et al.
6,282,569 B1 8/2001 Wallis et al.
6,286,038 B1 9/2001 Reichmeyer et al.
6,288,716 B1 9/2001 Humpleman et al.
6,289,382 B1 9/2001 Bowman-Amuah
6,292,766 B1 9/2001 Mattos et al.
6,292,827 B1 9/2001 Raz
6,295,346 B1 9/2001 Markowitz et al.
6,295,558 B1 9/2001 Davis et al.
6,314,425 B1 11/2001 Serbinis et al.
6,320,506 B1 11/2001 Ferraro
6,323,897 B1 11/2001 Kogane et al.
D451,529 S 12/2001 Vasquez
6,327,044 B1 12/2001 Shima
6,331,122 B1 12/2001 Wu
6,332,193 B1 12/2001 Glass et al.
6,341,274 B1 1/2002 Leon
6,347,393 B1 2/2002 Alpert et al.
6,351,213 B1 2/2002 Hirsch et al.
6,351,271 B1 2/2002 Mainwaring et al.
6,351,595 B1 2/2002 Kim
6,351,829 B1 2/2002 Dupont et al.
6,353,853 B1 3/2002 Gravlin
6,353,891 B1 3/2002 Borella et al.
6,359,560 B1 3/2002 Budge et al.
6,363,417 B1 3/2002 Howard et al.
6,363,422 B1 3/2002 Hunter et al.
6,366,211 B1 4/2002 Parker
6,366,648 B1 4/2002 Carney
6,369,695 B2 4/2002 Horon
6,369,705 B1 4/2002 Kennedy
6,370,436 B1 4/2002 Howard et al.
6,374,079 B1 4/2002 Hsu
6,377,861 B1 4/2002 York
6,378,109 B1 4/2002 Young et al.
6,385,772 B1 5/2002 Courtney
6,392,538 B1 5/2002 Shere
6,396,531 B1 5/2002 Gerszberg et al.
6,400,265 B1 6/2002 Saylor et al.
6,405,348 B1 6/2002 Fallah-Tehrani et al.
6,411,802 B1 6/2002 Cardina et al.
D460,472 S 7/2002 Wang
6,418,037 B1 7/2002 Zhang
6,421,080 B1 7/2002 Lambert
6,430,629 B1 8/2002 Smyers
6,433,683 B1 8/2002 Robinson
6,434,604 B1 8/2002 Harada et al.
6,434,700 B1 8/2002 Alonso et al.
6,437,692 B1 8/2002 Petite et al.
6,441,723 B1 8/2002 Mansfield et al.
6,441,731 B1 8/2002 Hess
6,442,241 B1 8/2002 Tsumpes
6,445,291 B2 9/2002 Addy et al.
6,446,111 B1 9/2002 Lowery
6,446,192 B1 9/2002 Narasimhan et al.
6,452,490 B1 9/2002 Garland et al.
6,452,923 B1 9/2002 Gerszberg et al.
6,452,924 B1 9/2002 Golden et al.
6,453,687 B2 9/2002 Sharood et al.
D464,328 S 10/2002 Vasquez et al.
D464,948 S 10/2002 Vasquez et al.
6,462,507 B2 10/2002 Fisher, Jr.
6,462,663 B1 10/2002 Wilson et al.
6,467,084 B1 10/2002 Howard et al.
6,473,407 B1 10/2002 Ditmer et al.
6,476,858 B1 11/2002 Ramirez et al.
6,480,901 B1 11/2002 Weber et al.
6,484,261 B1 11/2002 Wiegel
6,486,896 B1 11/2002 Ubillos
6,493,020 B1 12/2002 Stevenson et al.
6,496,927 B1 12/2002 McGrane et al.
6,499,131 B1 12/2002 Savithri et al.
6,504,479 B1 1/2003 Lemons et al.
6,507,589 B1 1/2003 Ramasubramani et al.
6,508,709 B1 1/2003 Karmarkar
6,515,968 B1 2/2003 Combar et al.
6,526,581 B1 2/2003 Edson
6,529,230 B1 3/2003 Chong
6,529,589 B1 3/2003 Nelson et al.
6,529,723 B1 3/2003 Bentley
6,535,110 B1 3/2003 Arora et al.
6,542,075 B2 4/2003 Barker et al.
6,542,992 B1 4/2003 Peirce et al.
6,549,130 B1 4/2003 Joao
6,552,647 B1 4/2003 Thiessen et al.
6,553,336 B1 4/2003 Johnson et al.
6,559,769 B2 5/2003 Anthony et al.
6,563,800 B1 5/2003 Salo et al.
6,563,910 B2 5/2003 Menard et al.
6,567,122 B1 5/2003 Anderson et al.
6,567,502 B2 5/2003 Zellner et al.
6,574,234 B1 6/2003 Myer et al.
6,580,424 B1 6/2003 Krumm
6,580,950 B1 6/2003 Johnson et al.
6,587,046 B2 7/2003 Joao

(56) References Cited

U.S. PATENT DOCUMENTS 6,587,235 B1 7/2003 Chaudhuri et al.
6,587,455 B1 7/2003 Ray et al.
6,587,736 B2 7/2003 Howard et al.
6,587,739 B1 7/2003 Abrams et al.
6,591,094 B1 7/2003 Bentley
6,593,856 B1 7/2003 Madau
6,597,703 B1 7/2003 Li et al.
6,601,086 B1 7/2003 Howard et al.
6,603,488 B2 8/2003 Humpleman et al.
6,609,127 B1 8/2003 Lee et al.
6,611,206 B2 8/2003 Eshelman et al.
6,615,088 B1 9/2003 Myer et al.
6,621,827 B1 9/2003 Rezvani et al.
6,624,750 B1 9/2003 Marman et al.
6,631,416 B2 10/2003 Bendinelli et al.
6,636,893 B1 10/2003 Fong
6,643,355 B1 11/2003 Tsumpes
6,643,652 B2 11/2003 Helgeson et al.
6,643,669 B1 11/2003 Novak et al.
6,643,795 B1 11/2003 Sicola et al.
6,648,682 B1 11/2003 Wu
6,658,091 B1 12/2003 Naidoo et al.
6,661,340 B1 12/2003 Saylor et al.
6,662,340 B2 12/2003 Rawat et al.
6,665,004 B1 12/2003 Paff
6,667,688 B1 12/2003 Menard et al.
6,674,767 B1 1/2004 Kadyk et al.
6,675,365 B2 1/2004 Elzinga
6,680,730 B1 1/2004 Shields et al.
6,680,935 B1 1/2004 Kung et al.
6,686,838 B1 2/2004 Rezvani et al.
6,690,411 B2 2/2004 Naidoo et al.
6,690,719 B1 2/2004 Raphaeli et al.
6,693,530 B1 2/2004 Dowens et al.
6,693,545 B2 2/2004 Brown et al.
6,697,103 B1 2/2004 Fernandez et al.
6,704,786 B1 3/2004 Gupta et al.
6,716,101 B1 4/2004 Meadows et al.
6,720,990 B1 4/2004 Walker et al.
6,721,689 B2 4/2004 Markle et al.
6,721,740 B1 4/2004 Skinner et al.
6,721,747 B2 4/2004 Lipkin
6,721,802 B1 4/2004 Wright et al.
6,727,811 B1 4/2004 Fendis
6,728,233 B1 4/2004 Park et al.
6,728,688 B1 4/2004 Hirsch et al.
6,738,824 B1 5/2004 Blair
6,741,171 B2 5/2004 Palka et al.
6,741,977 B1 5/2004 Nagaya et al.
6,754,181 B1 6/2004 Elliott et al.
6,754,717 B1 6/2004 Day et al.
6,756,896 B2 6/2004 Ford
6,756,988 B1 6/2004 Wang et al.
6,756,998 B1 6/2004 Bilger
6,759,956 B2 7/2004 Menard et al.
6,762,686 B1 7/2004 Tabe
6,763,377 B1 7/2004 Belknap et al.
6,766,353 B1 7/2004 Lin et al.
6,771,181 B1 8/2004 Hughen, Jr.
6,778,085 B2 8/2004 Faulkner et al.
6,779,019 B1 8/2004 Mousseau et al.
6,781,509 B1 8/2004 Oppedahl et al.
6,785,542 B1 8/2004 Blight et al.
6,789,147 B1 9/2004 Kessler et al.
6,795,322 B2 9/2004 Aihara et al.
6,795,863 B1 9/2004 Doty, Jr.
6,798,344 B2 9/2004 Faulkner et al.
6,804,638 B2 10/2004 Fiedler
6,810,409 B1 10/2004 Fry et al.
6,810,420 B1 10/2004 Buse et al.
6,823,223 B2 11/2004 Gonzales et al.
6,826,173 B1 11/2004 Kung et al.
6,826,233 B1 11/2004 Oosawa
6,829,478 B1 12/2004 Layton et al.
6,834,208 B2 12/2004 Gonzales et al.
6,836,214 B2 12/2004 Choi
6,850,252 B1 2/2005 Hoffberg
6,856,236 B2 2/2005 Christensen et al.
6,857,026 B1 2/2005 Cain
6,859,831 B1 2/2005 Gelvin et al.
6,865,690 B2 3/2005 Kocin
6,871,193 B1 3/2005 Campbell et al.
6,873,256 B2 3/2005 Lemelson et al.
6,885,362 B2 4/2005 Suomela
D504,889 S 5/2005 Andre et al.
6,891,838 B1 5/2005 Petite et al.
6,912,429 B1 6/2005 Bilger
6,914,533 B2 7/2005 Petite
6,918,112 B2 7/2005 Bourke-Dunphy et al.
6,920,502 B2 7/2005 Araujo et al.
6,920,615 B1 7/2005 Campbell et al.
6,922,701 B1 7/2005 Ananian et al.
6,925,054 B1 8/2005 Atterton et al.
6,928,148 B2 8/2005 Simon et al.
6,930,598 B2 8/2005 Weiss
6,930,599 B2 8/2005 Naidoo et al.
6,930,730 B2 8/2005 Maxson et al.
6,931,445 B2 8/2005 Davis
6,941,258 B2 9/2005 Van et al.
6,943,681 B2 9/2005 Rezvani et al.
6,956,477 B2 10/2005 Chun
6,957,075 B1 10/2005 Iverson
6,957,186 B1 10/2005 Guheen et al.
6,957,275 B1 10/2005 Sekiguchi
6,959,341 B1 10/2005 Leung
6,959,393 B2 10/2005 Hollis et al.
6,963,908 B1 11/2005 Lynch et al.
6,963,981 B1 11/2005 Bailey et al.
6,965,294 B1 11/2005 Elliott et al.
6,965,313 B1 11/2005 Saylor et al.
6,970,183 B1 11/2005 Monroe
6,971,063 B1 11/2005 Rappaport et al.
6,971,076 B2 11/2005 Chen
6,972,676 B1 12/2005 Kimmel et al.
6,975,220 B1 12/2005 Foodman et al.
6,977,485 B1 12/2005 Wei
6,983,432 B2 1/2006 Hayes
6,990,591 B1 1/2006 Pearson
6,993,658 B1 1/2006 Engberg et al.
6,999,562 B2 2/2006 Winick
6,999,992 B1 2/2006 Deen et al.
7,015,806 B2 3/2006 Naidoo et al.
7,016,970 B2 3/2006 Harumoto et al.
7,019,639 B2 3/2006 Stilp
7,020,697 B1 3/2006 Goodman et al.
7,020,701 B1 3/2006 Gelvin et al.
7,023,913 B1 4/2006 Monroe
7,023,914 B2 4/2006 Furukawa et al.
7,023,975 B2 4/2006 Mansfield et al.
7,024,676 B1 4/2006 Klopfenstein
7,028,328 B2 4/2006 Kogane et al.
7,030,752 B2 4/2006 Tyroler
7,032,002 B1 4/2006 Rezvani et al.
7,034,681 B2 4/2006 Yamamoto et al.
7,035,907 B1 4/2006 Decasper et al.
7,039,391 B2 5/2006 Rezvani et al.
7,042,880 B1 5/2006 Voit et al.
7,043,537 B1 5/2006 Pratt
7,047,088 B2 5/2006 Nakamura et al.
7,047,092 B2 5/2006 Wimsatt
7,047,180 B1 5/2006 Mathews et al.
7,050,388 B2 5/2006 Kim et al.
7,053,764 B2 5/2006 Stilp
7,053,765 B1 5/2006 Clark
7,068,164 B1 6/2006 Duncan et al.
7,072,934 B2 7/2006 Helgeson et al.
7,073,140 B1 7/2006 Li et al.
7,075,429 B2 7/2006 Marshall
7,079,020 B2 7/2006 Stilp
7,080,046 B1 7/2006 Rezvani et al.
7,081,813 B2 7/2006 Winick et al.
7,082,460 B2 7/2006 Hansen et al.
7,084,756 B2 8/2006 Stilp
7,085,814 B1 8/2006 Gandhi et al.

(56) References Cited

U.S. PATENT DOCUMENTS

| | | | |
|---|---|---|---|
| 7,085,937 | B1 | 8/2006 | Rezvani et al. |
| 7,086,018 | B2 | 8/2006 | Ito |
| 7,099,944 | B1 | 8/2006 | Anschutz et al. |
| 7,099,994 | B2 | 8/2006 | Thayer et al. |
| 7,103,152 | B2 | 9/2006 | Naidoo et al. |
| 7,106,176 | B2 | 9/2006 | La et al. |
| 7,107,322 | B1 | 9/2006 | Freeny, Jr. |
| 7,110,774 | B1 | 9/2006 | Davis et al. |
| 7,111,072 | B1 | 9/2006 | Matthews et al. |
| 7,113,090 | B1 | 9/2006 | Saylor et al. |
| 7,113,099 | B2 | 9/2006 | Tyroler et al. |
| 7,114,554 | B2 | 10/2006 | Bergman et al. |
| 7,119,609 | B2 | 10/2006 | Naidoo et al. |
| 7,119,674 | B2 | 10/2006 | Sefton |
| 7,120,139 | B1 | 10/2006 | Kung et al. |
| 7,120,232 | B2 | 10/2006 | Naidoo et al. |
| 7,120,233 | B2 | 10/2006 | Naidoo et al. |
| 7,126,473 | B1 | 10/2006 | Powell |
| 7,130,383 | B2 | 10/2006 | Naidoo et al. |
| 7,130,585 | B1 | 10/2006 | Ollis et al. |
| 7,133,380 | B1 | 11/2006 | Winters et al. |
| 7,134,138 | B2 | 11/2006 | Scherr |
| 7,136,711 | B1 | 11/2006 | Duncan et al. |
| 7,142,503 | B1 | 11/2006 | Grant et al. |
| 7,145,898 | B1 | 12/2006 | Elliott |
| 7,147,147 | B1 | 12/2006 | Enright et al. |
| 7,148,810 | B2 | 12/2006 | Bhat |
| 7,149,798 | B2 | 12/2006 | Rezvani et al. |
| 7,149,814 | B2 | 12/2006 | Neufeld et al. |
| 7,158,026 | B2 | 1/2007 | Feldkamp et al. |
| 7,158,776 | B1 | 1/2007 | Estes et al. |
| 7,158,920 | B2 | 1/2007 | Ishikawa |
| 7,164,883 | B2 | 1/2007 | Rappaport et al. |
| 7,164,907 | B2 | 1/2007 | Cochran et al. |
| 7,166,987 | B2 | 1/2007 | Lee et al. |
| 7,171,466 | B2 | 1/2007 | Van Der Meulen |
| 7,171,686 | B1 | 1/2007 | Jansen et al. |
| 7,174,018 | B1 | 2/2007 | Patil et al. |
| 7,174,564 | B1 | 2/2007 | Weatherspoon et al. |
| 7,180,889 | B1 | 2/2007 | Kung et al. |
| 7,181,207 | B1 | 2/2007 | Chow et al. |
| 7,181,517 | B1 | 2/2007 | Iavergne et al. |
| 7,181,571 | B2 | 2/2007 | Jiang et al. |
| 7,181,716 | B1 | 2/2007 | Dahroug |
| 7,183,907 | B2 | 2/2007 | Simon et al. |
| 7,184,428 | B1 | 2/2007 | Gerszberg et al. |
| 7,184,848 | B2 | 2/2007 | Krzyzanowski et al. |
| 7,187,279 | B2 | 3/2007 | Chung |
| 7,187,986 | B2 | 3/2007 | Johnson et al. |
| 7,194,003 | B2 | 3/2007 | Danner et al. |
| 7,194,446 | B1 | 3/2007 | Bromley et al. |
| 7,197,125 | B1 | 3/2007 | Prasad et al. |
| 7,203,486 | B2 | 4/2007 | Patel |
| 7,209,945 | B2 | 4/2007 | Hicks et al. |
| 7,212,570 | B2 | 5/2007 | Akiyama et al. |
| 7,213,061 | B1 | 5/2007 | Hite et al. |
| 7,218,217 | B2 | 5/2007 | Adonailo et al. |
| 7,222,359 | B2 | 5/2007 | Freund et al. |
| 7,229,012 | B1 | 6/2007 | Enright et al. |
| 7,237,267 | B2 | 6/2007 | Rayes et al. |
| 7,240,327 | B2 | 7/2007 | Singh et al. |
| 7,246,044 | B2 | 7/2007 | Imamura et al. |
| 7,248,150 | B2 | 7/2007 | Mackjust et al. |
| 7,248,161 | B2 | 7/2007 | Spoltore et al. |
| 7,249,177 | B1 | 7/2007 | Miller |
| 7,249,317 | B1 | 7/2007 | Nakagawa et al. |
| 7,250,854 | B2 | 7/2007 | Rezvani et al. |
| 7,250,859 | B2 | 7/2007 | Martin et al. |
| 7,254,779 | B1 | 8/2007 | Rezvani et al. |
| 7,254,833 | B1 | 8/2007 | Cornelius et al. |
| 7,262,690 | B2 | 8/2007 | Heaton et al. |
| 7,277,010 | B2 | 10/2007 | Joao |
| 7,292,142 | B2 | 11/2007 | Simon et al. |
| 7,293,083 | B1 | 11/2007 | Ranous et al. |
| 7,298,253 | B2 | 11/2007 | Petricoin et al. |
| 7,305,461 | B2 | 12/2007 | Ullman |
| 7,310,115 | B2 | 12/2007 | Tanimoto |
| 7,310,344 | B1 | 12/2007 | Sue |
| 7,313,102 | B2 | 12/2007 | Stephenson et al. |
| 7,313,231 | B2 | 12/2007 | Reid |
| D558,460 | S | 1/2008 | Yu et al. |
| D558,756 | S | 1/2008 | Andre et al. |
| 7,315,886 | B1 | 1/2008 | Meenan et al. |
| 7,337,217 | B2 | 2/2008 | Wang |
| 7,337,473 | B2 | 2/2008 | Chang et al. |
| 7,339,895 | B2 | 3/2008 | Ozaki et al. |
| 7,340,314 | B1 | 3/2008 | Duncan et al. |
| 7,343,619 | B2 | 3/2008 | Ofek et al. |
| 7,345,580 | B2 | 3/2008 | Akamatsu et al. |
| 7,346,338 | B1 | 3/2008 | Calhoun et al. |
| 7,349,682 | B1 | 3/2008 | Bennett et al. |
| 7,349,761 | B1 | 3/2008 | Cruse |
| 7,349,967 | B2 | 3/2008 | Wang |
| 7,356,372 | B1 | 4/2008 | Duncan et al. |
| 7,359,843 | B1 | 4/2008 | Keller et al. |
| 7,362,221 | B2 | 4/2008 | Katz |
| 7,367,045 | B2 | 4/2008 | Ofek et al. |
| 7,370,115 | B2 | 5/2008 | Bae et al. |
| 7,383,339 | B1 | 6/2008 | Meenan et al. |
| 7,383,522 | B2 | 6/2008 | Murgai et al. |
| 7,389,109 | B2 | 6/2008 | Hind et al. |
| 7,391,298 | B1 | 6/2008 | Campbell et al. |
| 7,403,838 | B2 | 7/2008 | Deen et al. |
| 7,409,045 | B2 | 8/2008 | Naidoo et al. |
| 7,409,451 | B1 | 8/2008 | Meenan et al. |
| 7,412,447 | B2 | 8/2008 | Hilbert et al. |
| 7,425,101 | B2 | 9/2008 | Cheng |
| 7,428,585 | B1 | 9/2008 | Owens et al. |
| 7,430,614 | B2 | 9/2008 | Shen et al. |
| 7,437,753 | B2 | 10/2008 | Nahum |
| 7,440,434 | B2 | 10/2008 | Chaskar et al. |
| 7,440,767 | B2 | 10/2008 | Ballay et al. |
| 7,447,775 | B1 | 11/2008 | Zhu et al. |
| 7,454,731 | B2 | 11/2008 | Oh et al. |
| 7,457,869 | B2 | 11/2008 | Kernan |
| 7,466,223 | B2 | 12/2008 | Sefton |
| 7,466,710 | B1 | 12/2008 | Clemm et al. |
| 7,469,139 | B2 | 12/2008 | Van De Groenendaal |
| 7,469,294 | B1 | 12/2008 | Luo et al. |
| 7,469,381 | B2 | 12/2008 | Ording |
| 7,469,391 | B2 | 12/2008 | Carrere et al. |
| D584,738 | S | 1/2009 | Kim et al. |
| D585,399 | S | 1/2009 | Hwang |
| 7,477,629 | B2 | 1/2009 | Tsirtsis et al. |
| 7,479,949 | B2 | 1/2009 | Jobs et al. |
| 7,480,713 | B2 | 1/2009 | Ullman |
| 7,480,724 | B2 | 1/2009 | Zimler et al. |
| 7,483,958 | B1 | 1/2009 | Elabbady et al. |
| 7,490,350 | B1 | 2/2009 | Murotake et al. |
| 7,493,651 | B2 | 2/2009 | Vaenskae et al. |
| 7,498,695 | B2 | 3/2009 | Gaudreau et al. |
| 7,502,672 | B1 | 3/2009 | Kolls |
| 7,506,052 | B2 | 3/2009 | Qian et al. |
| 7,509,687 | B2 | 3/2009 | Ofek et al. |
| 7,511,614 | B2 | 3/2009 | Stilp et al. |
| 7,512,965 | B1 | 3/2009 | Amdur et al. |
| 7,526,539 | B1 | 4/2009 | Hsu |
| 7,526,762 | B1 | 4/2009 | Astala et al. |
| 7,528,723 | B2 | 5/2009 | Fast et al. |
| 7,535,880 | B1 | 5/2009 | Hinman et al. |
| 7,542,721 | B1 | 6/2009 | Bonner et al. |
| 7,549,134 | B1 | 6/2009 | Li et al. |
| 7,551,071 | B2 | 6/2009 | Bennett et al. |
| 7,554,934 | B2 | 6/2009 | Abraham et al. |
| 7,558,379 | B2 | 7/2009 | Winick |
| 7,558,862 | B1 | 7/2009 | Tyukasz et al. |
| 7,558,903 | B2 | 7/2009 | Kinstler |
| 7,562,323 | B1 | 7/2009 | Bai et al. |
| 7,564,855 | B1 | 7/2009 | Georgiou |
| 7,568,018 | B1 | 7/2009 | Hove et al. |
| 7,571,459 | B2 | 8/2009 | Ganesh et al. |
| 7,577,420 | B2 | 8/2009 | Srinivasan et al. |
| 7,583,191 | B2 | 9/2009 | Zinser |
| 7,584,263 | B1 | 9/2009 | Hicks et al. |

(56) References Cited

U.S. PATENT DOCUMENTS 7,587,464 B2 9/2009 Moorer et al.
7,590,953 B2 9/2009 Chang
7,595,816 B1 9/2009 Enright et al.
7,596,622 B2 9/2009 Owen et al.
D602,014 S 10/2009 Andre et al.
D602,015 S 10/2009 Andre et al.
D602,017 S 10/2009 Andre et al.
D602,486 S 10/2009 Andre et al.
D602,487 S 10/2009 Maskatia
7,606,767 B1 10/2009 Couper et al.
7,610,555 B2 10/2009 Klein et al.
7,610,559 B1 10/2009 Humpleman et al.
7,619,512 B2 11/2009 Trundle et al.
7,620,427 B2 11/2009 Shanahan
7,627,665 B2 12/2009 Barker et al.
7,633,385 B2 12/2009 Cohn et al.
7,634,519 B2 12/2009 Creamer et al.
7,639,157 B1 12/2009 Whitley et al.
7,651,530 B2 1/2010 Winick
7,653,911 B2 1/2010 Doshi et al.
7,671,729 B2 3/2010 Hershkovitz et al.
7,679,503 B2 3/2010 Mason et al.
7,681,201 B2 3/2010 Dale et al.
7,684,418 B2 3/2010 Scott et al.
7,696,873 B2 4/2010 Sharma et al.
7,697,028 B1 4/2010 Johnson
7,701,970 B2 4/2010 Krits et al.
7,702,421 B2 4/2010 Sullivan et al.
7,702,782 B1 4/2010 Pai
D615,083 S 5/2010 Andre et al.
7,711,796 B2 5/2010 Gutt et al.
7,720,654 B2 5/2010 Hollis
7,730,223 B1 6/2010 Bavor et al.
7,733,371 B1 6/2010 Monroe
7,734,020 B2 6/2010 Elliot et al.
7,734,286 B2 6/2010 Almeda et al.
7,734,906 B2 6/2010 Orlando et al.
7,739,596 B2 6/2010 Clarke-Martin et al.
7,739,658 B2 6/2010 Watson et al.
7,747,975 B2 6/2010 Dinter et al.
7,751,409 B1 7/2010 Carolan
7,755,472 B2 7/2010 Grossman
7,755,506 B1 7/2010 Clegg et al.
7,756,928 B1 7/2010 Meenan et al.
7,761,275 B2 7/2010 Chopra et al.
7,787,863 B2 8/2010 Van De Groenendaal
7,804,403 B2 9/2010 Chantelou et al.
7,804,760 B2 9/2010 Schmukler et al.
D624,896 S 10/2010 Park et al.
D626,437 S 11/2010 Lee et al.
7,825,793 B1 11/2010 Spillman et al.
7,827,252 B2 11/2010 Hopmann et al.
7,844,699 B1 11/2010 Horrocks et al.
7,847,675 B1 12/2010 Thyen et al.
7,855,635 B2 12/2010 Cohn et al.
7,859,404 B2 12/2010 Chul et al.
7,882,466 B2 2/2011 Ishikawa
7,882,537 B2 2/2011 Okajo et al.
7,884,855 B2 2/2011 Ortiz
7,890,612 B2 2/2011 Todd et al.
7,890,915 B2 2/2011 Celik et al.
7,899,732 B2 3/2011 Van et al.
7,904,074 B2 3/2011 Karaoguz et al.
7,904,187 B2 3/2011 Hoffberg et al.
7,911,341 B2 3/2011 Raji et al.
7,912,447 B2 3/2011 Bennett et al.
7,917,624 B2 3/2011 Gidwani
D636,769 S 4/2011 Wood et al.
7,921,686 B2 4/2011 Bagepalli et al.
7,928,840 B2 4/2011 Kim et al.
7,930,365 B2 4/2011 Dixit et al.
D637,596 S 5/2011 Akana et al.
7,949,960 B2 5/2011 Roessler et al.
D639,805 S 6/2011 Song et al.
D640,663 S 6/2011 Arnholt et al.
7,956,736 B2 6/2011 Cohn et al.
7,957,326 B1 6/2011 Christie, IV
7,970,863 B1 6/2011 Fontaine
D641,018 S 7/2011 Lee et al.
7,974,235 B2 7/2011 Ghozati et al.
D642,563 S 8/2011 Akana et al.
8,001,219 B2 8/2011 Moorer et al.
D645,015 S 9/2011 Lee et al.
D645,435 S 9/2011 Kim et al.
D645,833 S 9/2011 Seflic et al.
8,022,833 B2 9/2011 Cho
8,028,041 B2 9/2011 Olliphant et al.
8,032,881 B2 10/2011 Holmberg et al.
8,042,049 B2 10/2011 Killian et al.
8,046,411 B2 10/2011 Hayashi et al.
8,046,721 B2 10/2011 Chaudhri et al.
8,069,194 B1 11/2011 Manber et al.
D650,381 S 12/2011 Park et al.
8,073,931 B2 12/2011 Dawes et al.
8,086,702 B2 12/2011 Baum et al.
8,086,703 B2 12/2011 Baum et al.
D654,460 S 2/2012 Kim et al.
D654,497 S 2/2012 Lee
8,122,131 B2 2/2012 Baum et al.
8,125,184 B2 2/2012 Raji et al.
D656,137 S 3/2012 Chung et al.
8,140,658 B1 3/2012 Gelvin et al.
8,144,836 B2 3/2012 Naidoo et al.
8,149,849 B2 4/2012 Osborn et al.
8,159,519 B2 4/2012 Kurtz et al.
8,159,945 B2 4/2012 Muro et al.
8,160,425 B2 4/2012 Kisliakov
8,196,064 B2 6/2012 Krzyzanowski et al.
8,200,827 B1 6/2012 Hunyady et al.
8,205,181 B1 6/2012 Singla et al.
8,209,400 B2 6/2012 Baum et al.
D663,298 S 7/2012 Song et al.
D664,540 S 7/2012 Kim et al.
8,214,494 B1 7/2012 Slavin
8,214,496 B2 7/2012 Gutt et al.
8,219,254 B2 7/2012 O'Connor
8,229,812 B2 7/2012 Raleigh
8,230,466 B2 7/2012 Cockrell et al.
D664,954 S 8/2012 Kim et al.
D666,198 S 8/2012 Van et al.
8,239,477 B2 8/2012 Sharma et al.
8,244,550 B2 8/2012 Sim et al.
D667,395 S 9/2012 Lee
D667,396 S 9/2012 Koh
D667,397 S 9/2012 Koh
D667,398 S 9/2012 Koh
D667,399 S 9/2012 Koh
8,269,376 B1 9/2012 Elberbaum
8,269,623 B2 9/2012 Addy
8,271,629 B1 9/2012 Winters et al.
8,271,881 B2 9/2012 Moorer et al.
8,272,053 B2 9/2012 Markham et al.
8,275,830 B2 9/2012 Raleigh
D668,650 S 10/2012 Han
D668,651 S 10/2012 Kim et al.
D668,652 S 10/2012 Kim et al.
D669,469 S 10/2012 Kang
D670,692 S 11/2012 Akana et al.
D671,514 S 11/2012 Kim et al.
8,305,172 B2 11/2012 Mehraban et al.
8,311,526 B2 11/2012 Forstall et al.
D671,938 S 12/2012 Hsu et al.
D672,344 S 12/2012 Li
D672,345 S 12/2012 Li
D672,739 S 12/2012 Sin
D672,768 S 12/2012 Huang et al.
8,335,842 B2 12/2012 Raji et al.
8,335,854 B2 12/2012 Eldering
8,336,010 B1 12/2012 Chang et al.
D673,561 S 1/2013 Hyun et al.
D673,948 S 1/2013 Andre et al.
D673,950 S 1/2013 Li et al.
D674,369 S 1/2013 Jaewoong
D675,203 S 1/2013 Yang

(56) References Cited

U.S. PATENT DOCUMENTS 8,350,694 B1 1/2013 Trundle et al.
8,363,791 B2 1/2013 Gupta et al.
D675,588 S 2/2013 Park
D675,612 S 2/2013 Andre et al.
D676,443 S 2/2013 Canizares et al.
D676,819 S 2/2013 Choi
8,373,313 B2 2/2013 Garcia et al.
D677,255 S 3/2013 McManigal et al.
D677,640 S 3/2013 Kim et al.
D677,659 S 3/2013 Akana et al.
D677,660 S 3/2013 Groene et al.
D678,271 S 3/2013 Chiu
D678,272 S 3/2013 Groene et al.
D678,877 S 3/2013 Groene et al.
8,396,766 B1 3/2013 Enright et al.
8,400,767 B2 3/2013 Yeom et al.
D679,706 S 4/2013 Tang et al.
D680,151 S 4/2013 Katori
D680,524 S 4/2013 Feng et al.
D681,032 S 4/2013 Akana et al.
8,412,922 B2 4/2013 Nesse et al.
8,413,204 B2 4/2013 White et al.
D681,583 S 5/2013 Park
D681,591 S 5/2013 Sung
D681,632 S 5/2013 Akana et al.
D682,239 S 5/2013 Yeh et al.
8,451,986 B2 5/2013 Cohn et al.
D684,553 S 6/2013 Kim et al.
D684,968 S 6/2013 Smith et al.
8,456,293 B1 6/2013 Trundle et al.
8,473,619 B2 6/2013 Baum et al.
D685,778 S 7/2013 Fahrendorff et al.
D685,783 S 7/2013 Bryan et al.
8,478,450 B2 7/2013 Lu et al.
8,478,844 B2 7/2013 Baum et al.
8,478,871 B2 7/2013 Gutt et al.
8,483,853 B1 7/2013 Lambourne
8,493,202 B1 7/2013 Trundle et al.
8,499,038 B1 7/2013 Vucurevich
8,520,068 B2 8/2013 Naidoo et al.
8,520,072 B1 8/2013 Slavin et al.
8,525,664 B2 9/2013 Hadizad et al.
8,543,665 B2 9/2013 Ansari et al.
D692,042 S 10/2013 Dawes et al.
8,554,478 B2 10/2013 Hartman
8,560,041 B2 10/2013 Flaherty et al.
8,570,993 B2 10/2013 Austin et al.
8,584,199 B1 11/2013 Chen et al.
8,595,377 B1 11/2013 Apgar et al.
D695,735 S 12/2013 Kitchen et al.
8,599,018 B2 12/2013 Kellen et al.
8,612,591 B2 12/2013 Dawes et al.
8,619,136 B2 12/2013 Howarter et al.
8,634,533 B2 1/2014 Strasters
8,635,350 B2 1/2014 Gutt et al.
8,635,499 B2 1/2014 Cohn et al.
8,638,211 B2 1/2014 Cohn et al.
8,649,386 B2 2/2014 Ansari et al.
8,650,320 B1 2/2014 Merrick et al.
8,666,560 B2 3/2014 Lu et al.
8,670,753 B2 3/2014 Hewes et al.
8,675,071 B1 3/2014 Slavin et al.
8,700,769 B2 4/2014 Alexander et al.
8,704,821 B2 4/2014 Kulkarni et al.
8,713,132 B2 4/2014 Baum et al.
8,723,671 B2 5/2014 Foisy et al.
8,730,834 B2 5/2014 Marusca et al.
8,738,765 B2 5/2014 Wyatt et al.
8,812,654 B2 8/2014 Gelvin et al.
8,817,809 B2 8/2014 Gage
8,819,178 B2 8/2014 Baum et al.
8,825,871 B2 9/2014 Baum et al.
8,832,244 B2 9/2014 Gelvin et al.
8,836,467 B1 9/2014 Cohn et al.
8,868,678 B2 10/2014 Hildreth et al.
8,885,552 B2 11/2014 Bedingfield et al.
8,902,740 B2 12/2014 Hicks, III
8,914,526 B1 12/2014 Lindquist et al.
8,914,837 B2 12/2014 Ahmed et al.
8,935,236 B2 1/2015 Morita et al.
8,937,539 B2 1/2015 Sharma et al.
8,937,658 B2 1/2015 Hicks et al.
8,953,479 B2 2/2015 Hall et al.
8,953,749 B2 2/2015 Naidoo et al.
8,963,713 B2 2/2015 Dawes et al.
8,976,763 B2 3/2015 Shrestha et al.
8,983,534 B2 3/2015 Patel
8,988,217 B2 3/2015 Piccolo, III
8,988,221 B2 3/2015 Raji et al.
8,989,922 B2 3/2015 Jones et al.
8,996,665 B2 3/2015 Baum et al.
9,047,753 B2 6/2015 Dawes et al.
9,059,863 B2 6/2015 Baum et al.
9,064,394 B1 6/2015 Trundle
9,094,407 B1 7/2015 Matthieu et al.
9,100,446 B2 8/2015 Cohn et al.
9,141,276 B2 9/2015 Dawes et al.
9,144,143 B2 9/2015 Raji et al.
9,146,548 B2 9/2015 Chambers et al.
9,147,337 B2 9/2015 Cohn et al.
9,160,784 B2 10/2015 Jeong et al.
9,164,669 B1 10/2015 Yaksick et al.
9,170,707 B1 10/2015 Laska et al.
9,172,532 B1 10/2015 Fuller et al.
9,172,533 B2 10/2015 Fielder
9,172,553 B2 10/2015 Dawes et al.
9,172,605 B2 10/2015 Hardy et al.
9,189,934 B2 11/2015 Jentoft et al.
9,191,228 B2 11/2015 Fulker et al.
9,202,362 B2 12/2015 Hyland et al.
9,246,921 B1 1/2016 Vlaminck et al.
9,286,772 B2 3/2016 Shapiro et al.
9,287,727 B1 3/2016 Egan
9,300,921 B2 3/2016 Naidoo et al.
9,306,809 B2 4/2016 Dawes et al.
9,310,864 B1 4/2016 Klein et al.
9,373,014 B1 6/2016 Mehranfar
9,412,248 B1 8/2016 Cohn et al.
9,426,720 B2 8/2016 Cohn et al.
9,450,776 B2 9/2016 Baum et al.
9,462,041 B1 10/2016 Hagins et al.
9,510,065 B2 11/2016 Cohn et al.
9,529,344 B1 12/2016 Hagins et al.
9,531,593 B2 12/2016 Baum et al.
9,553,738 B2 1/2017 Meenan et al.
9,600,945 B2 3/2017 Naidoo et al.
9,609,003 B1 3/2017 Chmielewski et al.
9,613,524 B1 4/2017 Lamb et al.
9,621,408 B2 4/2017 Gutt et al.
9,674,199 B2 6/2017 Vlaminck et al.
9,721,461 B2 8/2017 Zeng et al.
9,729,342 B2 8/2017 Cohn et al.
9,761,123 B2 9/2017 Ramasubbu et al.
9,779,595 B2 10/2017 Thibault
9,805,587 B2 10/2017 Lamb
9,819,911 B2 11/2017 K V et al.
9,824,234 B2 11/2017 Cho et al.
9,843,458 B2 12/2017 Cronin
9,876,651 B2 1/2018 Cho et al.
9,882,985 B1 1/2018 Esam et al.
9,978,238 B2 5/2018 Fadell et al.
9,979,625 B2 5/2018 McLaughlin et al.
10,002,507 B2 6/2018 Wilson et al.
10,025,473 B2 7/2018 Sarao et al.
10,051,078 B2 8/2018 Burd et al.
10,062,245 B2 8/2018 Fulker et al.
10,062,273 B2 8/2018 Raji et al.
10,078,958 B2 9/2018 Cohn et al.
10,079,839 B1 9/2018 Bryan et al.
10,108,272 B1 10/2018 Debates et al.
10,120,354 B1 11/2018 Rolston et al.
10,237,757 B2 3/2019 Raleigh et al.
10,257,474 B2 4/2019 Nadathur et al.
10,264,138 B2 4/2019 Raleigh et al.

(56) References Cited

U.S. PATENT DOCUMENTS

| | | | |
|---|---|---|---|
| 10,354,517 | B1 | 7/2019 | King |
| 10,380,873 | B1 | 8/2019 | Halverson |
| 10,430,887 | B1 | 10/2019 | Parker et al. |
| 10,609,325 | B2 | 3/2020 | Legris et al. |
| 10,687,270 | B2 | 6/2020 | Ishii |
| 10,782,681 | B1 | 9/2020 | Slavin |
| 10,868,712 | B1 | 12/2020 | Hutz |
| 11,341,825 | B1 | 5/2022 | Palmer |
| 11,417,159 | B2 | 8/2022 | Li et al. |
| 11,678,011 | B1 | 6/2023 | Fu et al. |
| 11,831,662 | B1 | 11/2023 | Johnson |
| 12,462,657 | B1 | 11/2025 | Fu et al. |
| 2001/0012775 | A1 | 8/2001 | Modzelesky et al. |
| 2001/0016501 | A1 | 8/2001 | King |
| 2001/0022836 | A1 | 9/2001 | Bremer et al. |
| 2001/0025349 | A1 | 9/2001 | Sharood et al. |
| 2001/0029585 | A1 | 10/2001 | Simon et al. |
| 2001/0030597 | A1 | 10/2001 | Inoue et al. |
| 2001/0034209 | A1 | 10/2001 | Tong et al. |
| 2001/0034754 | A1 | 10/2001 | Elwahab et al. |
| 2001/0034759 | A1 | 10/2001 | Chiles et al. |
| 2001/0036192 | A1 | 11/2001 | Chiles et al. |
| 2001/0042137 | A1 | 11/2001 | Ota et al. |
| 2001/0044835 | A1 | 11/2001 | Schober et al. |
| 2001/0046366 | A1 | 11/2001 | Susskind |
| 2001/0047474 | A1 | 11/2001 | Takagi et al. |
| 2001/0048030 | A1 | 12/2001 | Sharood et al. |
| 2001/0053207 | A1 | 12/2001 | Jeon et al. |
| 2001/0054115 | A1 | 12/2001 | Ferguson et al. |
| 2002/0000913 | A1 | 1/2002 | Hamamoto et al. |
| 2002/0003575 | A1 | 1/2002 | Marchese |
| 2002/0004828 | A1 | 1/2002 | Davis et al. |
| 2002/0005894 | A1 | 1/2002 | Foodman et al. |
| 2002/0016639 | A1 | 2/2002 | Smith et al. |
| 2002/0018057 | A1 | 2/2002 | Sano |
| 2002/0018478 | A1 | 2/2002 | Takeyama et al. |
| 2002/0019751 | A1 | 2/2002 | Rothschild et al. |
| 2002/0026476 | A1 | 2/2002 | Miyazaki et al. |
| 2002/0026531 | A1 | 2/2002 | Keane et al. |
| 2002/0027504 | A1 | 3/2002 | Davis et al. |
| 2002/0028696 | A1 | 3/2002 | Hirayama et al. |
| 2002/0031120 | A1 | 3/2002 | Rakib |
| 2002/0032853 | A1 | 3/2002 | Preston et al. |
| 2002/0035633 | A1 | 3/2002 | Bose et al. |
| 2002/0037004 | A1 | 3/2002 | Bossemeyer et al. |
| 2002/0038380 | A1 | 3/2002 | Brawn et al. |
| 2002/0046280 | A1 | 4/2002 | Fujita |
| 2002/0046301 | A1 | 4/2002 | Shannon et al. |
| 2002/0052719 | A1 | 5/2002 | Alexander et al. |
| 2002/0052913 | A1 | 5/2002 | Yamada et al. |
| 2002/0055977 | A1 | 5/2002 | Nishi |
| 2002/0059078 | A1 | 5/2002 | Valdes et al. |
| 2002/0059148 | A1 | 5/2002 | Rosenhaft et al. |
| 2002/0059637 | A1 | 5/2002 | Rakib |
| 2002/0065828 | A1 | 5/2002 | Goodspeed |
| 2002/0068558 | A1 | 6/2002 | Janik |
| 2002/0068984 | A1 | 6/2002 | Alexander et al. |
| 2002/0072868 | A1 | 6/2002 | Bartone et al. |
| 2002/0075153 | A1 | 6/2002 | Dahl |
| 2002/0080771 | A1 | 6/2002 | Krumel |
| 2002/0083342 | A1 | 6/2002 | Webb et al. |
| 2002/0085488 | A1 | 7/2002 | Kobayashi |
| 2002/0091815 | A1 | 7/2002 | Anderson et al. |
| 2002/0099809 | A1 | 7/2002 | Lee |
| 2002/0099829 | A1 | 7/2002 | Richards et al. |
| 2002/0099854 | A1 | 7/2002 | Jorgensen |
| 2002/0101858 | A1 | 8/2002 | Stuart et al. |
| 2002/0103898 | A1 | 8/2002 | Moyer et al. |
| 2002/0103927 | A1 | 8/2002 | Parent |
| 2002/0107910 | A1 | 8/2002 | Zhao |
| 2002/0109580 | A1 | 8/2002 | Shreve et al. |
| 2002/0111698 | A1 | 8/2002 | Graziano et al. |
| 2002/0114439 | A1 | 8/2002 | Dunlap |
| 2002/0116117 | A1 | 8/2002 | Martens et al. |
| 2002/0119800 | A1 | 8/2002 | Jaggers et al. |
| 2002/0120696 | A1 | 8/2002 | Mousseau et al. |
| 2002/0120698 | A1 | 8/2002 | Tamargo |
| 2002/0120790 | A1 | 8/2002 | Schwalb |
| 2002/0126009 | A1 | 9/2002 | Oyagi et al. |
| 2002/0128728 | A1 | 9/2002 | Murakami et al. |
| 2002/0131404 | A1 | 9/2002 | Mehta et al. |
| 2002/0133539 | A1 | 9/2002 | Monday |
| 2002/0133578 | A1 | 9/2002 | Wu |
| 2002/0136167 | A1 | 9/2002 | Steele et al. |
| 2002/0143805 | A1 | 10/2002 | Hayes et al. |
| 2002/0143923 | A1 | 10/2002 | Alexander |
| 2002/0150086 | A1 | 10/2002 | Bailey et al. |
| 2002/0152298 | A1 | 10/2002 | Kikta et al. |
| 2002/0152432 | A1 | 10/2002 | Fleming |
| 2002/0156564 | A1 | 10/2002 | Preston et al. |
| 2002/0156899 | A1 | 10/2002 | Sekiguchi |
| 2002/0161885 | A1 | 10/2002 | Childers et al. |
| 2002/0163534 | A1 | 11/2002 | Choi et al. |
| 2002/0163997 | A1 | 11/2002 | Bergman et al. |
| 2002/0164953 | A1 | 11/2002 | Curtis |
| 2002/0164997 | A1 | 11/2002 | Parry |
| 2002/0165006 | A1 | 11/2002 | Haller et al. |
| 2002/0166125 | A1 | 11/2002 | Fulmer |
| 2002/0174367 | A1 | 11/2002 | Kimmel et al. |
| 2002/0174434 | A1 | 11/2002 | Lee et al. |
| 2002/0177428 | A1 | 11/2002 | Menard et al. |
| 2002/0177482 | A1 | 11/2002 | Cheong et al. |
| 2002/0178100 | A1 | 11/2002 | Koveos |
| 2002/0178211 | A1 | 11/2002 | Singhal et al. |
| 2002/0180579 | A1 | 12/2002 | Nagaoka et al. |
| 2002/0184301 | A1 | 12/2002 | Parent |
| 2002/0184527 | A1 | 12/2002 | Chun et al. |
| 2002/0186683 | A1 | 12/2002 | Buck et al. |
| 2002/0188723 | A1 | 12/2002 | Choi et al. |
| 2002/0191636 | A1 | 12/2002 | Hallenbeck |
| 2003/0004088 | A1 | 1/2003 | Ushio et al. |
| 2003/0005030 | A1 | 1/2003 | Sutton et al. |
| 2003/0006879 | A1 | 1/2003 | Kang et al. |
| 2003/0009552 | A1 | 1/2003 | Benfield et al. |
| 2003/0009553 | A1 | 1/2003 | Benfield et al. |
| 2003/0010243 | A1 | 1/2003 | Roller |
| 2003/0023839 | A1 | 1/2003 | Burkhardt et al. |
| 2003/0025599 | A1 | 2/2003 | Monroe |
| 2003/0028294 | A1 | 2/2003 | Yanagi |
| 2003/0028398 | A1 | 2/2003 | Yamashita et al. |
| 2003/0030548 | A1 | 2/2003 | Kovacs et al. |
| 2003/0031165 | A1 | 2/2003 | James |
| 2003/0038730 | A1 | 2/2003 | Imafuku et al. |
| 2003/0038849 | A1 | 2/2003 | Craven et al. |
| 2003/0039242 | A1 | 2/2003 | Richard |
| 2003/0040813 | A1 | 2/2003 | Gonzales et al. |
| 2003/0041137 | A1 | 2/2003 | Horie et al. |
| 2003/0041167 | A1 | 2/2003 | French et al. |
| 2003/0046557 | A1 | 3/2003 | Miller et al. |
| 2003/0050731 | A1 | 3/2003 | Rosenblum |
| 2003/0050737 | A1 | 3/2003 | Osann |
| 2003/0051009 | A1 | 3/2003 | Shah et al. |
| 2003/0051026 | A1 | 3/2003 | Carter et al. |
| 2003/0052905 | A1 | 3/2003 | Gordon et al. |
| 2003/0052923 | A1 | 3/2003 | Porter |
| 2003/0056012 | A1 | 3/2003 | Modeste et al. |
| 2003/0056014 | A1 | 3/2003 | Verberkt et al. |
| 2003/0059005 | A1 | 3/2003 | Meyerson et al. |
| 2003/0060900 | A1 | 3/2003 | Lo et al. |
| 2003/0061344 | A1 | 3/2003 | Monroe |
| 2003/0061621 | A1 | 3/2003 | Petty et al. |
| 2003/0065757 | A1 | 4/2003 | Mentze et al. |
| 2003/0065784 | A1 | 4/2003 | Herrod |
| 2003/0065791 | A1 | 4/2003 | Garg et al. |
| 2003/0067923 | A1 | 4/2003 | Ju et al. |
| 2003/0069854 | A1 | 4/2003 | Hsu et al. |
| 2003/0069948 | A1 | 4/2003 | Ma et al. |
| 2003/0071724 | A1 | 4/2003 | D'Amico |
| 2003/0071840 | A1 | 4/2003 | Huang et al. |
| 2003/0073406 | A1 | 4/2003 | Benjamin et al. |
| 2003/0074090 | A1 | 4/2003 | Becka et al. |
| 2003/0076852 | A1 | 4/2003 | Fukui |
| 2003/0081768 | A1 | 5/2003 | Caminschi |
| 2003/0084165 | A1 | 5/2003 | Nellberg et al. |

(56) References Cited

U.S. PATENT DOCUMENTS

2003/0090473 A1 5/2003 Joshi
2003/0096590 A1 5/2003 Satoh
2003/0101243 A1 5/2003 Donahue et al.
2003/0101459 A1 5/2003 Edson
2003/0103088 A1 6/2003 Dresti et al.
2003/0105850 A1 6/2003 Lean et al.
2003/0110262 A1 6/2003 Hasan et al.
2003/0110302 A1 6/2003 Hodges et al.
2003/0112866 A1 6/2003 Yu et al.
2003/0113100 A1 6/2003 Hecht et al.
2003/0115345 A1 6/2003 Chien et al.
2003/0120593 A1 6/2003 Bansal et al.
2003/0123419 A1 7/2003 Rangnekar et al.
2003/0123634 A1 7/2003 Chee
2003/0126236 A1 7/2003 Marl et al.
2003/0128114 A1 7/2003 Quigley
2003/0128115 A1 7/2003 Giacopelli et al.
2003/0132018 A1 7/2003 Okita et al.
2003/0134590 A1 7/2003 Suda et al.
2003/0137426 A1 7/2003 Anthony et al.
2003/0137991 A1 7/2003 Doshi et al.
2003/0147534 A1 8/2003 Ablay et al.
2003/0149671 A1 8/2003 Yamamoto et al.
2003/0153325 A1 8/2003 Veerepalli et al.
2003/0155757 A1 8/2003 Larsen et al.
2003/0158609 A1 8/2003 Chiu
2003/0158635 A1 8/2003 Pillar et al.
2003/0159135 A1 8/2003 Hiller et al.
2003/0163514 A1 8/2003 Waldschmidt
2003/0169728 A1 9/2003 Choi
2003/0172145 A1 9/2003 Nguyen
2003/0174051 A1 9/2003 Naitou
2003/0174154 A1 9/2003 Yukie et al.
2003/0174648 A1 9/2003 Wang et al.
2003/0174717 A1 9/2003 Zabarski et al.
2003/0177236 A1 9/2003 Goto et al.
2003/0182396 A1 9/2003 Reich et al.
2003/0182640 A1 9/2003 Alani et al.
2003/0184436 A1 10/2003 Seales et al.
2003/0187920 A1 10/2003 Redkar
2003/0187938 A1 10/2003 Mousseau et al.
2003/0189509 A1 10/2003 Hayes et al.
2003/0193991 A1 10/2003 Lansford
2003/0196115 A1 10/2003 Karp
2003/0197847 A1 10/2003 Shinoda
2003/0198938 A1 10/2003 Murray et al.
2003/0200325 A1 10/2003 Krishnaswamy et al.
2003/0201889 A1 10/2003 Zulkowski
2003/0208610 A1 11/2003 Rochetti et al.
2003/0210126 A1 11/2003 Kanazawa
2003/0214775 A1 11/2003 Fukuta et al.
2003/0216143 A1 11/2003 Roese et al.
2003/0217136 A1 11/2003 Cho et al.
2003/0225883 A1 12/2003 Greaves et al.
2003/0227382 A1 12/2003 Breed
2003/0227439 A1 12/2003 Lee et al.
2003/0229779 A1 12/2003 Morais et al.
2003/0230934 A1 12/2003 Cordelli et al.
2003/0233155 A1 12/2003 Slemmer et al.
2003/0233332 A1 12/2003 Keeler et al.
2003/0233429 A1 12/2003 Matte et al.
2003/0233549 A1 12/2003 Hatakeyama et al.
2003/0233583 A1 12/2003 Carley
2003/0233594 A1 12/2003 Earl
2003/0236841 A1 12/2003 Epshteyn
2004/0003051 A1 1/2004 Krzyzanowski et al.
2004/0003241 A1 1/2004 Sengodan et al.
2004/0005039 A1 1/2004 White et al.
2004/0008724 A1 1/2004 Devine et al.
2004/0015572 A1 1/2004 Kang
2004/0019489 A1 1/2004 Funk et al.
2004/0034697 A1 2/2004 Fairhurst et al.
2004/0034798 A1 2/2004 Yamada et al.
2004/0036615 A1 2/2004 Candela
2004/0037295 A1 2/2004 Tanaka et al.
2004/0039459 A1 2/2004 Daugherty et al.
2004/0049321 A1 3/2004 Lehr et al.
2004/0054789 A1 3/2004 Breh et al.
2004/0056665 A1 3/2004 Iwanaga et al.
2004/0064351 A1 4/2004 Mikurak
2004/0068583 A1 4/2004 Monroe et al.
2004/0068657 A1 4/2004 Alexander et al.
2004/0068668 A1 4/2004 Lor et al.
2004/0075738 A1 4/2004 Burke et al.
2004/0078825 A1 4/2004 Murphy
2004/0083015 A1 4/2004 Patwari
2004/0086093 A1 5/2004 Schranz
2004/0093492 A1 5/2004 Daude et al.
2004/0095943 A1 5/2004 Korotin
2004/0102859 A1 5/2004 Bennett
2004/0103308 A1 5/2004 Paller
2004/0107027 A1 6/2004 Boudrieau
2004/0107299 A1 6/2004 Lee et al.
2004/0111294 A1 6/2004 McNally et al.
2004/0113770 A1 6/2004 Falk et al.
2004/0113778 A1 6/2004 Script et al.
2004/0113937 A1 6/2004 Sawdey et al.
2004/0117068 A1 6/2004 Lee
2004/0117330 A1 6/2004 Ehlers et al.
2004/0117462 A1 6/2004 Bodin et al.
2004/0117465 A1 6/2004 Bodin et al.
2004/0125146 A1 7/2004 Gerlach et al.
2004/0125782 A1 7/2004 Chang
2004/0125931 A1 7/2004 Archer
2004/0133689 A1 7/2004 Vasisht
2004/0136386 A1 7/2004 Miller et al.
2004/0137915 A1 7/2004 Diener et al.
2004/0139227 A1 7/2004 Takeda
2004/0143428 A1 7/2004 Rappaport et al.
2004/0143602 A1 7/2004 Ruiz et al.
2004/0143749 A1 7/2004 Tajalli et al.
2004/0153171 A1 8/2004 Brandt et al.
2004/0155757 A1 8/2004 Litwin et al.
2004/0160309 A1 8/2004 Stilp
2004/0163073 A1 8/2004 Krzyzanowski et al.
2004/0163118 A1 8/2004 Mottur
2004/0163705 A1 8/2004 Uhler
2004/0169288 A1 9/2004 Hsieh et al.
2004/0170120 A1 9/2004 Reunamaki et al.
2004/0170155 A1 9/2004 Omar et al.
2004/0172657 A1 9/2004 Phillips et al.
2004/0177163 A1 9/2004 Casey et al.
2004/0181693 A1 9/2004 Milliot et al.
2004/0183756 A1 9/2004 Freitas et al.
2004/0189471 A1 9/2004 Ciarcia et al.
2004/0189871 A1 9/2004 Kurosawa et al.
2004/0196844 A1 10/2004 Hagino
2004/0198386 A1 10/2004 Dupray
2004/0199645 A1 10/2004 Rouhi
2004/0201472 A1 10/2004 McGunn et al.
2004/0202351 A1 10/2004 Park et al.
2004/0204806 A1 10/2004 Chen et al.
2004/0212494 A1 10/2004 Stilp
2004/0212687 A1 10/2004 Patwari
2004/0213150 A1 10/2004 Krause et al.
2004/0215694 A1 10/2004 Podolsky
2004/0215700 A1 10/2004 Shenfield et al.
2004/0215750 A1 10/2004 Stilp
2004/0215955 A1 10/2004 Tamai et al.
2004/0218591 A1 11/2004 Ogawa et al.
2004/0220830 A1 11/2004 Moreton et al.
2004/0223605 A1 11/2004 Donnelly
2004/0225516 A1 11/2004 Bruskotter et al.
2004/0225719 A1 11/2004 Kisley et al.
2004/0225878 A1 11/2004 Costa-Requena et al.
2004/0229569 A1 11/2004 Franz
2004/0243714 A1 12/2004 Wynn et al.
2004/0243835 A1 12/2004 Terzis et al.
2004/0243996 A1 12/2004 Sheehy et al.
2004/0246339 A1 12/2004 Ooshima et al.
2004/0249613 A1 12/2004 Sprogis et al.
2004/0249922 A1 12/2004 Hackman et al.
2004/0253926 A1 12/2004 Gross
2004/0257433 A1 12/2004 Lia et al.

(56) References Cited

U.S. PATENT DOCUMENTS

| | | | |
|---|---|---|---|
| 2004/0258032 | A1 | 12/2004 | Kawamura |
| 2004/0260407 | A1 | 12/2004 | Wimsatt |
| 2004/0260527 | A1 | 12/2004 | Stanculescu |
| 2004/0263314 | A1 | 12/2004 | Dorai et al. |
| 2004/0263625 | A1 | 12/2004 | Ishigami et al. |
| 2004/0263626 | A1 | 12/2004 | Piccionelli |
| 2004/0266493 | A1 | 12/2004 | Bahl et al. |
| 2004/0267385 | A1 | 12/2004 | Lingemann |
| 2004/0267937 | A1 | 12/2004 | Klemets |
| 2004/0268298 | A1 | 12/2004 | Miller et al. |
| 2005/0002335 | A1 | 1/2005 | Adamczyk et al. |
| 2005/0002408 | A1 | 1/2005 | Lee |
| 2005/0002417 | A1 | 1/2005 | Kelly et al. |
| 2005/0007967 | A1 | 1/2005 | Keskar et al. |
| 2005/0010866 | A1 | 1/2005 | Humpleman et al. |
| 2005/0015458 | A1 | 1/2005 | La |
| 2005/0015805 | A1 | 1/2005 | Iwamura |
| 2005/0021309 | A1 | 1/2005 | Alexander et al. |
| 2005/0021626 | A1 | 1/2005 | Prajapat et al. |
| 2005/0021710 | A1 | 1/2005 | Johnson et al. |
| 2005/0021826 | A1 | 1/2005 | Kumar |
| 2005/0022210 | A1 | 1/2005 | Zintel et al. |
| 2005/0023858 | A1 | 2/2005 | Bingle et al. |
| 2005/0024203 | A1 | 2/2005 | Wolfe |
| 2005/0027881 | A1 | 2/2005 | Figueira et al. |
| 2005/0030928 | A1 | 2/2005 | Virtanen et al. |
| 2005/0031108 | A1 | 2/2005 | Eshun et al. |
| 2005/0033513 | A1 | 2/2005 | Gasbarro |
| 2005/0038325 | A1 | 2/2005 | Moll |
| 2005/0038326 | A1 | 2/2005 | Mathur |
| 2005/0044061 | A1 | 2/2005 | Klemow |
| 2005/0048957 | A1 | 3/2005 | Casey et al. |
| 2005/0049746 | A1 | 3/2005 | Rosenblum |
| 2005/0050214 | A1 | 3/2005 | Nishiyama et al. |
| 2005/0052831 | A1 | 3/2005 | Chen |
| 2005/0055575 | A1 | 3/2005 | Evans et al. |
| 2005/0055716 | A1 | 3/2005 | Louie et al. |
| 2005/0057361 | A1 | 3/2005 | Giraldo et al. |
| 2005/0060163 | A1 | 3/2005 | Barsness et al. |
| 2005/0060411 | A1 | 3/2005 | Coulombe et al. |
| 2005/0063336 | A1 | 3/2005 | Kim et al. |
| 2005/0066045 | A1 | 3/2005 | Johnson et al. |
| 2005/0066912 | A1 | 3/2005 | Korbitz et al. |
| 2005/0069098 | A1 | 3/2005 | Kalervo et al. |
| 2005/0071483 | A1 | 3/2005 | Motoyama |
| 2005/0075764 | A1 | 4/2005 | Horst et al. |
| 2005/0079855 | A1 | 4/2005 | Jethi et al. |
| 2005/0079863 | A1 | 4/2005 | Macaluso |
| 2005/0081161 | A1 | 4/2005 | MacInnes et al. |
| 2005/0086093 | A1 | 4/2005 | Hammad et al. |
| 2005/0086126 | A1 | 4/2005 | Patterson |
| 2005/0086211 | A1 | 4/2005 | Mayer |
| 2005/0086366 | A1 | 4/2005 | Luebke et al. |
| 2005/0088983 | A1 | 4/2005 | Wesslen et al. |
| 2005/0089023 | A1 | 4/2005 | Barkley et al. |
| 2005/0090915 | A1 | 4/2005 | Geiwitz |
| 2005/0091435 | A1 | 4/2005 | Han et al. |
| 2005/0091696 | A1 | 4/2005 | Wolfe et al. |
| 2005/0096753 | A1 | 5/2005 | Arling et al. |
| 2005/0101314 | A1 | 5/2005 | Levi |
| 2005/0102152 | A1 | 5/2005 | Hodges |
| 2005/0102497 | A1 | 5/2005 | Buer |
| 2005/0105530 | A1 | 5/2005 | Kono |
| 2005/0108091 | A1 | 5/2005 | Sotak et al. |
| 2005/0108369 | A1 | 5/2005 | Sather et al. |
| 2005/0111660 | A1 | 5/2005 | Hosoda |
| 2005/0114432 | A1 | 5/2005 | Hodges et al. |
| 2005/0114528 | A1 | 5/2005 | Suito |
| 2005/0114900 | A1 | 5/2005 | Ladd et al. |
| 2005/0117602 | A1 | 6/2005 | Carrigan et al. |
| 2005/0117732 | A1 | 6/2005 | Arpin |
| 2005/0119767 | A1 | 6/2005 | Kiwimagi et al. |
| 2005/0119913 | A1 | 6/2005 | Hornreich et al. |
| 2005/0120082 | A1 | 6/2005 | Hesselink et al. |
| 2005/0125083 | A1 | 6/2005 | Kiko |
| 2005/0128083 | A1 | 6/2005 | Puzio et al. |
| 2005/0128093 | A1 | 6/2005 | Genova et al. |
| 2005/0128314 | A1 | 6/2005 | Ishino |
| 2005/0144044 | A1 | 6/2005 | Godschall et al. |
| 2005/0144312 | A1 | 6/2005 | Kadyk et al. |
| 2005/0144645 | A1 | 6/2005 | Casey et al. |
| 2005/0148356 | A1 | 7/2005 | Ferguson et al. |
| 2005/0149639 | A1 | 7/2005 | Vrielink et al. |
| 2005/0149746 | A1 | 7/2005 | Lu et al. |
| 2005/0154494 | A1 | 7/2005 | Ahmed |
| 2005/0154774 | A1 | 7/2005 | Giaffreda et al. |
| 2005/0155757 | A1 | 7/2005 | Paton |
| 2005/0156568 | A1 | 7/2005 | Yueh |
| 2005/0156737 | A1 | 7/2005 | Al-Khateeb |
| 2005/0159823 | A1 | 7/2005 | Hayes et al. |
| 2005/0159911 | A1 | 7/2005 | Funk et al. |
| 2005/0169288 | A1 | 8/2005 | Kamiwada et al. |
| 2005/0177515 | A1 | 8/2005 | Kalavade et al. |
| 2005/0179531 | A1 | 8/2005 | Tabe |
| 2005/0181196 | A1 | 8/2005 | Aylward et al. |
| 2005/0182681 | A1 | 8/2005 | Bruskotter et al. |
| 2005/0184865 | A1 | 8/2005 | Han |
| 2005/0185618 | A1 | 8/2005 | Friday et al. |
| 2005/0187677 | A1 | 8/2005 | Walker |
| 2005/0188315 | A1 | 8/2005 | Campbell et al. |
| 2005/0197847 | A1 | 9/2005 | Smith |
| 2005/0198216 | A1 | 9/2005 | Behera et al. |
| 2005/0200474 | A1 | 9/2005 | Behnke |
| 2005/0204076 | A1 | 9/2005 | Cumpson et al. |
| 2005/0207429 | A1 | 9/2005 | Akita et al. |
| 2005/0216302 | A1 | 9/2005 | Raji et al. |
| 2005/0220123 | A1 | 10/2005 | Wybenga et al. |
| 2005/0222933 | A1 | 10/2005 | Wesby |
| 2005/0229016 | A1 | 10/2005 | Addy |
| 2005/0232242 | A1 | 10/2005 | Karaoguz et al. |
| 2005/0232284 | A1 | 10/2005 | Karaoguz et al. |
| 2005/0234568 | A1 | 10/2005 | Chung et al. |
| 2005/0237182 | A1 | 10/2005 | Wang |
| 2005/0246119 | A1 | 11/2005 | Koodali |
| 2005/0246408 | A1 | 11/2005 | Chung |
| 2005/0249199 | A1 | 11/2005 | Albert et al. |
| 2005/0253709 | A1 | 11/2005 | Baker |
| 2005/0256608 | A1 | 11/2005 | King et al. |
| 2005/0257013 | A1 | 11/2005 | Ma |
| 2005/0257260 | A1 | 11/2005 | Lenoir et al. |
| 2005/0259673 | A1 | 11/2005 | Lu et al. |
| 2005/0262241 | A1 | 11/2005 | Gubbi et al. |
| 2005/0266826 | A1 | 12/2005 | Vlad |
| 2005/0267605 | A1 | 12/2005 | Lee et al. |
| 2005/0270151 | A1 | 12/2005 | Winick |
| 2005/0273831 | A1 | 12/2005 | Slomovich et al. |
| 2005/0276389 | A1 | 12/2005 | Hinkson et al. |
| 2005/0277434 | A1 | 12/2005 | Tuomi et al. |
| 2005/0280964 | A1 | 12/2005 | Richmond et al. |
| 2005/0281196 | A1 | 12/2005 | Tornetta et al. |
| 2005/0282557 | A1 | 12/2005 | Mikko et al. |
| 2005/0285934 | A1 | 12/2005 | Carter |
| 2005/0285941 | A1 | 12/2005 | Haigh et al. |
| 2005/0286518 | A1 | 12/2005 | Park et al. |
| 2006/0007005 | A1 | 1/2006 | Yui et al. |
| 2006/0009863 | A1 | 1/2006 | Lingemann |
| 2006/0015943 | A1 | 1/2006 | Mahieu |
| 2006/0018328 | A1 | 1/2006 | Mody et al. |
| 2006/0018479 | A1 | 1/2006 | Chen |
| 2006/0022816 | A1 | 2/2006 | Yukawa |
| 2006/0023847 | A1 | 2/2006 | Tyroler et al. |
| 2006/0026017 | A1 | 2/2006 | Walker |
| 2006/0026301 | A1 | 2/2006 | Maeda et al. |
| 2006/0028997 | A1 | 2/2006 | McFarland |
| 2006/0031426 | A1 | 2/2006 | Mesarina et al. |
| 2006/0031436 | A1 | 2/2006 | Sakata et al. |
| 2006/0031852 | A1 | 2/2006 | Chu et al. |
| 2006/0036750 | A1 | 2/2006 | Ladd et al. |
| 2006/0041655 | A1 | 2/2006 | Holloway et al. |
| 2006/0045074 | A1 | 3/2006 | Lee |
| 2006/0050692 | A1 | 3/2006 | Petrescu et al. |
| 2006/0050862 | A1 | 3/2006 | Shen et al. |
| 2006/0051122 | A1 | 3/2006 | Kawazu et al. |
| 2006/0052884 | A1 | 3/2006 | Staples et al. |

(56) References Cited

U.S. PATENT DOCUMENTS

2006/0053447 A1 3/2006 Krzyzanowski et al.
2006/0053459 A1 3/2006 Simerly et al.
2006/0053491 A1 3/2006 Khuti et al.
2006/0058923 A1 3/2006 Kruk et al.
2006/0063534 A1 3/2006 Kokkonen et al.
2006/0064305 A1 3/2006 Alonso
2006/0064478 A1 3/2006 Sirkin
2006/0067344 A1 3/2006 Sakurai
2006/0067356 A1 3/2006 Kim et al.
2006/0067484 A1 3/2006 Elliot et al.
2006/0071773 A1 4/2006 Ahmed et al.
2006/0072470 A1 4/2006 Moore et al.
2006/0075235 A1 4/2006 Renkis
2006/0077254 A1 4/2006 Shu et al.
2006/0078344 A1 4/2006 Kawazu et al.
2006/0080380 A1 4/2006 Aizu et al.
2006/0080465 A1 4/2006 Conzola et al.
2006/0082651 A1 4/2006 Hirafuji et al.
2006/0085831 A1 4/2006 Jones et al.
2006/0088092 A1 4/2006 Chen et al.
2006/0092955 A1 5/2006 Durbin et al.
2006/0093365 A1 5/2006 Dybsetter et al.
2006/0094400 A1 5/2006 Beachem et al.
2006/0101062 A1 5/2006 Godman et al.
2006/0103510 A1 5/2006 Chen et al.
2006/0104312 A1 5/2006 Friar
2006/0105713 A1 5/2006 Zheng et al.
2006/0106933 A1 5/2006 Huang et al.
2006/0109113 A1 5/2006 Reyes et al.
2006/0109860 A1 5/2006 Matsunaga et al.
2006/0109966 A1 5/2006 Sasakura et al.
2006/0111095 A1 5/2006 Weigand
2006/0114842 A1 6/2006 Miyamoto et al.
2006/0121924 A1 6/2006 Rengaraju et al.
2006/0122774 A1 6/2006 Nou
2006/0123212 A1 6/2006 Yagawa
2006/0129837 A1 6/2006 Im et al.
2006/0130004 A1 6/2006 Hughes et al.
2006/0132302 A1 6/2006 Stilp
2006/0133412 A1 6/2006 Callaghan
2006/0136558 A1 6/2006 Sheehan et al.
2006/0142968 A1 6/2006 Han et al.
2006/0142978 A1 6/2006 Suenbuel et al.
2006/0143268 A1 6/2006 Chatani
2006/0145842 A1 7/2006 Stilp
2006/0153122 A1 7/2006 Hinman et al.
2006/0154642 A1 7/2006 Scannell
2006/0155851 A1 7/2006 Ma et al.
2006/0159032 A1 7/2006 Ukrainetz et al.
2006/0161270 A1 7/2006 Luskin et al.
2006/0161662 A1 7/2006 Ng et al.
2006/0161960 A1 7/2006 Benoit
2006/0167784 A1 7/2006 Hoffberg
2006/0167919 A1 7/2006 Hsieh
2006/0168013 A1 7/2006 Wilson et al.
2006/0168095 A1 7/2006 Sharma et al.
2006/0168178 A1 7/2006 Hwang et al.
2006/0168190 A1 7/2006 Johan et al.
2006/0171307 A1 8/2006 Gopalakrishnan et al.
2006/0176146 A1 8/2006 Krishan et al.
2006/0176167 A1 8/2006 Dohrmann
2006/0181406 A1 8/2006 Petite et al.
2006/0182100 A1 8/2006 Li et al.
2006/0187900 A1 8/2006 Akbar
2006/0189311 A1 8/2006 Cromer et al.
2006/0190458 A1 8/2006 Mishina et al.
2006/0190529 A1 8/2006 Morozumi et al.
2006/0197660 A1 9/2006 Luebke et al.
2006/0200845 A1 9/2006 Foster et al.
2006/0206220 A1 9/2006 Amundson
2006/0206246 A1 9/2006 Walker
2006/0208872 A1 9/2006 Yu et al.
2006/0208880 A1 9/2006 Funk et al.
2006/0209857 A1 9/2006 Hicks
2006/0215650 A1 9/2006 Wollmershauser et al.
2006/0217115 A1 9/2006 Cassett et al.
2006/0218244 A1 9/2006 Rasmussen et al.
2006/0218593 A1 9/2006 Afshary et al.
2006/0221184 A1 10/2006 Vallone et al.
2006/0222153 A1 10/2006 Tarkoff et al.
2006/0226972 A1 10/2006 Smith
2006/0229746 A1 10/2006 Ollis et al.
2006/0230270 A1 10/2006 Goffin
2006/0233372 A1 10/2006 Shaheen et al.
2006/0235963 A1 10/2006 Wetherly et al.
2006/0236050 A1 10/2006 Sugimoto et al.
2006/0238372 A1 10/2006 Jung et al.
2006/0238617 A1 10/2006 Tamir
2006/0242395 A1 10/2006 Fausak
2006/0244589 A1 11/2006 Schranz
2006/0245369 A1 11/2006 Schimmelpfeng et al.
2006/0246886 A1 11/2006 Benco et al.
2006/0246919 A1 11/2006 Park et al.
2006/0250235 A1 11/2006 Astrin
2006/0250578 A1 11/2006 Pohl et al.
2006/0251255 A1 11/2006 Batta
2006/0258342 A1 11/2006 Fok et al.
2006/0259951 A1 11/2006 Forssell et al.
2006/0265489 A1 11/2006 Moore
2006/0271695 A1 11/2006 Lavian
2006/0274764 A1 12/2006 Mah et al.
2006/0281435 A1 12/2006 Shearer et al.
2006/0282886 A1 12/2006 Gaug
2006/0288288 A1 12/2006 Girgensohn et al.
2006/0291507 A1 12/2006 Sarosi et al.
2006/0293100 A1 12/2006 Walter
2006/0294565 A1 12/2006 Walter
2007/0001818 A1 1/2007 Small et al.
2007/0002833 A1 1/2007 Bajic
2007/0005736 A1 1/2007 Hansen et al.
2007/0005957 A1 1/2007 Sahita et al.
2007/0006177 A1 1/2007 Aiber et al.
2007/0008099 A1 1/2007 Kimmel et al.
2007/0014248 A1 1/2007 Fowlow
2007/0027987 A1 2/2007 Tripp et al.
2007/0043478 A1 2/2007 Ehlers et al.
2007/0043766 A1 2/2007 Nicholas et al.
2007/0043954 A1 2/2007 Fox
2007/0046442 A1 3/2007 Bartorelli et al.
2007/0046462 A1 3/2007 Fancella
2007/0047585 A1 3/2007 Gillespie et al.
2007/0052675 A1 3/2007 Chang
2007/0055759 A1 3/2007 McCoy et al.
2007/0055770 A1 3/2007 Karmakar et al.
2007/0058627 A1 3/2007 Smith et al.
2007/0058634 A1* 3/2007 Gupta .................... H04L 67/12 370/392
2007/0061018 A1 3/2007 Callaghan et al.
2007/0061020 A1 3/2007 Bovee et al.
2007/0061266 A1 3/2007 Moore et al.
2007/0061430 A1 3/2007 Kim
2007/0061878 A1 3/2007 Hagiu et al.
2007/0063836 A1 3/2007 Hayden et al.
2007/0063866 A1 3/2007 Webb
2007/0064714 A1 3/2007 Bi et al.
2007/0067780 A1 3/2007 Kumar et al.
2007/0079012 A1 4/2007 Walker
2007/0079151 A1 4/2007 Connor et al.
2007/0079385 A1 4/2007 Williams et al.
2007/0083668 A1 4/2007 Kelsey et al.
2007/0085671 A1 4/2007 Martin et al.
2007/0090944 A1 4/2007 Du Breuil
2007/0094716 A1 4/2007 Farino et al.
2007/0096981 A1 5/2007 Abraham
2007/0101345 A1 5/2007 Takagi
2007/0105072 A1 5/2007 Koljonen
2007/0106124 A1 5/2007 Kuriyama et al.
2007/0106536 A1 5/2007 Moore
2007/0106547 A1 5/2007 Agrawal
2007/0109975 A1 5/2007 Reckamp et al.
2007/0116020 A1 5/2007 Cheever et al.
2007/0117464 A1 5/2007 Freeman
2007/0118609 A1 5/2007 Mullan et al.
2007/0126875 A1 6/2007 Miyamaki

(56) References Cited

U.S. PATENT DOCUMENTS

2007/0127510 A1 6/2007 Bossemeyer et al.
2007/0130457 A1 6/2007 Kamat et al.
2007/0132576 A1 6/2007 Kolavennu et al.
2007/0136759 A1 6/2007 Zhang et al.
2007/0140267 A1 6/2007 Yang
2007/0142022 A1 6/2007 Madonna et al.
2007/0142044 A1 6/2007 Fitzgerald et al.
2007/0143400 A1 6/2007 Kelley et al.
2007/0143440 A1 6/2007 Reckamp et al.
2007/0146127 A1 6/2007 Stilp et al.
2007/0146484 A1 6/2007 Horton et al.
2007/0147419 A1 6/2007 Tsujimoto et al.
2007/0150616 A1 6/2007 Baek et al.
2007/0154010 A1 7/2007 Wong
2007/0155325 A1 7/2007 Bambic et al.
2007/0155423 A1 7/2007 Carmody et al.
2007/0156689 A1 7/2007 Meek et al.
2007/0160017 A1 7/2007 Meier et al.
2007/0161372 A1 7/2007 Rogalski et al.
2007/0162228 A1 7/2007 Mitchell
2007/0162680 A1 7/2007 Mitchell
2007/0164779 A1 7/2007 Weston et al.
2007/0168860 A1 7/2007 Takayama et al.
2007/0176760 A1 8/2007 Reeves et al.
2007/0176766 A1 8/2007 Cheng
2007/0182543 A1 8/2007 Luo
2007/0182819 A1 8/2007 Monroe
2007/0183345 A1 8/2007 Fahim et al.
2007/0185989 A1 8/2007 Corbett et al.
2007/0192486 A1 8/2007 Wilson et al.
2007/0192863 A1 8/2007 Kapoor et al.
2007/0197236 A1 8/2007 Ahn et al.
2007/0198698 A1 8/2007 Boyd et al.
2007/0200658 A1 8/2007 Yang
2007/0208521 A1 9/2007 Petite et al.
2007/0214262 A1 9/2007 Buchbinder et al.
2007/0214264 A1 9/2007 Koister
2007/0216764 A1 9/2007 Kwak
2007/0216783 A1 9/2007 Ortiz et al.
2007/0218895 A1 9/2007 Saito et al.
2007/0223465 A1 9/2007 Wang et al.
2007/0223500 A1 9/2007 Lee et al.
2007/0226182 A1 9/2007 Sobotka et al.
2007/0230415 A1 10/2007 Malik
2007/0230744 A1 10/2007 Dronge
2007/0245223 A1 10/2007 Siedzik et al.
2007/0249323 A1 10/2007 Lee et al.
2007/0253361 A1 11/2007 Pristas et al.
2007/0255856 A1 11/2007 Reckamp et al.
2007/0256105 A1 11/2007 Tabe
2007/0257986 A1 11/2007 Ivanov et al.
2007/0260713 A1 11/2007 Moorer et al.
2007/0262857 A1 11/2007 Jackson
2007/0263782 A1 11/2007 Stock et al.
2007/0265866 A1 11/2007 Fehling et al.
2007/0271398 A1 11/2007 Manchester et al.
2007/0275703 A1 11/2007 Lim et al.
2007/0277111 A1 11/2007 Bennett et al.
2007/0282665 A1 12/2007 Buehler et al.
2007/0283001 A1 12/2007 Spiess et al.
2007/0283004 A1 12/2007 Buehler
2007/0287405 A1 12/2007 Radtke
2007/0288858 A1 12/2007 Pereira
2007/0290830 A1 12/2007 Gurley
2007/0291118 A1 12/2007 Shu et al.
2007/0296814 A1 12/2007 Cooper et al.
2007/0298772 A1 12/2007 Owens et al.
2008/0008150 A1 1/2008 Chow et al.
2008/0013531 A1 1/2008 Elliott et al.
2008/0013957 A1 1/2008 Akers et al.
2008/0025487 A1 1/2008 Johan et al.
2008/0027587 A1 1/2008 Nickerson et al.
2008/0040272 A1 2/2008 Eskin
2008/0042826 A1 2/2008 Hevia et al.
2008/0043107 A1 2/2008 Coogan et al.
2008/0046593 A1 2/2008 Ando et al.
2008/0048975 A1 2/2008 Leibow
2008/0052348 A1 2/2008 Adler et al.
2008/0056212 A1 3/2008 Karaoguz et al.
2008/0059533 A1 3/2008 Krikorian
2008/0059622 A1 3/2008 Hite et al.
2008/0065681 A1 3/2008 Fontijn et al.
2008/0065685 A1 3/2008 Frank
2008/0069121 A1 3/2008 Adamson et al.
2008/0072244 A1 3/2008 Eker et al.
2008/0074993 A1 3/2008 Vainola
2008/0082186 A1 4/2008 Hood et al.
2008/0084294 A1 4/2008 Zhiying et al.
2008/0084296 A1 4/2008 Kutzik et al.
2008/0086564 A1 4/2008 Putman et al.
2008/0091793 A1 4/2008 Diroo et al.
2008/0094204 A1 4/2008 Kogan et al.
2008/0095339 A1 4/2008 Elliott et al.
2008/0097871 A1 4/2008 Williams et al.
2008/0100705 A1 5/2008 Kister et al.
2008/0102845 A1 5/2008 Zhao
2008/0103608 A1 5/2008 Gough et al.
2008/0104215 A1 5/2008 Excoffier et al.
2008/0104516 A1 5/2008 Lee
2008/0109302 A1 5/2008 Salokannel et al.
2008/0109650 A1 5/2008 Shim et al.
2008/0112340 A1 5/2008 Luebke
2008/0112405 A1 5/2008 Cholas et al.
2008/0117029 A1 5/2008 Dohrmann et al.
2008/0117201 A1 5/2008 Martinez et al.
2008/0120405 A1 5/2008 Son et al.
2008/0122575 A1 5/2008 Lavian et al.
2008/0126535 A1 5/2008 Zhu et al.
2008/0128444 A1 6/2008 Schininger et al.
2008/0129484 A1 6/2008 Dahl et al.
2008/0130949 A1 6/2008 Ivanov et al.
2008/0133725 A1 6/2008 Shaouy
2008/0134165 A1 6/2008 Anderson et al.
2008/0134343 A1 6/2008 Pennington et al.
2008/0137572 A1 6/2008 Park et al.
2008/0140868 A1 6/2008 Kalayjian et al.
2008/0141303 A1 6/2008 Walker et al.
2008/0141341 A1 6/2008 Vinogradov et al.
2008/0144884 A1 6/2008 Habibi
2008/0147834 A1 6/2008 Quinn et al.
2008/0151037 A1 6/2008 Kumarasamy et al.
2008/0155080 A1 6/2008 Marlow et al.
2008/0155470 A1 6/2008 Khedouri et al.
2008/0162637 A1 7/2008 Adamczyk et al.
2008/0163355 A1 7/2008 Chu
2008/0165787 A1 7/2008 Xu et al.
2008/0170511 A1 7/2008 Shorty et al.
2008/0181239 A1 7/2008 Wood et al.
2008/0183483 A1 7/2008 Hart
2008/0189609 A1 8/2008 Larson et al.
2008/0189774 A1 8/2008 Ansari et al.
2008/0201468 A1 8/2008 Titus
2008/0201723 A1 8/2008 Bottaro et al.
2008/0208399 A1 8/2008 Pham
2008/0209505 A1 8/2008 Ghai et al.
2008/0209506 A1 8/2008 Ghai et al.
2008/0215450 A1 9/2008 Gates et al.
2008/0215613 A1 9/2008 Grasso
2008/0219239 A1 9/2008 Bell et al.
2008/0221715 A1 9/2008 Krzyzanowski et al.
2008/0227460 A1 9/2008 David et al.
2008/0229415 A1 9/2008 Kapoor et al.
2008/0235326 A1 9/2008 Parsi et al.
2008/0235600 A1 9/2008 Harper et al.
2008/0239075 A1 10/2008 Mehrotra et al.
2008/0240372 A1 10/2008 Frenette
2008/0240696 A1 10/2008 Kucharyson
2008/0259818 A1 10/2008 Balassanian
2008/0261540 A1 10/2008 Rohani et al.
2008/0262990 A1 10/2008 Kapoor et al.
2008/0262991 A1 10/2008 Kapoor et al.
2008/0263150 A1 10/2008 Childers et al.
2008/0266080 A1 10/2008 Leung et al.
2008/0266257 A1 10/2008 Chiang

(56) References Cited

U.S. PATENT DOCUMENTS

| | | | |
|---|---|---|---|
| 2008/0271150 | A1 | 10/2008 | Boerger et al. |
| 2008/0284580 | A1 | 11/2008 | Babich et al. |
| 2008/0284587 | A1 | 11/2008 | Saigh et al. |
| 2008/0284592 | A1 | 11/2008 | Collins et al. |
| 2008/0288639 | A1 | 11/2008 | Ruppert et al. |
| 2008/0294588 | A1 | 11/2008 | Morris et al. |
| 2008/0295172 | A1 | 11/2008 | Bohacek |
| 2008/0297599 | A1 | 12/2008 | Donovan et al. |
| 2008/0303903 | A1 | 12/2008 | Bentley et al. |
| 2008/0313316 | A1 | 12/2008 | Hite et al. |
| 2008/0316024 | A1 | 12/2008 | Chantelou et al. |
| 2009/0003172 | A1 | 1/2009 | Yahata et al. |
| 2009/0003252 | A1 | 1/2009 | Salomone et al. |
| 2009/0003820 | A1 | 1/2009 | Law et al. |
| 2009/0007596 | A1 | 1/2009 | Goldstein et al. |
| 2009/0013210 | A1 | 1/2009 | McIntosh et al. |
| 2009/0018850 | A1 | 1/2009 | Abhyanker |
| 2009/0019141 | A1 | 1/2009 | Bush et al. |
| 2009/0022362 | A1 | 1/2009 | Gagvani et al. |
| 2009/0024493 | A1 | 1/2009 | Huang et al. |
| 2009/0036142 | A1 | 2/2009 | Yan |
| 2009/0036159 | A1 | 2/2009 | Chen |
| 2009/0041467 | A1 | 2/2009 | Carleton et al. |
| 2009/0042649 | A1 | 2/2009 | Hsieh et al. |
| 2009/0046664 | A1 | 2/2009 | Aso |
| 2009/0049094 | A1 | 2/2009 | Howell et al. |
| 2009/0049488 | A1 | 2/2009 | Stransky |
| 2009/0051769 | A1 | 2/2009 | Kuo et al. |
| 2009/0055760 | A1 | 2/2009 | Whatcott et al. |
| 2009/0057427 | A1 | 3/2009 | Geadelmann et al. |
| 2009/0063582 | A1 | 3/2009 | Anna et al. |
| 2009/0066534 | A1 | 3/2009 | Sivakkolundhu |
| 2009/0066789 | A1* | 3/2009 | Baum .................. G06F 16/954 375/240.01 |
| 2009/0067395 | A1 | 3/2009 | Curtis et al. |
| 2009/0070692 | A1 | 3/2009 | Dawes et al. |
| 2009/0072988 | A1 | 3/2009 | Haywood |
| 2009/0076211 | A1 | 3/2009 | Yang et al. |
| 2009/0076879 | A1 | 3/2009 | Sparks et al. |
| 2009/0077623 | A1 | 3/2009 | Baum et al. |
| 2009/0079547 | A1 | 3/2009 | Oksanen et al. |
| 2009/0083167 | A1 | 3/2009 | Subbloie |
| 2009/0086660 | A1 | 4/2009 | Sood et al. |
| 2009/0086740 | A1 | 4/2009 | Al-Bakri et al. |
| 2009/0089822 | A1 | 4/2009 | Wada |
| 2009/0092283 | A1 | 4/2009 | Whillock et al. |
| 2009/0094671 | A1 | 4/2009 | Kurapati et al. |
| 2009/0100176 | A1 | 4/2009 | Hicks, III et al. |
| 2009/0100329 | A1 | 4/2009 | Espinoza |
| 2009/0100460 | A1 | 4/2009 | Hicks et al. |
| 2009/0100492 | A1 | 4/2009 | Hicks et al. |
| 2009/0109959 | A1 | 4/2009 | Elliott et al. |
| 2009/0113344 | A1 | 4/2009 | Nesse et al. |
| 2009/0119397 | A1 | 5/2009 | Neerdaels |
| 2009/0125708 | A1 | 5/2009 | Woodring et al. |
| 2009/0128365 | A1 | 5/2009 | Laskin |
| 2009/0144237 | A1 | 6/2009 | Branam et al. |
| 2009/0158189 | A1 | 6/2009 | Itani |
| 2009/0158292 | A1 | 6/2009 | Rattner et al. |
| 2009/0160856 | A1 | 6/2009 | Hoguet |
| 2009/0161609 | A1 | 6/2009 | Bergstrom |
| 2009/0172443 | A1 | 7/2009 | Rothman et al. |
| 2009/0177298 | A1 | 7/2009 | McFarland et al. |
| 2009/0177906 | A1 | 7/2009 | Paniagua et al. |
| 2009/0180430 | A1 | 7/2009 | Fadell |
| 2009/0182868 | A1 | 7/2009 | McFate et al. |
| 2009/0187297 | A1 | 7/2009 | Kish et al. |
| 2009/0189981 | A1 | 7/2009 | Siann et al. |
| 2009/0193373 | A1 | 7/2009 | Abbaspour et al. |
| 2009/0197539 | A1 | 8/2009 | Shiba |
| 2009/0202250 | A1 | 8/2009 | Dizechi et al. |
| 2009/0204693 | A1 | 8/2009 | Andreev et al. |
| 2009/0221368 | A1 | 9/2009 | Yen et al. |
| 2009/0224875 | A1 | 9/2009 | Rabinowitz et al. |
| 2009/0228445 | A1 | 9/2009 | Gangal |
| 2009/0240353 | A1 | 9/2009 | Songkakul et al. |
| 2009/0240730 | A1 | 9/2009 | Wood |
| 2009/0240787 | A1 | 9/2009 | Denny |
| 2009/0240814 | A1 | 9/2009 | Brubacher et al. |
| 2009/0240946 | A1 | 9/2009 | Yeap et al. |
| 2009/0254960 | A1 | 10/2009 | Yarom et al. |
| 2009/0256708 | A1 | 10/2009 | Hsiao et al. |
| 2009/0259515 | A1 | 10/2009 | Belimpasakis et al. |
| 2009/0260052 | A1 | 10/2009 | Bathula et al. |
| 2009/0260083 | A1 | 10/2009 | Szeto et al. |
| 2009/0260430 | A1 | 10/2009 | Zamfes |
| 2009/0261943 | A1 | 10/2009 | Jana et al. |
| 2009/0265042 | A1 | 10/2009 | Mollenkopf et al. |
| 2009/0265193 | A1 | 10/2009 | Collins et al. |
| 2009/0270090 | A1 | 10/2009 | Kawamura |
| 2009/0271042 | A1 | 10/2009 | Voysey |
| 2009/0276728 | A1 | 11/2009 | Doan et al. |
| 2009/0289787 | A1 | 11/2009 | Dawson et al. |
| 2009/0289788 | A1 | 11/2009 | Leblond |
| 2009/0292909 | A1 | 11/2009 | Feder et al. |
| 2009/0303100 | A1 | 12/2009 | Zemany |
| 2009/0307255 | A1 | 12/2009 | Park |
| 2009/0307307 | A1 | 12/2009 | Igarashi |
| 2009/0311995 | A1 | 12/2009 | Himmelstein |
| 2009/0313693 | A1 | 12/2009 | Rogers |
| 2009/0316671 | A1 | 12/2009 | Rolf et al. |
| 2009/0319361 | A1 | 12/2009 | Conrady |
| 2009/0322510 | A1 | 12/2009 | Berger et al. |
| 2009/0324010 | A1 | 12/2009 | Hou |
| 2009/0327483 | A1 | 12/2009 | Thompson et al. |
| 2009/0327510 | A1 | 12/2009 | Edelman et al. |
| 2010/0000791 | A1 | 1/2010 | Alberty |
| 2010/0001812 | A1 | 1/2010 | Kausch |
| 2010/0004949 | A1 | 1/2010 | O'Brien |
| 2010/0008274 | A1 | 1/2010 | Kneckt et al. |
| 2010/0009758 | A1 | 1/2010 | Twitchell, Jr. |
| 2010/0011298 | A1 | 1/2010 | Campbell et al. |
| 2010/0013917 | A1 | 1/2010 | Hanna et al. |
| 2010/0026481 | A1 | 2/2010 | Oh et al. |
| 2010/0026487 | A1 | 2/2010 | Hershkovitz |
| 2010/0030578 | A1 | 2/2010 | Siddique et al. |
| 2010/0030810 | A1 | 2/2010 | Marr |
| 2010/0039958 | A1 | 2/2010 | Ge et al. |
| 2010/0042954 | A1 | 2/2010 | Rosenblatt et al. |
| 2010/0045461 | A1 | 2/2010 | Caler et al. |
| 2010/0067371 | A1 | 3/2010 | Gogic et al. |
| 2010/0070618 | A1 | 3/2010 | Kim et al. |
| 2010/0071053 | A1 | 3/2010 | Ansari et al. |
| 2010/0074112 | A1 | 3/2010 | Derr et al. |
| 2010/0077111 | A1 | 3/2010 | Holmes et al. |
| 2010/0077347 | A1 | 3/2010 | Kirtane et al. |
| 2010/0100269 | A1 | 4/2010 | Ekhaguere et al. |
| 2010/0102951 | A1 | 4/2010 | Rutledge |
| 2010/0121521 | A1 | 5/2010 | Kiribayashi |
| 2010/0122091 | A1 | 5/2010 | Huang et al. |
| 2010/0138758 | A1 | 6/2010 | Mizumori et al. |
| 2010/0138764 | A1 | 6/2010 | Hatambeiki et al. |
| 2010/0141762 | A1 | 6/2010 | Siann et al. |
| 2010/0145485 | A1 | 6/2010 | Duchene et al. |
| 2010/0150170 | A1 | 6/2010 | Lee et al. |
| 2010/0159898 | A1 | 6/2010 | Krzyzanowski et al. |
| 2010/0159967 | A1 | 6/2010 | Pounds et al. |
| 2010/0164736 | A1 | 7/2010 | Byers et al. |
| 2010/0165897 | A1 | 7/2010 | Sood |
| 2010/0174643 | A1 | 7/2010 | Schaefer et al. |
| 2010/0177749 | A1 | 7/2010 | Essinger et al. |
| 2010/0177750 | A1 | 7/2010 | Essinger et al. |
| 2010/0185857 | A1 | 7/2010 | Neitzel et al. |
| 2010/0191352 | A1 | 7/2010 | Quail |
| 2010/0197219 | A1 | 8/2010 | Issa et al. |
| 2010/0204839 | A1 | 8/2010 | Behm et al. |
| 2010/0210240 | A1 | 8/2010 | Mahaffey et al. |
| 2010/0211192 | A1 | 8/2010 | Stluka et al. |
| 2010/0212012 | A1 | 8/2010 | Touboul et al. |
| 2010/0218104 | A1 | 8/2010 | Lewis |
| 2010/0219948 | A1 | 9/2010 | Egawa |
| 2010/0222069 | A1 | 9/2010 | Abraham et al. |
| 2010/0238286 | A1 | 9/2010 | Boghossian et al. |
| 2010/0241711 | A1 | 9/2010 | Ansari et al. |

(56) References Cited

U.S. PATENT DOCUMENTS

2010/0241748 A1 9/2010 Ansari et al.
2010/0248681 A1 9/2010 Phills
2010/0267390 A1 10/2010 Lin et al.
2010/0274366 A1 10/2010 Fata et al.
2010/0275018 A1 10/2010 Pedersen
2010/0277302 A1 11/2010 Cohn et al.
2010/0279649 A1 11/2010 Thomas
2010/0281135 A1 11/2010 Cohn et al.
2010/0281161 A1 11/2010 Cohn et al.
2010/0298024 A1 11/2010 Choi
2010/0299556 A1 11/2010 Taylor et al.
2010/0305779 A1 12/2010 Hassan et al.
2010/0308990 A1 12/2010 Simon et al.
2010/0321151 A1 12/2010 Matsuura et al.
2010/0325107 A1 12/2010 Kenton et al.
2010/0332164 A1 12/2010 Aisa et al.
2011/0000521 A1 1/2011 Tachibana
2011/0001898 A1 1/2011 Mikubo et al.
2011/0018998 A1 1/2011 Guzik
2011/0029875 A1 2/2011 Milch
2011/0030056 A1 2/2011 Tokunaga
2011/0037593 A1 2/2011 Foisy et al.
2011/0040415 A1 2/2011 Nickerson et al.
2011/0040877 A1 2/2011 Foisy
2011/0046792 A1 2/2011 Imes et al.
2011/0051638 A1 3/2011 Jeon et al.
2011/0058034 A1 3/2011 Grass
2011/0061011 A1 3/2011 Hoguet
2011/0068906 A1 3/2011 Shafer et al.
2011/0068921 A1 3/2011 Shafer
2011/0080267 A1 4/2011 Clare et al.
2011/0087988 A1 4/2011 Ray et al.
2011/0093799 A1 4/2011 Hatambeiki et al.
2011/0096678 A1 4/2011 Ketonen
2011/0102588 A1 5/2011 Trundle et al.
2011/0107436 A1 5/2011 Cholas et al.
2011/0125333 A1 5/2011 Gray
2011/0125846 A1 5/2011 Ham et al.
2011/0128378 A1 6/2011 Raji
2011/0130112 A1 6/2011 Saigh et al.
2011/0131226 A1 6/2011 Chandra et al.
2011/0148572 A1 6/2011 Ku
2011/0156914 A1 6/2011 Sheharri et al.
2011/0169637 A1 7/2011 Siegler et al.
2011/0187497 A1 8/2011 Chin
2011/0197327 A1 8/2011 McElroy et al.
2011/0200052 A1 8/2011 Mungo et al.
2011/0208359 A1 8/2011 Duchene et al.
2011/0212706 A1 9/2011 Uusilehto
2011/0213869 A1 9/2011 Korsunsky et al.
2011/0214157 A1 9/2011 Korsunsky et al.
2011/0218777 A1 9/2011 Chen et al.
2011/0219035 A1 9/2011 Korsunsky et al.
2011/0230139 A1 9/2011 Nakahara
2011/0230160 A1 9/2011 Felgate
2011/0231510 A1 9/2011 Korsunsky et al.
2011/0231564 A1 9/2011 Korsunsky et al.
2011/0234392 A1 9/2011 Cohn et al.
2011/0238660 A1 9/2011 Riggs
2011/0238855 A1 9/2011 Korsunsky et al.
2011/0246762 A1 10/2011 Adams et al.
2011/0257953 A1 10/2011 Li et al.
2011/0261195 A1 10/2011 Martin et al.
2011/0276699 A1 11/2011 Pedersen
2011/0283006 A1 11/2011 Ramamurthy
2011/0289517 A1 11/2011 Sather et al.
2011/0299546 A1 12/2011 Prodan et al.
2011/0302497 A1 12/2011 Garrett et al.
2011/0309929 A1 12/2011 Myers
2011/0314515 A1 12/2011 Hernoud et al.
2012/0001436 A1 1/2012 Sami et al.
2012/0005276 A1 1/2012 Guo et al.
2012/0014363 A1 1/2012 Hassan et al.
2012/0016607 A1 1/2012 Cottrell et al.
2012/0017268 A9 1/2012 Dispensa
2012/0020060 A1 1/2012 Myer et al.
2012/0023151 A1 1/2012 Bennett et al.
2012/0030130 A1 2/2012 Smith et al.
2012/0062370 A1 3/2012 Feldstein et al.
2012/0066608 A1 3/2012 Sundermeyer et al.
2012/0075469 A1 3/2012 Oskin et al.
2012/0081842 A1 4/2012 Ewing et al.
2012/0084184 A1 4/2012 Raleigh et al.
2012/0086552 A1 4/2012 Fast et al.
2012/0143383 A1 6/2012 Cooperrider et al.
2012/0150966 A1 6/2012 Fan et al.
2012/0172027 A1 7/2012 Partheesh et al.
2012/0182245 A1 7/2012 Hutton
2012/0209951 A1 8/2012 Enns et al.
2012/0214502 A1 8/2012 Qiang
2012/0232788 A1 9/2012 Diao
2012/0240185 A1 9/2012 Kapoor et al.
2012/0242788 A1 9/2012 Chuang et al.
2012/0257061 A1 10/2012 Edwards et al.
2012/0259722 A1 10/2012 Mikurak
2012/0265892 A1 10/2012 Ma et al.
2012/0269199 A1 10/2012 Chan et al.
2012/0280790 A1 11/2012 Gerhardt et al.
2012/0286951 A1 11/2012 Hess et al.
2012/0290740 A1 11/2012 Tewari et al.
2012/0293686 A1 11/2012 Karn et al.
2012/0296486 A1 11/2012 Marriam et al.
2012/0307646 A1 12/2012 Xia et al.
2012/0309354 A1 12/2012 Du
2012/0313781 A1 12/2012 Barker et al.
2012/0314901 A1 12/2012 Hanson et al.
2012/0315848 A1 12/2012 Smith et al.
2012/0324566 A1 12/2012 Baum et al.
2012/0327242 A1 12/2012 Barley et al.
2012/0331109 A1 12/2012 Baum et al.
2013/0002880 A1 1/2013 Levinson et al.
2013/0038730 A1 2/2013 Peterson et al.
2013/0038800 A1 2/2013 Yoo
2013/0047123 A1 2/2013 May et al.
2013/0057384 A1 3/2013 Morris et al.
2013/0057695 A1 3/2013 Huisking
2013/0062951 A1 3/2013 Raji et al.
2013/0073746 A1 3/2013 Singh et al.
2013/0082835 A1 4/2013 Shapiro et al.
2013/0082836 A1 4/2013 Watts
2013/0085615 A1 4/2013 Barker
2013/0086618 A1 4/2013 Klein et al.
2013/0091209 A1 4/2013 Bennett et al.
2013/0091213 A1 4/2013 Diab et al.
2013/0094538 A1 4/2013 Wang
2013/0103207 A1 4/2013 Ruff et al.
2013/0111576 A1 5/2013 Devine et al.
2013/0115972 A1 5/2013 Ziskind et al.
2013/0120131 A1 5/2013 Hicks, III
2013/0125157 A1 5/2013 Sharif-Ahmadi et al.
2013/0136102 A1 5/2013 Macwan et al.
2013/0147799 A1 6/2013 Hoguet
2013/0154822 A1 6/2013 Kumar et al.
2013/0155229 A1 6/2013 Thornton et al.
2013/0157612 A1 6/2013 Cordero et al.
2013/0162571 A1 6/2013 Tamegai
2013/0163491 A1 6/2013 Singh et al.
2013/0163757 A1 6/2013 Bellovin et al.
2013/0173797 A1 7/2013 Poirer et al.
2013/0174239 A1 7/2013 Kim et al.
2013/0183924 A1 7/2013 Saigh et al.
2013/0184874 A1 7/2013 Frader-Thompson et al.
2013/0185026 A1 7/2013 Vanker et al.
2013/0191755 A1 7/2013 Balog et al.
2013/0205016 A1 8/2013 Dupre et al.
2013/0218959 A1 8/2013 Sa et al.
2013/0222133 A1 8/2013 Schultz et al.
2013/0223279 A1 8/2013 Tinnakornsrisuphap et al.
2013/0245837 A1 9/2013 Grohman
2013/0246576 A1 9/2013 Wogsberg et al.
2013/0257611 A1 10/2013 Lamb et al.
2013/0258119 A1 10/2013 Kim et al.
2013/0261821 A1 10/2013 Lu et al.
2013/0266193 A1 10/2013 Tiwari et al.

(56) References Cited

U.S. PATENT DOCUMENTS

2013/0271270 A1 10/2013 Jamadagni et al.
2013/0286942 A1 10/2013 Bonar et al.
2013/0311146 A1 11/2013 Miller et al.
2013/0314542 A1 11/2013 Jackson
2013/0318443 A1 11/2013 Bachman et al.
2013/0325935 A1 12/2013 Kiley et al.
2013/0331109 A1 12/2013 Dhillon et al.
2013/0344875 A1 12/2013 Chowdhury
2013/0346921 A1 12/2013 Shiplacoff et al.
2014/0006660 A1 1/2014 Frei et al.
2014/0024361 A1 1/2014 Poon et al.
2014/0032034 A1 1/2014 Raptopoulos et al.
2014/0033136 A1 1/2014 St. Clair
2014/0035726 A1 2/2014 Schoner et al.
2014/0053246 A1 2/2014 Huang et al.
2014/0068486 A1 3/2014 Sellers et al.
2014/0075464 A1 3/2014 McCrea
2014/0095630 A1 4/2014 Wohlert et al.
2014/0098247 A1 4/2014 Rao et al.
2014/0108151 A1 4/2014 Bookstaff
2014/0109130 A1 4/2014 Sugimoto et al.
2014/0112405 A1 4/2014 Jafarian et al.
2014/0136242 A1 5/2014 Weekes et al.
2014/0136847 A1 5/2014 Huang
2014/0136936 A1 5/2014 Patel et al.
2014/0140575 A1 5/2014 Wolf
2014/0143854 A1 5/2014 Lopez et al.
2014/0146170 A1 5/2014 Tofighbakhsh
2014/0146171 A1 5/2014 Brady et al.
2014/0153695 A1 6/2014 Yanagisawa et al.
2014/0167928 A1 6/2014 Burd
2014/0176797 A1 6/2014 Silva et al.
2014/0180968 A1 6/2014 Song et al.
2014/0188290 A1 7/2014 Steinberg et al.
2014/0188729 A1 7/2014 Hong
2014/0201291 A1 7/2014 Russell
2014/0208214 A1 7/2014 Stern
2014/0218517 A1 8/2014 Kim et al.
2014/0233951 A1 8/2014 Cook
2014/0236325 A1 8/2014 Sasaki et al.
2014/0245014 A1 8/2014 Tuck et al.
2014/0245160 A1 8/2014 Bauer et al.
2014/0254896 A1 9/2014 Zhou et al.
2014/0265359 A1 9/2014 Cheng et al.
2014/0266678 A1 9/2014 Shapiro et al.
2014/0266736 A1 9/2014 Cretu-Petra
2014/0278281 A1 9/2014 Vaynriber et al.
2014/0282048 A1 9/2014 Shapiro et al.
2014/0282934 A1 9/2014 Miasnik et al.
2014/0289384 A1 9/2014 Kao et al.
2014/0289388 A1 9/2014 Ghosh et al.
2014/0293046 A1 10/2014 Ni
2014/0298467 A1 10/2014 Bhagwat et al.
2014/0316616 A1 10/2014 Kugelmass
2014/0317660 A1 10/2014 Cheung et al.
2014/0319232 A1 10/2014 Gourlay et al.
2014/0328161 A1 11/2014 Haddad et al.
2014/0340216 A1 11/2014 Puskarich
2014/0359524 A1 12/2014 Sasaki et al.
2014/0368331 A1 12/2014 Cohn et al.
2014/0369584 A1 12/2014 Fan et al.
2014/0372599 A1 12/2014 Gutt et al.
2014/0378110 A1 12/2014 Chingon et al.
2015/0009325 A1 1/2015 Kardashov
2015/0019714 A1 1/2015 Shaashua et al.
2015/0022666 A1 1/2015 Kay et al.
2015/0026796 A1 1/2015 Alan et al.
2015/0054947 A1 2/2015 Dawes
2015/0058250 A1 2/2015 Stanzione et al.
2015/0074206 A1 3/2015 Baldwin
2015/0074259 A1 3/2015 Ansari et al.
2015/0077553 A1 3/2015 Dawes
2015/0082414 A1 3/2015 Dawes
2015/0088982 A1 3/2015 Johnson et al.
2015/0097680 A1 4/2015 Fadell et al.
2015/0097949 A1 4/2015 Ure et al.
2015/0097961 A1 4/2015 Ure et al.
2015/0100167 A1 4/2015 Sloo et al.
2015/0104147 A1 4/2015 Kosaka et al.
2015/0106721 A1 4/2015 Cha et al.
2015/0130625 A1 5/2015 Tuovinen
2015/0140954 A1 5/2015 Maier et al.
2015/0142991 A1 5/2015 Zaloom
2015/0143395 A1 5/2015 Reisman
2015/0161875 A1 6/2015 Cohn et al.
2015/0170447 A1 6/2015 Buzhardt
2015/0192940 A1 7/2015 Silva et al.
2015/0193127 A1 7/2015 Chai et al.
2015/0205297 A1 7/2015 Stevens et al.
2015/0205465 A1 7/2015 Robison et al.
2015/0222601 A1 8/2015 Metz et al.
2015/0227118 A1 8/2015 Wong
2015/0256355 A1 9/2015 Pera et al.
2015/0261427 A1 9/2015 Sasaki
2015/0266577 A1 9/2015 Jones et al.
2015/0287310 A1 10/2015 Deiiuliis et al.
2015/0304804 A1 10/2015 Lotito
2015/0319006 A1 11/2015 Plummer et al.
2015/0319046 A1 11/2015 Plummer et al.
2015/0325106 A1 11/2015 Dawes et al.
2015/0331662 A1 11/2015 Lambourne
2015/0334087 A1 11/2015 Dawes
2015/0348554 A1 12/2015 Orr et al.
2015/0350031 A1 12/2015 Burks et al.
2015/0350735 A1 12/2015 Koser
2015/0358359 A1 12/2015 Ghai et al.
2015/0365217 A1 12/2015 Scholten et al.
2015/0365933 A1 12/2015 Lee et al.
2015/0371512 A1 12/2015 Bennett et al.
2015/0373149 A1 12/2015 Lyons
2015/0379355 A1 12/2015 Kanga et al.
2016/0004820 A1 1/2016 Moore
2016/0023475 A1 1/2016 Bevier et al.
2016/0027290 A1 1/2016 English
2016/0027295 A1 1/2016 Raji et al.
2016/0037389 A1 2/2016 Tagg et al.
2016/0042637 A1 2/2016 Cahill
2016/0055573 A1 2/2016 Chen et al.
2016/0062624 A1 3/2016 Sundermeyer et al.
2016/0063642 A1 3/2016 Luciani et al.
2016/0065414 A1 3/2016 Sundermeyer et al.
2016/0065653 A1 3/2016 Chen et al.
2016/0068264 A1 3/2016 Ganesh et al.
2016/0077935 A1 3/2016 Zheng et al.
2016/0080365 A1 3/2016 Baker et al.
2016/0087933 A1 3/2016 Johnson et al.
2016/0094421 A1 3/2016 Bali et al.
2016/0100348 A1 4/2016 Cohn et al.
2016/0107749 A1 4/2016 Mucci
2016/0116914 A1 4/2016 Mucci
2016/0127641 A1 5/2016 Gove
2016/0147919 A1 5/2016 Yabe et al.
2016/0150433 A1 5/2016 Bergquist et al.
2016/0156941 A9 6/2016 Alao et al.
2016/0161277 A1 6/2016 Park et al.
2016/0164923 A1 6/2016 Dawes
2016/0171853 A1 6/2016 Naidoo et al.
2016/0180719 A1 6/2016 Wouhaybi et al.
2016/0183073 A1 6/2016 Saito et al.
2016/0187995 A1 6/2016 Rosewall
2016/0189509 A1 6/2016 Malhotra et al.
2016/0189524 A1 6/2016 Poder et al.
2016/0189527 A1 6/2016 Peterson et al.
2016/0189549 A1 6/2016 Marcus
2016/0191621 A1 6/2016 Oh et al.
2016/0192461 A1 6/2016 Minsky
2016/0196734 A1 7/2016 Hicks, III
2016/0202695 A1 7/2016 Deroos et al.
2016/0209072 A1 7/2016 Golden et al.
2016/0225240 A1 8/2016 Voddhi et al.
2016/0226732 A1 8/2016 Kim et al.
2016/0231916 A1 8/2016 Dawes
2016/0234075 A1 8/2016 Sirpal et al.
2016/0241633 A1 8/2016 Overby et al.

(56) References Cited

U.S. PATENT DOCUMENTS

2016/0260135 A1 9/2016 Zomet et al.
2016/0261932 A1 9/2016 Fadell et al.
2016/0266579 A1 9/2016 Chen et al.
2016/0308628 A1 10/2016 Herickhoff et al.
2016/0323731 A1 11/2016 Mohammed et al.
2016/0363337 A1 12/2016 Steinberg et al.
2016/0364089 A1 12/2016 Blackman et al.
2016/0371961 A1 12/2016 Narang et al.
2016/0371967 A1 12/2016 Narang et al.
2016/0373453 A1 12/2016 Ruffner et al.
2016/0378109 A1 12/2016 Raffa et al.
2017/0004714 A1 1/2017 Rhee
2017/0005818 A1 1/2017 Gould
2017/0006107 A1 1/2017 Dawes et al.
2017/0026440 A1 1/2017 Cockrell et al.
2017/0039413 A1 2/2017 Nadler
2017/0052513 A1 2/2017 Raji et al.
2017/0054570 A1 2/2017 Hagins et al.
2017/0054594 A1 2/2017 Decenzo et al.
2017/0068419 A1 3/2017 Sundermeyer et al.
2017/0070361 A1 3/2017 Sundermeyer et al.
2017/0070563 A1 3/2017 Sundermeyer et al.
2017/0085436 A1 3/2017 Costa et al.
2017/0085437 A1 3/2017 Condeixa et al.
2017/0085632 A1 3/2017 Cardote
2017/0086230 A1 3/2017 Azevedo et al.
2017/0086241 A1 3/2017 Lopes et al.
2017/0092138 A1 3/2017 Trundle et al.
2017/0109999 A1 4/2017 Cohn et al.
2017/0111227 A1 4/2017 Papageorgiou et al.
2017/0118037 A1 4/2017 Kitchen et al.
2017/0124987 A1 5/2017 Kim et al.
2017/0126535 A1 5/2017 Ameixieira
2017/0127124 A9 5/2017 Wilson et al.
2017/0154507 A1 6/2017 Dawes et al.
2017/0155545 A1 6/2017 Baum et al.
2017/0180198 A1 6/2017 Baum et al.
2017/0180306 A1 6/2017 Gutt et al.
2017/0185277 A1 6/2017 Sundermeyer et al.
2017/0185278 A1 6/2017 Sundermeyer et al.
2017/0185281 A1 6/2017 Park et al.
2017/0187993 A1 6/2017 Martch et al.
2017/0192402 A1 7/2017 Karp et al.
2017/0225336 A1 8/2017 Deyle et al.
2017/0227965 A1 8/2017 Decenzo et al.
2017/0255452 A1 9/2017 Barnes et al.
2017/0257257 A1 9/2017 Dawes
2017/0278407 A1 9/2017 Lemmey et al.
2017/0279629 A1 9/2017 Raji
2017/0289323 A1 10/2017 Gelvin et al.
2017/0289360 A1 10/2017 Baum et al.
2017/0289650 A1 10/2017 Schattmaier et al.
2017/0303257 A1 10/2017 Yamada et al.
2017/0310500 A1 10/2017 Dawes
2017/0318520 A1 11/2017 Costa et al.
2017/0324817 A1 11/2017 Oliveira et al.
2017/0330466 A1 11/2017 Demetriades et al.
2017/0331781 A1 11/2017 Gutt
2017/0332055 A1 11/2017 Henderson
2017/0337806 A1 11/2017 Cohn et al.
2017/0367127 A1 12/2017 Lopes et al.
2018/0004377 A1 1/2018 Kitchen et al.
2018/0012460 A1 1/2018 Heitz et al.
2018/0019890 A1 1/2018 Dawes
2018/0027517 A9 1/2018 Noonan
2018/0045159 A1 2/2018 Patel
2018/0063248 A1 3/2018 Dawes et al.
2018/0063259 A1 3/2018 Connelly et al.
2018/0069862 A1 3/2018 Cholas et al.
2018/0069932 A1 3/2018 Tiwari et al.
2018/0082575 A1 3/2018 El-Mankabady
2018/0083831 A1 3/2018 Baum et al.
2018/0092046 A1 3/2018 Egan et al.
2018/0095155 A1 4/2018 Soni et al.
2018/0096568 A1 4/2018 Cohn et al.
2018/0107196 A1 4/2018 Bian et al.
2018/0122237 A1 5/2018 Nascimento et al.
2018/0146171 A1 5/2018 Tofighbakhsh
2018/0152342 A1 5/2018 Karaoguz et al.
2018/0183668 A1 6/2018 Caldwell et al.
2018/0184338 A1 6/2018 Cabral et al.
2018/0191720 A1 7/2018 Dawes
2018/0191741 A1 7/2018 Dawes et al.
2018/0191807 A1 7/2018 Dawes
2018/0192269 A1 7/2018 Cabral
2018/0198688 A1 7/2018 Dawes
2018/0198755 A1 7/2018 Domangue et al.
2018/0198756 A1 7/2018 Dawes
2018/0198788 A1 7/2018 Helen et al.
2018/0198802 A1 7/2018 Dawes
2018/0278701 A1 9/2018 Diem
2018/0302274 A1 10/2018 Cabral et al.
2018/0307223 A1 10/2018 Peeters et al.
2018/0316764 A1 11/2018 Ferreira et al.
2018/0322759 A1 11/2018 Devdas et al.
2018/0332455 A1 11/2018 Neves et al.
2019/0014413 A1 1/2019 Kallai et al.
2019/0026850 A1 1/2019 Orduna et al.
2019/0041547 A1 2/2019 Rolf et al.
2019/0058720 A1 2/2019 Lindquist et al.
2019/0073193 A1 3/2019 Krispin
2019/0073534 A1 3/2019 Dvir et al.
2019/0098089 A1 3/2019 Shim et al.
2019/0103030 A1 4/2019 Banga et al.
2019/0141472 A1 5/2019 Azevedo et al.
2019/0176985 A1 6/2019 Mucci
2019/0197256 A1 6/2019 Lehnhardt et al.
2019/0204836 A1 7/2019 Rezvani
2019/0239008 A1 8/2019 Lambourne
2019/0245798 A1 8/2019 Short et al.
2019/0265694 A1 8/2019 Chen et al.
2019/0288929 A1 9/2019 Mota et al.
2019/0347924 A1 11/2019 Trundle et al.
2019/0349244 A1 11/2019 Ameixiera
2019/0385435 A1 12/2019 Farrand et al.
2019/0391545 A1 12/2019 Trundle et al.
2020/0014675 A1 1/2020 Helms et al.
2020/0026285 A1 1/2020 Perrone
2020/0029339 A1 1/2020 Suzuki
2020/0032887 A1 1/2020 McBurney et al.
2020/0036635 A1 1/2020 Ohuchi
2020/0044682 A1 2/2020 Sharma et al.
2020/0076858 A1 3/2020 Apsangi et al.
2020/0094963 A1 3/2020 Myslinski
2020/0127891 A9 4/2020 Johnson et al.
2020/0137125 A1 4/2020 Patnala et al.
2020/0162890 A1 5/2020 Spencer et al.
2020/0186612 A1 6/2020 Saint Clair
2020/0191193 A1 6/2020 Schulnig et al.
2020/0196213 A1 6/2020 Cheng et al.
2020/0257721 A1 8/2020 McKinnon et al.
2020/0273277 A1 8/2020 Kerning et al.
2020/0279626 A1 9/2020 Ansari et al.
2020/0322577 A1 10/2020 Raffa et al.
2020/0328880 A1 10/2020 Bolotin et al.
2020/0328887 A1 10/2020 Kostiainen et al.
2020/0329136 A1 10/2020 Gerhardt et al.
2020/0333780 A1 10/2020 Kerzner
2020/0349786 A1 11/2020 Ho et al.
2020/0380851 A1 12/2020 Farrand et al.
2020/0394901 A1 12/2020 Tannenbaum et al.
2021/0021710 A1 1/2021 Stepanian
2021/0029547 A1 1/2021 Beachem et al.
2021/0053136 A1 2/2021 Rappl et al.
2021/0068034 A1 3/2021 Juhasz et al.
2021/0081553 A1 3/2021 Lemmey et al.
2021/0084480 A1 3/2021 Maier et al.
2021/0099753 A1 4/2021 Connelly et al.
2021/0153001 A1 5/2021 Eisner
2021/0180815 A1 6/2021 Shamoon et al.
2021/0250726 A1 8/2021 Jones
2021/0326451 A1 10/2021 Nunez Di Croce
2021/0335123 A1 10/2021 Trundle et al.
2022/0021552 A1 1/2022 Ansari et al.

(56) References Cited

U.S. PATENT DOCUMENTS

| | | | |
|---|---|---|---|
| 2022/0027051 | A1 | 1/2022 | Kant et al. |
| 2022/0027464 | A1 | 1/2022 | Regner et al. |
| 2022/0029994 | A1 | 1/2022 | Choyi et al. |
| 2022/0038440 | A1 | 2/2022 | Boynton et al. |
| 2022/0073052 | A1 | 3/2022 | Zhou et al. |
| 2022/0108593 | A1 | 4/2022 | Jackson |
| 2022/0141048 | A1 | 5/2022 | Dawes et al. |
| 2022/0159334 | A1 | 5/2022 | Wang et al. |
| 2022/0247624 | A1 | 8/2022 | Johnson et al. |
| 2022/0383728 | A1 | 12/2022 | Brown |
| 2022/0415104 | A1 | 12/2022 | McLachlan et al. |
| 2023/0057193 | A1 | 2/2023 | Ansari et al. |
| 2023/0230469 | A1 | 7/2023 | Schubert et al. |
| 2024/0078892 | A1 | 3/2024 | Poder et al. |
| 2024/0406839 | A1 | 12/2024 | Cohn et al. |
| 2025/0112820 | A1 | 4/2025 | Johnson et al. |

FOREIGN PATENT DOCUMENTS

| | | | |
|---|---|---|---|
| AU | 2011250886 | A1 | 1/2013 |
| AU | 2013284428 | A1 | 2/2015 |
| AU | 2011305163 | B2 | 12/2016 |
| AU | 2017201365 | A1 | 3/2017 |
| AU | 2017201585 | A1 | 3/2017 |
| BE | 1008939 | A6 | 10/1996 |
| CA | 2203813 | A1 | 6/1996 |
| CA | 2174482 | A1 | 10/1997 |
| CA | 2346638 | A1 | 4/2000 |
| CA | 2389958 | A1 | 3/2003 |
| CA | 2504497 | A1 | 5/2004 |
| CA | 2878117 | A1 | 1/2014 |
| CA | 2559842 | C | 5/2014 |
| CA | 2992429 | A1 | 12/2016 |
| CA | 2976682 | A1 | 2/2018 |
| CA | 2976802 | A1 | 2/2018 |
| CN | 1599999 | A | 3/2005 |
| CN | 102834818 | A | 12/2012 |
| CN | 102985915 | A | 3/2013 |
| DE | 102004027893 | A1 | 1/2006 |
| EP | 0295146 | A2 | 12/1988 |
| EP | 0308046 | A2 | 3/1989 |
| EP | 0591585 | A1 | 4/1994 |
| EP | 1117214 | A2 | 7/2001 |
| EP | 1119837 | A1 | 8/2001 |
| EP | 0978111 | B1 | 11/2001 |
| EP | 1738540 | A2 | 1/2007 |
| EP | 1881716 | A1 | 1/2008 |
| EP | 2112784 | A1 | 10/2009 |
| EP | 2188794 | A1 | 5/2010 |
| EP | 2191351 | A1 | 6/2010 |
| EP | 2327063 | A1 | 6/2011 |
| EP | 2483788 | A1 | 8/2012 |
| EP | 2569712 | A1 | 3/2013 |
| EP | 2619686 | A1 | 7/2013 |
| EP | 2868039 | A2 | 5/2015 |
| EP | 3031206 | A2 | 6/2016 |
| EP | 3285238 | A2 | 2/2018 |
| EP | 3308222 | A1 | 4/2018 |
| FR | 2584217 | A1 | 1/1987 |
| FR | 2661023 | A1 | 10/1991 |
| FR | 2793334 | A1 | 11/2000 |
| GB | 2222288 | A | 2/1990 |
| GB | 2273593 | A | 6/1994 |
| GB | 2286423 | A | 8/1995 |
| GB | 2291554 | A | 1/1996 |
| GB | 2319373 | A | 5/1998 |
| GB | 2320644 | A | 6/1998 |
| GB | 2324630 | A | 10/1998 |
| GB | 2325548 | A | 11/1998 |
| GB | 2335523 | A | 9/1999 |
| GB | 2349293 | A | 10/2000 |
| GB | 2370400 | A | 6/2002 |
| GB | 2375449 | A | 11/2002 |
| GB | 2442628 | A | 4/2008 |
| GB | 2442633 | A | 4/2008 |
| GB | 2442640 | A | 4/2008 |
| GB | 2428821 | B | 6/2008 |
| IN | 45/2015 | | 11/2015 |
| IN | 04/2016 | | 1/2016 |
| JP | 63-033088 | A | 2/1988 |
| JP | 05-167712 | A | 7/1993 |
| JP | 06-339183 | A | 12/1994 |
| JP | 08-227491 | A | 9/1996 |
| JP | 10-004451 | A | 1/1998 |
| JP | 10-108156 | A | 4/1998 |
| JP | 11-234277 | A | 8/1999 |
| JP | 2000-006343 | A | 1/2000 |
| JP | 2000-023146 | A | 1/2000 |
| JP | 2000-278671 | A | 10/2000 |
| JP | 2001-006088 | A | 1/2001 |
| JP | 2001-006343 | A | 1/2001 |
| JP | 2001-069209 | A | 3/2001 |
| JP | 2002-055895 | A | 2/2002 |
| JP | 2002-185629 | A | 6/2002 |
| JP | 2003-085258 | A | 3/2003 |
| JP | 2003-141659 | A | 5/2003 |
| JP | 2003-281647 | A | 10/2003 |
| JP | 2004-192659 | A | 7/2004 |
| JP | 2006-094394 | A | 4/2006 |
| JP | 2007-529826 | A | 10/2007 |
| JP | 4268148 | B2 | 5/2009 |
| JP | 2009-213107 | A | 9/2009 |
| JP | 2010-140091 | A | 6/2010 |
| KR | 10-2005-0051577 | A | 6/2005 |
| KR | 10-2005-0052826 | A | 6/2005 |
| KR | 10-2006-0021605 | A | 3/2006 |
| KR | 10-0771941 | B1 | 10/2007 |
| TW | 340934 | B | 9/1998 |
| TW | 1239176 | B | 9/2005 |
| TW | 201101243 | A | 1/2011 |
| TW | 201102976 | A | 1/2011 |
| TW | 201102978 | A | 1/2011 |
| TW | I340934 | B | 4/2011 |
| TW | 201117141 | A | 5/2011 |
| TW | I480839 | B | 4/2015 |
| TW | I480840 | B | 4/2015 |
| TW | I509579 | B | 11/2015 |
| TW | I517106 | B | 1/2016 |
| WO | 89/07855 | A1 | 8/1989 |
| WO | 89/11187 | A1 | 11/1989 |
| WO | 94/03881 | A1 | 2/1994 |
| WO | 95/13944 | A1 | 5/1995 |
| WO | 96/36301 | A1 | 11/1996 |
| WO | 97/13230 | A2 | 4/1997 |
| WO | 98/25243 | A1 | 6/1998 |
| WO | 98/49663 | A1 | 11/1998 |
| WO | 98/52343 | A1 | 11/1998 |
| WO | 98/59256 | A2 | 12/1998 |
| WO | 99/34339 | A2 | 7/1999 |
| WO | 00/21053 | A1 | 4/2000 |
| WO | 00/36812 | A1 | 6/2000 |
| WO | 00/72598 | A1 | 11/2000 |
| WO | 01/11586 | A1 | 2/2001 |
| WO | 01/50684 | A1 | 7/2001 |
| WO | 01/52478 | A2 | 7/2001 |
| WO | 01/71489 | A1 | 9/2001 |
| WO | 01/86622 | A1 | 11/2001 |
| WO | 01/99078 | A2 | 12/2001 |
| WO | 02/11444 | A1 | 2/2002 |
| WO | 02/21300 | A1 | 3/2002 |
| WO | 02/97584 | A2 | 12/2002 |
| WO | 2002/100083 | A1 | 12/2002 |
| WO | 2003/026305 | A1 | 3/2003 |
| WO | 03/40839 | A1 | 5/2003 |
| WO | 03/49379 | A1 | 6/2003 |
| WO | 03/98908 | A1 | 11/2003 |
| WO | 2004/004222 | A1 | 1/2004 |
| WO | 2004/077307 | A1 | 9/2004 |
| WO | 2004/098127 | A1 | 11/2004 |
| WO | 2004/107710 | A1 | 12/2004 |
| WO | 2005/047990 | A2 | 5/2005 |
| WO | 2005/048630 | A1 | 5/2005 |
| WO | 2005/091218 | A2 | 9/2005 |
| WO | 2006/122487 | A1 | 11/2006 |

(56) References Cited

FOREIGN PATENT DOCUMENTS

| | | | |
|---|---|---|---|
| WO | 2007/038872 | A1 | 4/2007 |
| WO | 2007/124453 | A2 | 11/2007 |
| WO | 2008/056320 | A1 | 5/2008 |
| WO | 2009/006670 | A1 | 1/2009 |
| WO | 2009/023647 | A1 | 2/2009 |
| WO | 2009/029590 | A1 | 3/2009 |
| WO | 2009/029597 | A1 | 3/2009 |
| WO | 2009/064795 | A1 | 5/2009 |
| WO | 2009/145747 | A1 | 12/2009 |
| WO | 2010/019624 | A1 | 2/2010 |
| WO | 2010/025468 | A1 | 3/2010 |
| WO | 2010/127009 | A1 | 11/2010 |
| WO | 2010/127194 | A2 | 11/2010 |
| WO | 2010/127200 | A1 | 11/2010 |
| WO | 2010/127203 | A1 | 11/2010 |
| WO | 2011/038409 | A1 | 3/2011 |
| WO | 2011/063354 | A1 | 5/2011 |
| WO | 2011/143273 | A1 | 11/2011 |
| WO | 2012/040653 | A1 | 7/2013 |
| WO | 2014/004911 | A2 | 1/2014 |
| WO | 2015/021469 | A2 | 2/2015 |
| WO | 2015/134520 | A1 | 9/2015 |
| WO | 2015/176775 | A1 | 11/2015 |
| WO | 2016/201033 | A1 | 12/2016 |
| ZA | 201302668 | | 6/2014 |

OTHER PUBLICATIONS

Visitalk, Communication with Vision, http://www.visitalk.jimbo.com; website accessed Jan. 10, 2018.

Wang et al, "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.

Wilkinson, S: "Logitech Harmony One Universal Remote" Ultimate AV magazine May 2008 (May 2008), XP002597782 Retrieved from the Internet : Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.

Windows, Newton's Telecom Dictionary, 21st Edition, Mar. 2005, 937-938.

Wireless, Battery-Powered Smoke Detectors, Brochure, SafeNight Technology, Inc. Roanoke, VA, 1995.

WLS906 Photoelectric Smoke Alarm, Data Sheet, DSC Security Products, Ontario, Canada, Jan. 1998.

X10—ActiveHome, Home Automation Made Easy [retrieved on Nov. 4, 2003], 3 pages.

Yanni Zhai et al., Design of Smart Home Remote Monitoring System Based on Embedded System, 2011 IEEE 2nd International Conference on Computing, Control and Industrial Engineering, vol. 2, pp. 41-44.

Final Office Action mailed Sep. 14, 2011 for U.S. Appl. No. 12/197,931, filed Aug. 25, 2008.

Foreign communication from a related counterpart application—International Preliminary Examination Report, App No. PCT/US02/14450, Mar. 2, 2004, 4 pgs.

Foreign communication from a related counterpart application—International Search Report, App No. PCT/US02/14450, Dec. 17, 2002, 6 pgs.

Foreign communication from a related counterpart application—Written Opinion, App No. PCT/US02/14450, Oct. 21, 2003, 4 pgs.

Form PCT/ISA/210, "PCT International Search Report for the Application No. PCT/US05/08766," May 23, 2006, 2 pages.

Form PCT/ISA/210, "PCT International Search Report for the Application No. PCT/US08/72831," Nov. 4, 2008, 2 pages.

Form PCT/ISA/210, "PCT International Search Report for the Application No. PCT/US08/74246," Nov. 14, 2008, 2 pages.

Form PCT/ISA/210, "PCT International Search Report for the Application No. PCT/US08/74260," Nov. 13, 2008, 2 pages.

Form PCT/ISA/210, "PCT International Search Report for the Application No. PCT/US08/83254," Jan. 14, 2009, 2 pages.

Form PCT/ISA/210, "PCT International Search Report for the Application No. PCT/US09/53485," Oct. 22, 2009, 2 pages.

Form PCT/ISA/210, "PCT International Search Report for the Application No. PCT/US09/55559," Nov. 12, 2009, 2 pages.

Form PCT/ISA/210, "PCT International Search Report for the Application No. PCT/US10/50585," Dec. 30, 2010, 2 pages.

Form PCT/ISA/210, "PCT International Search Report for the Application No. PCT/US10/57674," Mar. 2, 2011, 2 pages.

Form PCT/ISA/210, "PCT International Search Report for the Application No. PCT/US11/34858," Oct. 3, 2011, 2 pages.

Form PCT/ISA/210, "PCT International Search Report for the Application No. PCT/US11/35994," Sep. 28, 2011, 2 pages.

Form PCT/ISA/210, "PCT International Search Report for the Application No. PCT/US11/53136," Jan. 5, 2012, 2 pages.

Form PCT/ISA/220, "PCT Notification of Transmittal of the International Search Report and the Written Opinion fo the International Searching Authority, or the Declaration for the Application No. PCT/US08/74260," Nov. 13, 2008, 1 page.

Form PCT/ISA/220, "PCT Notification of Transmittal of the International Search Report and the Written Opinion of the International Searching Authority, or the Declaration for the Application No. PCT/US08/72831," Nov. 4, 2008, 1 page.

Form PCT/ISA/220, "PCT Notification of Transmittal of the International Search Report and the Written Opinion of the International Searching Authority, or the Declaration for the Application No. PCT/US08/74246" Nov. 14, 2008, 1 page.

Form PCT/ISA/220, "PCT Notification of Transmittal of the International Search Report and the Written Opinion of the International Searching Authority, or the Declaration for the Application No. PCT/US08/83254," Jan. 14, 2009, 1 page.

Form PCT/ISA/220, "PCT Notification of Transmittal of the International Search Report and the Written Opinion of the International Searching Authority, or the Declaration for the Application No. PCT/US09/53485," Oct. 22, 2009, 1 page.

Form PCT/ISA/220, "PCT Notification of Transmittal of the International Search Report and the Written Opinion of the International Searching Authority, or the Declaration for the Application No. PCT/US09/55559," Nov. 12, 2009, 1 page.

Form PCT/ISA/220, "PCT Notification of Transmittal of the International Search Report and the Written Opinion of the International Searching Authority, or the Declaration for the Application No. PCT/US10/50585," Dec. 30, 2010, 1 page.

Form PCT/ISA/220, "PCT Notification of Transmittal of the International Search Report and the Written Opinion of the International Searching Authority, or the Declaration for the Application No. PCT/US10/57674," Mar. 2, 2011, 1 page.

Form PCT/ISA/220, "PCT Notification of Transmittal of the International Search Report and the Written Opinion of the International Searching Authority, or the Declaration for the Application No. PCT/US11/35994," Sep. 28, 2011, 1 page.

Form PCT/ISA/220, PCT Notification of Transmittal of the International Search Report and the Written Opinion of the International Searching Authority, or the Declaration for the Application No. PCT/US05/08766, May 23, 2006, 1 page.

Form PCT/ISA/237, "PCT Written Opinion of the International Searching Authority for the Application No. PCT/US05/08766," May 23, 2006, 5 pages.

Form PCT/ISA/237, "PCT Written Opinion of the International Searching Authority for the Application No. PCT/US08/72831," Nov. 4, 2008, 6 pages.

Form PCT/ISA/237, "PCT Written Opinion of the International Searching Authority for the Application No. PCT/US08/74246," Nov. 14, 2008, 6 pages.

Form PCT/ISA/237, "PCT Written Opinion of the International Searching Authority for the Application No. PCT/US08/74260," Nov. 13, 2008, 6 pages.

Form PCT/ISA/237, "PCT Written Opinion of the International Searching Authority for the Application No. PCT/US09/53485," Oct. 22, 2009, 8 pages.

(56) References Cited

OTHER PUBLICATIONS

Form PCT/ISA/237, "PCT Written Opinion of the International Searching Authority for the Application No. PCT/US09/55559," Nov. 12, 2009, 6 pages.
Form PCT/ISA/237, "PCT Written Opinion of the International Searching Authority for the Application No. PCT/US10/50585," Dec. 30, 2010, 7 pages.
Form PCT/ISA/237, "PCT Written Opinion of the International Searching Authority for the Application No. PCT/US10/57674," Mar. 2, 2011, 6 pages.
Form PCT/ISA/237, "PCT Written Opinion of the International Searching Authority for the Application No. PCT/US11/34858," Oct. 3, 2011, 8 pages.
Form PCT/ISA/237, "PCT Written Opinion of the International Searching Authority for the Application No. PCT/US11/35994," Sep. 28, 2011, 11 pages.
Form PCT/ISA/237, "PCT Written Opinion of the International Searching Authority for the Application No. PCT/US11/53136," Jan. 5, 2012.
Form PCT/ISA/237, "PCT Written Opinion of the International Searching Authority of the Application No. PCT/US08/83254," Jan. 14, 2009, 7 pages.
Fujii et al., "Community security platform for individually maintained home computers: The Vigilante Network Project", Proceedings of the 21st IEEE Instrumentation and Measurement Technology Conference, 2004, vol. 2, pp. 891-894.
Genex Technologies, Genex OmniEye, www.aviq.com/avcat/images/documents/pdfs/omnieye%20nightwatchbrochure.pdf; webpage accessed Jan. 10, 2018.
Gong, Li, A Software architecture for open service gateways, Internet Computing, IEEE 5.1, Jan.-Feb. 2001, 64-70.
Grayelectronics, "Digitizing TV cameras on TCP/IP Computer Networks," http://www.grayelectronics.com/default.htm, printed on Oct. 12, 1999 (2 pages).
Grayelectronics, http://www.grayelectronics.com; webpage accessed on Jan. 10, 2018.
GTI Genex Technologies, Inc. OmniEye.(Trademark). Product Brochure, Sep. 14, 1999 (5 pages).
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
Indian Patent App. No. 10698/DELNP/2012, corresponds to WO2011/143273 filed Nov. 17, 2011.
Indian Patent App. No. 3687/DELNP/2012, corresponds to WO2011/038409 filed on Sep. 28, 2010.
International Search Report for Application No. PCT/US13/48324, mailed on Jan. 14, 2014, 2 pages.
International Search Report for Application No. PCT/US2014/050548, mailed on Mar. 18, 2015, 4 pages.
J. David Eisenberg, SVG Essentials: Producing Scalable Vector Graphics with XML. O'Reilly & Associates, Inc., Sebastopol, CA 2002.
US Patent Application filed Sep. 22, 2022, entitled "Forming a Security Network Including Integrated Security System Components and Network Devices", U.S. Appl. No. 17/934,443.
US Patent Application filed Sep. 22, 2023, entitled "Automation System User Interface", U.S. Appl. No. 18/472,477.
US Patent Application filed Sep. 22, 2023, entitled "Communication Protocols Over Internet Protocol (IP) Networks", U.S. Appl. No. 18/472,408.
US Patent Application filed Sep. 22, 2023, entitled "Cross-Client Sensor User Interface in an Integrated Security Network", U.S. Appl. No. 18/472,628.
US Patent Application filed Sep. 25, 2023, entitled "Control System User Interface", U.S. Appl. No. 18/474,039.
US Patent Application filed Sep. 27, 2019, entitled "Control System User Interface", U.S. Appl. No. 16/585,481.
US Patent Application filed Sep. 28, 2018, entitled "Control System User Interface", U.S. Appl. No. 16/146,715.
US Patent Application filed Sep. 28, 2018, entitled "Forming a Security Network Including Integrated Security System Components and Network Devices", U.S. Appl. No. 16/147,044.
US Patent Application filed Sep. 11, 18, entitled "Premises Management Networking", U.S. Appl. No. 16/128,089.
US Patent Application filed Oct. 1, 2018, entitled "Integrated Security System With Parallel Processing Architecture", U.S. Appl. No. 16/148,387.
US Patent Application filed Oct. 1, 2018, entitled "Integrated Security System with Parallel Processing Architecture", U.S. Appl. No. 16/148,411.
US Patent Application filed Oct. 1, 2018, entitled "User Interface in a Premises Network", U.S. Appl. No. 16/148,572.
US Patent Application filed Oct. 3, 2018, entitled "Activation of a Home Automation Controller", U.S. Appl. No. 16/150,973.
US Patent Application filed Oct. 7, 2022, entitled "Security System With Networked Touchscreen", U.S. Appl. No. 18/045,018.
US Patent Application filed Oct. 8, 2020, entitled "Communication Protocols in Integrated Systems", U.S. Appl. No. 17/065,841.
US Patent Application filed Oct. 9, 2023, entitled "Integrated Security System With Parallel Processing Architecture", U.S. Appl. No. 18/483,080.
US Patent Application filed Oct. 9, 2023, entitled "Method and System for Managing Communication Connectivity", U.S. Appl. No. 18/483,196.
US Patent Application filed Oct. 10, 2018, entitled "Method and System for Providing Alternate Network Access", U.S. Appl. No. 16/156,448.
US Patent Application filed Oct. 12, 2020, entitled "Integrated Security System With Parallel Processing Architecture", U.S. Appl. No. 17/068,584.
US Patent Application filed Oct. 13, 2017, entitled "Notification of Event Subsequent to Communication Failure With Security System", U.S. Appl. No. 15/783,858.
US Patent Application filed Oct. 18, 2018, entitled "Generating Risk Profile Using Data of Home Monitoring And Security System", U.S. Appl. No. 16/164,114.
US Patent Application filed Oct. 18, 2019, entitled "WiFi-To-Serial Encapsulation in Systems", U.S. Appl. No. 16/656,874.
US Patent Application filed Oct. 25, 2021, entitled "Forming a Security Network Including Integrated Security System Components and Network Devices", U.S. Appl. No. 17/510,022.
US Patent Application filed Oct. 26, 2023, entitled "Controlling Data Routing in Premises Management Systems", U.S. Appl. No. 18/495,430.
US Patent Application filed Oct. 27, 2017, entitled "Security System With Networked Touchscreen", U.S. Appl. No. 15/796,421.
US Patent Application filed Nov. 6, 2023, entitled "Method, System and Apparatus for Automated Inventory Reporting of Security, Monitoring and Automation Hardware and Software at Customer Premises", U.S. Appl. No. 18/503,102.
US Patent Application filed Nov. 10, 2020, entitled "Integrated Cloud System for Premises Automation", U.S. Appl. No. 17/094,120.
US Patent Application filed Nov. 15, 2021, entitled "Communication Protocols in Integrated Systems", U.S. Appl. No. 17/526,915.
US Patent Application filed Nov. 15, 2021, entitled "Integrated Cloud System With Lightweight Gateway for Premises Automation", U.S. Appl. No. 17/455,005.
US Patent Application filed Nov. 19, 2019, entitled "Integrated Cloud System With Lightweight Gateway for Premises Automation", U.S. Appl. No. 16/688,717.
US Patent Application filed Nov. 22, 2023, entitled "Communication Protocols Over Internet Protocol (IP) Networks", U.S. Appl. No. 18/517,821.
US Patent Application filed Nov. 23, 2021, entitled "Security, Monitoring and Automation Controller Access and Use of Legacy Security Control Panel Information", U.S. Appl. No. 17/534,088.
US Patent Application filed Nov. 25, 2020, entitled "Premises Management Networking", U.S. Appl. No. 17/105,235.
US Patent Application filed Nov. 26, 2019, entitled "Communication Protocols Over Internet Protocol (IP) Networks", U.S. Appl. No. 16/696,657.

(56) References Cited

OTHER PUBLICATIONS

US Patent Application filed Nov. 27, 2023, entitled "Networked Touchscreen With Integrated Interfaces", U.S. Appl. No. 18/520,373.
US Patent Application filed Nov. 28, 2017, entitled "Forming a Security Network Including Integrated Security System Components", U.S. Appl. No. 15/824,503.
US Patent Application filed Nov. 29, 2018, entitled "Premise Management Systems and Methods", U.S. Appl. No. 16/204,442.
US Patent Application filed Nov. 29, 2022, entitled "Communication Protocols Over Internet Protocol (IP) Networks", U.S. Appl. No. 18/059,604.
US Patent Application filed Nov. 30, 2017, entitled "Controller and Interface for Home Security, Monitoring and Automation Having Customizable Audio Alerts for SMA Events", U.S. Appl. No. 15/828,030.
US Patent Application filed Nov. 30, 2022, entitled "Custom Content for Premises Management", U.S. Appl. No. 18/060,374.
US Patent Application filed Dec. 1, 2022, entitled "Controlling Data Routing in Premises Management Systems", U.S. Appl. No. 18/073,514.
US Patent Application filed Dec. 3, 2021, entitled "Communication Protocols in Integrated Systems", U.S. Appl. No. 17/542,302.
US Patent Application filed Dec. 3, 2021, entitled "Control System User Interface", U.S. Appl. No. 17/457,463.
US Patent Application filed Dec. 3, 2021, entitled "Method and System for Managing Communication Connectivity", U.S. Appl. No. 17/542,310.
US Patent Application filed Dec. 9, 2020, entitled "Integrated Security System With Parallel Processing Architecture", U.S. Appl. No. 17/115,936.
US Patent Application filed Dec. 14, 2018, entitled "Communication Protocols Over Internet Protocol (IP) Networks", U.S. Appl. No. 16/221,299.
US Patent Application filed Dec. 17, 2021, entitled "Cross-Client Sensor User Interface in an Integrated Security Network", U.S. Appl. No. 17/644,935.
US Patent Application filed Dec. 23, 2021, entitled "Defining and Implementing Sensor Triggered Response Rules", U.S. Appl. No. 17/645,889.
US Patent Application filed Dec. 27, 2018, entitled "Communication Protocols in Integrated Systems", U.S. Appl. No. 16/233,913.
US Patent Application filed Dec. 27, 2019, entitled "Premises Management Systems", U.S. Appl. No. 16/728,608.
PCT Application filed on Aug. 17, 2016, entitled "Automation System User Interface", PCT/US2016/047262.
PCT Application filed on Oct. 13, 2016, entitled "Coordinated Control of Connected Devices in a Premise", PCT/US2016/056842.
PCT Application filed on Nov. 17, 2016, entitled "Mobile Premises Automation Platform", PCT/US2016/062519.
Prashyanusorn et al., "Sustainable tourism using security cameras with privacy protecting ability", Journal of Information Security, 2010, vol. 1, pp. 68-73.
Requirement for Restriction/Election mailed Jan. 22, 2013 for U.S. Appl. No. 13/104,932, filed May 10, 2011.
Requirement for Restriction/Election mailed Jan. 22, 2013 for U.S. Appl. No. 13/104,936, filed May 10, 2011.
Requirement for Restriction/Election mailed Oct. 24, 2012 for U.S. Appl. No. 12/750,470, filed Mar. 30, 2010.
Security for the Future, Introducing 5804BD—Advanced two-way wireless remote technology, Advertisement, ADEMCO Group, Syosset, NY, circa 1997.
Shang, Wei-Lai, "Study on Application Embedded Intelligent Area System", Journal of Anyang Institute of Technology, Dec. 2010, vol. 9, No. 6, pp. 56-57 and 65.
South African Patent App. No. 2013/02668, corresponds to WO2012/040653, Mar. 2012.
Supplemental European Search Report for Application No. EP05725743.8 mailed on Sep. 14, 2010, 2 pages.
Supplementary European Search Report for Application No. EP10819658, mailed on Mar. 10, 2015, 2 pages.
Supplementary European Search Report for Application No. EP11827671, mailed on Mar. 10, 2015, 2 pages.
Supplementary Partial European Search Report for Application No. EP09807196, mailed on Nov. 17, 2014, 5 pages.
Supplementary European Search Report for Application No. EP2191351, mailed on Jun. 23, 2014, 2 pages.
Supplementary Non-Final Office Action mailed Oct. 28, 2010 for U.S. Appl. No. 12/630,092, filed Dec. 3, 2009.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United States Patent and Trademark Office—Before the Patent Trial and Appeal Board, Alarm.com (U.S. Pat. No. 8,350,69461) (inventors Stephen Scott Trundle & Alison Jane Slavin) V iControl Networks, Inc. (U.S. Appl. No. 13/311,365) (Inventors. Poulj. Dawes, Jim Fulker, Carolyn Wales, Reza Raji, and Gerald Gutt), Patent Interference 106,001 (HH6) (Technology Center 24000), Mar. 31, 2015.
US Patent Application filed Jan. 3, 2019, entitled "Methods and Systems for Data Communication", U.S. Appl. No. 16/239,114.
US Patent Application filed Jan. 4, 2024, entitled "Media Content Management", U.S. Appl. No. 18/403,953.
US Patent Application filed Jan. 5, 2023, entitled "Systems and Methods for Device Communication", U.S. Appl. No. 18/150,316.
US Patent Application filed Jan. 11, 2021, entitled "Premise Management Systems and Methods", U.S. Appl. No. 17/145,773.
US Patent Application filed Jan. 13, 2023, entitled "Communication Protocols in Integrated Systems", U.S. Appl. No. 18/154,590.
US Patent Application filed Jan. 14, 2022, entitled "Mobile Premises Automation Platform", U.S. Appl. No. 17/576,336.
US Patent Application filed Jan. 19, 2023, entitled "Premises Management Configuration and Control", U.S. Appl. No. 18/157,030.
US Patent Application filed Jan. 22, 2019, entitled "Data Model for Home Automation", U.S. Appl. No. 16/254,535.
US Patent Application filed Jan. 22, 2019, entitled "Premises System Automation", U.S. Appl. No. 16/254,480.
US Patent Application filed Jan. 23, 2020, entitled "Forming a Security Network Including Integrated Security System Components and Network Dev", U.S. Appl. No. 16/750,976.
US Patent Application filed Jan. 24, 2023, entitled "Server-Based Notification of Alarm Event Subsequent to Communication Failure With Armed Security System", U.S. Appl. No. 18/158,876.
US Patent Application filed Jan. 25, 2019, entitled Communication Protocols in Integrated Systems, U.S. Appl. No. 16/257,706.
US Patent Application filed Jan. 26, 2023, entitled "System for Data Routing in Networks", U.S. Appl. No. 18/159,869.
US Patent Application filed Jan. 28, 2019, entitled "Automation System User Interface With Three-Dimensional Display", U.S. Appl. No. 16/258,858.
US Patent Application filed Feb. 2, 2018, entitled "Three-Way Switch", U.S. Appl. No. 15/887,535.
US Patent Application filed Feb. 6, 2020, entitled "Activation of Gateway FDevice", 16/784, 159.
US Patent Application filed Feb. 7, 2024, entitled "Defining and Implementing Sensor Triggered Response Rules", U.S. Appl. No. 18/435,908.
US Patent Application filed Feb. 8, 2022, entitled "Server-Based Notification of Alarm Event Subsequent to Communication Failure With Armed Security System", U.S. Appl. No. 17/650,324.
US Patent Application filed Feb. 8, 2023, entitled "Management of a Security System at a Premises", U.S. Appl. No. 18/166,052.
US Patent Application filed Feb. 8, 2023, entitled "Premises Management Configuration and Control", U.S. Appl. No. 18/166,046.
US Patent Application filed Feb. 9, 2021, entitled "Premises Management Networking", U.S. Appl. No. 17/171,398.
US Patent Application filed Feb. 13, 2023, entitled "Premise Management Systems and Methods", U.S. Appl. No. 18/168,314.
US Patent Application filed Feb. 29, 2024, entitled "Virtual Device Systems and Methods", U.S. Appl. No. 18/591,562.
US Patent Application filed Mar. 2, 2017, entitled "Generating Risk Profile Using Data of Home Monitoring and Security System", U.S. Appl. No. 15/447,982.

(56) References Cited

OTHER PUBLICATIONS

US Patent Application filed Mar. 2, 2020, entitled "Communication Protocols in Integrated Systems", U.S. Appl. No. 16/807,100.
US Patent Application filed Mar. 2, 2020, entitled "Coordinated Control of Connected Devices in a Premise", U.S. Appl. No. 16/807,028.
US Patent Application filed Mar. 7, 2014, entitled "Activation of Gateway Device", U.S. Appl. No. 14/201,162.
US Patent Application filed Mar. 7, 2014, entitled "Communication Protocols in Integrated Systems", U.S. Appl. No. 14/200,921.
US Patent Application filed Mar. 7, 2014, entitled "Device Integration Framework", U.S. Appl. No. 14/201,227.
US Patent Application filed Mar. 7, 2014, entitled "Integrated Security and Control System With Geofencing", U.S. Appl. No. 14/201,189.
US Patent Application filed Mar. 7, 2014, entitled "Security System Integrated With Social Media Platform", U.S. Appl. No. 14/201,133.
US Patent Application filed Mar. 10, 2014, entitled "Communication Protocols in Integrated Systems", U.S. Appl. No. 14/202,573.
US Patent Application filed Jun. 1, 2022, entitled "Integrated Cloud System for Premises Automation", U.S. Appl. No. 17/804,941.
US Patent Application filed Jun. 8, 2022, entitled "Methods and Systems for Data Communication", U.S. Appl. No. 17/835,394.
US Patent Application filed Jun. 9, 2021, entitled "Premises Management Configuration and Control", U.S. Appl. No. 17/343,315.
US Patent Application filed Jun. 10, 2020, entitled "Method and System for Communicating With and Controlling an Alarm System From a Remote Server", U.S. Appl. No. 16/898,146.
US Patent Application filed Jun. 10, 2022, entitled "Media Content Management", U.S. Appl. No. 17/838,046.
US Patent Application filed Jun. 10, 2022, entitled "Method, System and Apparatus for Automated Reporting of Account and Sensor Zone Information to a Central Station", U.S. Appl. No. 17/806,341.
US Patent Application filed Jun. 18, 2021, entitled "Controlling Data Routing Among Networks", U.S. Appl. No. 17/304,342.
US Patent Application filed Jun. 22, 2022, entitled "Activation of Gateway Device", U.S. Appl. No. 17/808,146.
US Patent Application filed Jun. 22, 2022, entitled "Automation System User Interface With Three-Dimensional Display", U.S. Appl. No. 17/808,275.
US Patent Application filed Jun. 22, 2022, entitled "Communication Protocols in Integrated Systems", U.S. Appl. No. 17/808,118.
US Patent Application filed Jun. 24, 2020, entitled "Method and System for Processing Security Event Data", U.S. Appl. No. 16/910,967.
US Patent Application filed Jun. 27, 2018, entitled "Activation of Gateway Device", U.S. Appl. No. 16/020,499.
US Patent Application filed Jul. 1, 2022, entitled "Forming a Security Network Including Integrated Security System Components", U.S. Appl. No. 17/856,448.
US Patent Application filed Jul. 1, 2024, entitled "Activation of Gateway Device", U.S. Appl. No. 18/760,383.
US Patent Application filed Jul. 2, 2019, entitled "Communication Protocols in Integrated Systems", U.S. Appl. No. 16/460,712.
US Patent Application filed Jul. 3, 2018, entitled "WiFi-To-Serial Encapsulation in Systems", U.S. Appl. No. 16/026,703.
US Patent Application filed Jul. 9, 2020, entitled "Automation System With Mobile Interface", U.S. Appl. No. 16/925,026.
US Patent Application filed Jul. 12, 2018, entitled "Integrated Security System with Parallel Processing Architecture", U.S. Appl. No. 16/034,132.
US Patent Application filed Jul. 13, 2023, entitled "Methods and Systems for Data Communication", U.S. Appl. No. 18/351,636.
US Patent Application filed Jul. 14, 2023, entitled "Bidirectional Security Sensor Communication for a Premises Security System", U.S. Appl. No. 18/352,803.
US Patent Application filed Jul. 20, 2018, entitled "Cross-Client Sensor User Interface in an Integrated Security Network", U.S. Appl. No. 16/041,291.
US Patent Application filed Jul. 21, 2023, entitled "Communication Protocols in Integrated Systems", U.S. Appl. No. 18/356,337.
US Patent Application filed Jul. 26, 2019, entitled "Device Integration Framework", U.S. Appl. No. 16/522,949.
US Patent Application filed Jul. 26, 2021, entitled "Notification of Event Subsequent to Communication Failure With Security System", U.S. Appl. No. 17/443,427.
US Patent Application filed Jul. 28, 2016, entitled "Method and System for Automatically Providing Alternate Network Access for Telecommunications", U.S. Appl. No. 15/222,416.
US Patent Application filed Jul. 30, 2021, entitled "Gateway Integrated With Premises Security System", U.S. Appl. No. 17/390,222.
US Patent Application filed Aug. 3, 2022, entitled "Premises Management Networking", U.S. Appl. No. 17/817,210.
US Patent Application filed Aug. 8, 2016, entitled "Security, Monitoring and Automation Controller Access and Use of Legacy Security Control Panel Information", U.S. Appl. No. 15/231,273.
US Patent Application filed Aug. 8, 2024, entitled "Custom Content for Premises Management", U.S. Appl. No. 18/798,419.
US Patent Application filed Aug. 9, 2016, entitled "Controller and Interface for Home Security, Monitoring and Automation Having Customizable Audio Alerts for SMA Events", U.S. Appl. No. 15/232,135.
US Patent Application filed Aug. 9, 2018, entitled "Method and System for Processing Security Event Data", U.S. Appl. No. 16/059,833.
US Patent Application filed Aug. 10, 2021, entitled "Media Content Management", U.S. Appl. No. 17/398,939.
US Patent Application filed Aug. 11, 2022, entitled "Security Network Integrating Security System and Network Devices", U.S. Appl. No. 17/819,083.
US Patent Application filed Aug. 15, 2024, entitled "Method and System for Processing Security Event Data", U.S. Appl. No. 18/806,202.
US Patent Application filed Aug. 16, 2021, entitled "Control System User Interface", U.S. Appl. No. 17/403,526.
US Patent Application filed Aug. 16, 2023, entitled "Mobile Premises Automation Platform", U.S. Appl. No. 18/450,878.
US Patent Application filed Aug. 21, 2018, entitled "Premises System Management Using Status Signal" U.S. Appl. No. 16/107,568.
US Patent Application filed Aug. 23, 2019, entitled "Premises System Management Using Status Signal" U.S. Appl. No. 16/549,837.
US Patent Application filed Aug. 23, 2021, entitled "Method and System for Providing Alternate Network Access", U.S. Appl. No. 17/409,528.
US Patent Application filed Aug. 25, 2023, entitled "Automation System With Mobile Interface", U.S. Appl. No. 18/456,355.
US Patent Application filed Aug. 26, 2020, entitled "Automation System User Interface With Three-Dimensional Display", U.S. Appl. No. 17/003,550.
US Patent Application filed Aug. 31, 2021, entitled "Networked Touchscreen With Integrated Interfaces", U.S. Appl. No. 17/463,267.
US Patent Application filed Sep. 1, 2023, entitled "Communication and Automation in a Premises Management System", U.S. Appl. No. 18/460,355.
US Patent Application filed Sep. 6, 2018, entitled "Takeover of Security Network", U.S. Appl. No. 16/123,695.
US Patent Application filed Sep. 7, 2021, entitled "Gateway Registry Methods and Systems", U.S. Appl. No. 17/468,188.
US Patent Application filed Sep. 8, 2021, entitled "User Interface in a Premises Network", U.S. Appl. No. 17/469,417.
US Patent Application filed Sep. 9, 2021, entitled "Premises System Management Using Status Signal", U.S. Appl. No. 17/470,732.
US Patent Application filed Sep. 10, 2020, entitled "Security System With Networked Touchscreen", U.S. Appl. No. 17/017,519.
US Patent Application filed Sep. 11, 2020, entitled "Management of Applications for a Device Located at a Premises", U.S. Appl. No. 17/018,901.
US Patent Application filed Sep. 17, 2018, entitled "Integrated Security System With Parallel Processing Architecture", U.S. Appl. No. 16/133,135.
"Associate". Merriaim-Webster.com Dictionary, Merriam-Webster, https://web.archive.org/web/20061209213742/https://www.meniam-webster.com/dictionary/associate. Dec. 9, 2006.
"Dragging" The Authoritative Dictionary of IEEE Standard Terms. 7th ed. 2000, p. 337.
"Icon", Newton's Telecom Dictionary, 21st ed., Mar. 2005.

(56) References Cited

OTHER PUBLICATIONS

"Indicate". Memam-Webster.com Dictionary, Merriam-Webster, https://web.archive.org/web/20061209080613/https://www.merriam-webster.com/dictionary/indicate. Dec. 9, 2006.
"Application" The Authoritative Dictionary of IEEE Standard Terms. 7th ed. 2000.
"Modular programming", The Authoritative Dictionary of IEEE Standard Terms. 7th ed. 2000.
3rd Generation Partnership Project! Technical Specification Group Services and System Aspects! Architecture enhancements to facilitate communications with packet data networks and application, Mar. 2015, 3GPP TS 23.682 V12.3.0, pp. 8-10. (Year: 2015).
6270 Touch Screen Keypad Notes, Floneywell, Sep. 2006.
Alarm.com—Interactive Security Systems, Elders [retrieved on Nov. 4, 2003], 1 page.
Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
AU application filed on Feb. 28, 2017, entitled "Control System User Interface", 2017201365.
AU application filed on Mar. 8, 2017, entitled "Integrated Security Network with Security Alarm Signaling System", 2017201585.
CA application filed on Aug. 15, 2017, entitled "Automation System User Interface", 2976682.
CA application filed on Aug. 16, 2017, entitled "Automation System User Interface", 2976802.
Chapter 6, Securing TCP/IP, pp. 135-164, Oct. 12, 2004.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Control Panel Standard—Features for False Alarm Reduction, The Security Industry Association, SIA 2009, pp. 1-48.
CorAccess Systems, Companion 6 User Guide, Jun. 17, 2002.
Court action filed for U.S. Pat. Nos. 7,262,690; 7,911,341; 8,073,931; 8,335,842; 8,473,619; 8,478,844 in U.S. District Court, Estern District of Virginia, Case No. 1:13-CV-00834, between iControl Networks, Inc. (Plaintiff) vs Alarm.com Incorporated et al. (Defendant) on Jul. 10, 2013.
Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.
Elwahab et al. ; Device, System and . . . Customer Premises Gateways, Sep. 27, 2001; WO 01/71489.
EP application filed on Jun. 9, 2016, entitled, "Data Model for Flome Automation", 16808247.7.
EP application filed on Aug. 16, 2017, entitled, "Automation System User Interface", 17186497.8.
EP examination report issued in EP08797646.0, dated May 17, 2017, 11 pages.
Examination Report under Section 18(3) re for UK Patent Application No. GB0620362.4, mailed on Aug. 13, 2007.
Examination Report under Section 18(3) re for UK Patent Application No. GB0724248.0, mailed on Jun. 4, 2008.
Examination Report under Section 18(3) re for UK Patent Application No. GB0724760.4, mailed on Jan. 30, 2008.
Examination Report under Section 18(3) re for UK Patent Application No. GB0800040.8, mailed on Jan. 30, 2008.
Faultline, "AT&T Targets video home security as next broadband market"; Nov. 2, 2006; The Register; 2 Pages.
File, The Authoritative Dictionary of IEEE Standard Terms. 7th ed. 2000, pp. 432.
Final Office Action mailed Aug. 1, 2011 for U.S. Appl. No. 12/630,092, filed Dec. 3, 2009.
Final Office Action mailed Jun. 1, 2009 for U.S. Appl. No. 11/084,232, filed Mar. 16, 2005.
Final Office Action mailed Jun. 5, 2012 for U.S. Appl. No. 12/771,071, filed Apr. 30, 2010.
Final Office Action mailed May 9, 2013 for U.S. Appl. No. 12/189,780, filed Aug. 11, 2008.
Final Office Action mailed May 9, 2013 for U.S. Appl. No. 12/952,080, filed Nov. 22, 2010.
Final Office Action mailed Jan. 10, 2011 for U.S. Appl. No. 12/189,785, filed Aug. 11, 2008.
Final Office Action mailed Jun. 10, 2011 for U.S. Appl. No. 11/084,232, filed Mar. 16, 2005.
Final Office Action mailed Jan. 13, 2011 for U.S. Appl. No. 12/189,780, filed Aug. 11, 2008.
Final Office Action mailed Oct. 17, 2012 for U.S. Appl. No. 12/637,671, filed Dec. 14, 2009.
Final Office Action mailed Sep. 17, 2012 for U.S. Appl. No. 12/197,958, filed Aug. 25, 2008.
Final Office Action mailed Mar. 21, 2013 for U.S. Appl. No. 12/691,992, filed Jan. 22, 2010.
Final Office Action mailed Jul. 23, 2013 for U.S. Appl. No. 13/531,757, filed Jun. 25, 2012.
Final Office Action mailed Feb. 26, 2013 for U.S. Appl. No. 12/771,471, filed Apr. 30, 2010.
Final Office Action mailed Jun. 29, 2012 for U.S. Appl. No. 12/539,537, filed Aug. 11, 2009.
Final Office Action mailed Dec. 31, 2012 for U.S. Appl. No. 12/770,365, filed Apr. 29, 2010.
Final Office Action mailed Oct. 31, 2012 for U.S. Appl. No. 12/771,624, filed Apr. 30, 2010.
Final Office Action mailed Feb. 16, 2011 for U.S. Appl. No. 12/019,568, filed Jan. 24, 2008.
Final Office Action mailed Jul. 12, 2010 for U.S. Appl. No. 12/019,554, filed Jan. 24, 2008.
K. Lee, D. Murray, D. Hughes and W. Joosen, "Extending sensor networks into the Cloud using Amazon Web Services," 2010 IEEE International Conference on Networked Embedded Systems for Enterprise Applications, 2010.
Kobayashi et al., "Creating worldwide community safety with present technology and privacy protection: The e-JIKEI Network project", Procedia-Social and Behavioral Sciences, 2010, vol. 2, pp. 6-13.
Lagotek Wireless Home Automation System, May 2006 [retrieved on Aug. 22, 2012].
Network Working Group, Request for Comments H.Schulzrinne Apr. 1998.
Non-Final Office Action mailed Apr. 4, 2013 for U.S. Appl. No. 12/197,931, filed Aug. 25, 2008.
Non-Final Office Action mailed Mar. 4, 2013 for U.S. Appl. No. 13/400,477, filed Feb. 20, 2012.
Non-Final Office Action mailed May 5, 2010 for U.S. Appl. No. 12/189,780, filed Aug. 11, 2008.
Non-Final Office Action mailed May 5, 2010 for U.S. Appl. No. 12/189,785, filed Aug. 11, 2008.
Non-Final Office Action mailed Feb. 7, 2012 for U.S. Appl. No. 12/637,671, filed Dec. 14, 2009.
Non-Final Office Action mailed Feb. 7, 2013 for U.S. Appl. No. 12/970,313, filed Dec. 16, 2010.
Non-Final Office Action mailed Feb. 8, 2012 for U.S. Appl. No. 12/630,092, filed Dec. 3, 2009.
Non-Final Office Action mailed Apr. 9, 2012 for U.S. Appl. No. 12/771,624, filed Apr. 30, 2010.
Non-Final Office Action mailed Dec. 9, 2008 for U.S. Appl. No. 11/084,232, filed Mar. 16, 2005.
Non-Final Office Action mailed Aug. 10, 2012 for U.S. Appl. No. 12/771,471, filed Apr. 30, 2010.
Non-Final Office Action mailed Oct. 11, 2012 for U.S. Appl. No. 12/019,568, filed Jan. 24, 2008.
Non-Final Office Action mailed Apr. 12, 2012 for U.S. Appl. No. 12/770,365, filed Apr. 29, 2010.
Non-Final Office Action mailed Jul. 12, 2012 for U.S. Appl. No. 12/691,992, filed Jan. 22, 2010.

(56) References Cited

OTHER PUBLICATIONS

Non-Final Office Action mailed Oct. 12, 2012 for U.S. Appl. No. 12/630,092, filed Dec. 3, 2009.
Non-Final Office Action mailed Sep. 12, 2012 for U.S. Appl. No. 12/952,080, filed Nov. 22, 2010.
Non-Final Office Action mailed Jul. 13, 2010 for U.S. Appl. No. 12/019,568, filed Jan. 24, 2008.
Non-Final Office Action mailed Nov. 14, 2012 for U.S. Appl. No. 13/531,757, filed Jun. 25, 2012.
Non-Final Office Action mailed Sep. 14, 2010 for U.S. Appl. No. 11/084,232, filed Mar. 16, 2005.
Non-Final Office Action mailed Sep. 16, 2011 for U.S. Appl. No. 12/539,537, filed Aug. 11, 2009.
Non-Final Office Action mailed Sep. 17, 2012 for U.S. Appl. No. 12/189,780, filed Aug. 11, 2008.
Non-Final Office Action mailed Aug. 18, 2011 for U.S. Appl. No. 12/197,958, filed Aug. 25, 2008.
Non-Final Office Action mailed Feb. 18, 2011 for U.S. Appl. No. 12/630,092, filed Dec. 3, 2009.
Non-Final Office Action mailed Jan. 18, 2012 for U.S. Appl. No. 12/771,071, filed Apr. 30, 2010.
Non-Final Office Action mailed Jul. 21, 2010 for U.S. Appl. No. 12/630,092, filed Dec. 3, 2009.
Non-Final Office Action mailed Dec. 22, 2010 for U.S. Appl. No. 12/197,931, filed Aug. 25, 2008.
Non-Final Office Action mailed Jul. 22, 2013 for U.S. Appl. No. 12/630,092, filed Dec. 3, 2009.
Non-Final Office Action mailed Jan. 26, 2012 for U.S. Appl. No. 12/019,568, filed Jan. 24, 2008.
Non-Final Office Action mailed Nov. 26, 2010 for U.S. Appl. No. 12/197,958, filed Aug. 25, 2008.
Non-Final Office Action mailed Jun. 27, 2013 for U.S. Appl. No. 12/019,568, filed Jan. 24, 2008.
Non-Final Office Action mailed Dec. 30, 2009 for U.S. Appl. No. 11/084,232, filed Mar. 16, 2005.
Non-Final Office Action mailed May 30, 2008 for U.S. Appl. No. 11/084,232, filed Mar. 16, 2005.
Non-Final Office Action mailed Apr. 13, 2010 for U.S. Appl. No. 11/761,745, filed Jun. 12, 2007.
Non-Final Office Action mailed Feb. 21, 2013 for U.S. Appl. No. 12/771,372, filed Apr. 30, 2010.
Non-Final Office Action mailed Jan. 5, 2010 for U.S. Appl. No. 12/019,554, filed Jan. 24, 2008.
Non-Final Office Action mailed May 23, 2013 for U.S. Appl. No. 13/104, 932, filed May 10, 2011.
Non-Final Office Action mailed May 23, 2013 for U.S. Appl. No. 13/104,936, filed May 10, 2011.
Non-Final Rejection Mailed on Jan. 20, 2023 for U.S. Appl. No. 17/712,911, 8 pages.
Notice of Allowance mailed May 14, 2013 for U.S. Appl. No. 12/637,671, filed Dec. 14, 2009.
Notice of Allowance mailed Oct. 25, 2012 for U.S. Appl. No. 11/084,232, filed Mar. 16, 2005.
Oxford Dictionary, Definition of "application", 2021, 2 pages (Year: 2021).
PCT Application filed on Jun. 9, 2016, entitled "Virtual Device Systems and Methods", PCT/US2016/036674.
PCT Application filed on Jun. 29, 2016, entitled "Integrated Cloud System for Premises Automation", PCT/US2016/040046.
PCT Application filed on Jun. 30, 2016, entitled "Integrated Cloud System with Lightweight Gateway for Premises Automation", PCT/US2016/040451.
PCT Application filed on Jul. 7, 2016, entitled "Automation System User Interface with Three-Dimensional Display", PCT/US2016/041353.
PCT Application filed on Aug. 16, 2016, entitled "Automation System User Interface", PCT/US2016/047172.
US Patent Application filed Mar. 10, 2014, entitled "Communication Protocols in Integrated Systems", U.S. Appl. No. 14/202,592.
US Patent Application filed Mar. 10, 2014, entitled "Communication Protocols in Integrated Systems", U.S. Appl. No. 14/202,627.
US Patent Application filed Mar. 10, 2014, entitled "Communication Protocols in Integrated Systems", U.S. Appl. No. 14/202,685.
US Patent Application filed Mar. 10, 2014, entitled "Communication Protocols in Integrated Systems", U.S. Appl. No. 14/203,077.
US Patent Application filed Mar. 10, 2014, entitled "Communication Protocols in Integrated Systems", U.S. Appl. No. 14/203,084.
US Patent Application filed Mar. 10, 2014, entitled "Communication Protocols in Integrated Systems", U.S. Appl. No. 14/203,128.
US Patent Application filed Mar. 10, 2014, entitled "Communication Protocols in Integrated Systems", U.S. Appl. No. 14/203,141.
US Patent Application filed Mar. 10, 2014, entitled "Communication Protocols in Integrated Systems", U.S. Appl. No. 14/203,219.
US Patent Application filed Mar. 10, 2014, entitled "Communication Protocols Over Internet Protocol (IP) Networks", U.S. Appl. No. 14/202,505.
US Patent Application filed Mar. 10, 2014, entitled "Communication Protocols Over Internet Protocol (IP) Networks", U.S. Appl. No. 14/202,579.
US Patent Application filed Mar. 10, 2022, entitled "Virtual Device Systems and Methods", U.S. Appl. No. 17/691,774.
US Patent Application filed Mar. 11, 2020, entitled "Management of a Security System at a Premises", U.S. Appl. No. 16/816,134.
US Patent Application filed Mar. 15, 2021, entitled "Automation System User Interface", U.S. Appl. No. 17/202,279.
US Patent Application filed Mar. 17, 2021, entitled "Communication Protocols Over Internet Protocol (IP) Networks", U.S. Appl. No. 17/204,068.
US Patent Application filed Mar. 18, 2019, entitled "Server-Based Notification of Alarm Event Subsequent to Communication Failure With Armed Security System", U.S. Appl. No. 16/356,742.
US Patent Application filed Mar. 20, 2020, entitled "Security, Monitoring and Automation Controller Access and Use of Legacy Security Control Panel Information", U.S. Appl. No. 16/825,099.
US Patent Application filed Mar. 22, 2021, entitled "Premises Management Configuration and Control", U.S. Appl. No. 17/208,866.
US Patent Application filed Apr. 4, 2022, entitled "Control System User Interface", U.S. Appl. No. 17/712,911.
US Patent Application filed Apr. 6, 2022, entitled "Hardware Configurable Security, Monitoring and Automation Controller Having Modular Communication Protocol Interfaces", U.S. Appl. No. 17/714,499.
US Patent Application filed Apr. 8, 2021, entitled "System for Data Routing in Networks", U.S. Appl. No. 17/301,605.
US Patent Application filed Apr. 12, 2023, entitled "Integrated Security System With Parallel Processing Architecture", U.S. Appl. No. 18/299,394.
US Patent Application filed Apr. 14, 2022, entitled "Premises Management Configuration and Control", U.S. Appl. No. 17/659,259.
US Patent Application filed Apr. 14, 2022, entitled "Premises System Automation", U.S. Appl. No. 17/721,192.
US Patent Application filed Apr. 17, 2020, entitled "Method and System for Providing Alternate Network Access", U.S. Appl. No. 16/852,072.
US Patent Application filed Apr. 17, 2020, entitled "Networked Touchscreen With Integrated Interfaces", U.S. Appl. No. 16/852,058.
US Patent Application filed Apr. 17, 2023, entitled "Integrated Cloud System for Premises Automation", U.S. Appl. No. 18/301,626.
US Patent Application filed Apr. 17, 2023, entitled "Server-Based Notification of Alarm Event Subsequent to Communication Failure With Armed Security System", U.S. Appl. No. 18/301,923.
US Patent Application filed Apr. 18, 2022, entitled "Method and System for Processing Security Event Data", U.S. Appl. No. 17/723,101.
US Patent Application filed Apr. 18, 2023, entitled "Method and System for Providing Alternate Network Access", U.S. Appl. No. 18/302,661, U.S. Appl. No. 18/302,661.
US Patent Application filed Apr. 19, 2024, entitled "Control System User Interface", U.S. Appl. No. 18/640,545.
US Patent Application filed Apr. 22, 2022, entitled "Communication Protocols in Integrated Systems", U.S. Appl. No. 17/727,470.
US Patent Application filed Apr. 23, 2019, entitled "Control System User Interface", U.S. Appl. No. 16/391,625.

(56) References Cited

OTHER PUBLICATIONS

US Patent Application filed Apr. 26, 2019, entitled "Custom Content for Premises Management", U.S. Appl. No. 16/396,368.
US Patent Application filed Apr. 27, 2023, entitled "Integrated Cloud System With Lightweight Gateway for Premises Automation", U.S. Appl. No. 18/307,985.
US Patent Application filed May 1, 2023, entitled "Premises System Management Using Status Signal", U.S. Appl. No. 18/310,294.
US patent application filed May 2, 2018, entitled "Automation System With Mobile Interface", U.S. Appl. No. 15/969,514.
US Patent Application filed May 4, 2022, entitled "Premises Management Configuration and Control", U.S. Appl. No. 17/736,408.
US Patent Application filed May 8, 2023, entitled "Communication Protocols in Integrated Systems", U.S. Appl. No. 18/314,002.
US Patent Application filed May 8, 2023, entitled "Integrated Cloud System With Lightweight Gateway for Premises Automation", U.S. Appl. No. 18/313,728.
US Patent Application filed May 8, 2023, entitled "Security Network Integrating Security System and Network Devices", U.S. Appl. No. 18/313,817.
US Patent Application filed May 10, 2021, entitled "Management of a Security System at a Premises", U.S. Appl. No. 17/316,402.
US Patent Application filed May 11, 2020, entitled "Control System User Interface", U.S. Appl. No. 16/871,151.
US Patent Application filed May 12, 2020, entitled "IP Device Discovery Systems and Methods", U.S. Appl. No. 15/930,029.
US Patent Application filed May 12, 2023, entitled "Virtual Device Systems and Methods", U.S. Appl. No. 18/316,580.
US Patent Application filed May 16, 2022, entitled "Automation System With Mobile Interface", U.S. Appl. No. 17/744,858.
US Patent Application filed May 19, 2020, entitled "User Interface in a Premises Network", U.S. Appl. No. 16/878,099.
US Patent Application filed May 23, 2018, entitled "Networked Touchscreen With Integrated Interfaces", U.S. Appl. No. 15/987,638.
US Patent Application filed May 23, 2022, entitled "Premise Management Systems and Methods", U.S. Appl. No. 17/664,524.
US Patent Application filed May 26, 2020, entitled "Premises Management Configuration and Control", U.S. Appl. No. 16/882,876.
US Patent Application filed Jun. 1, 2012, entitled "Gateway Registry Methods and Systems", U.S. Appl. No. 13/486,276.

* cited by examiner

ACTIVATION OF A HOME AUTOMATION CONTROLLER

CROSS-REFERENCE TO RELATED APPLICATIONS

This application is a continuation application of U.S. patent application Ser. No. 16/150,973, filed Oct. 3, 2018, now U.S. Pat. No. 11,997,584 on May 28, 2024, which is a continuation application of U.S. patent application Ser. No. 14/810,667, filed Jul. 28, 2015, issued as U.S. Pat. No. 10,237,806 on Mar. 19, 2019, which is a continuation of U.S. patent application Ser. No. 12/770,365, filed Apr. 29, 2010, issued as U.S. Pat. No. 9,100,446 on Aug. 4, 2015, which is a non-provisional of and claims the benefit of U.S. provisional Application No. 61/174,366, filed on Apr. 30, 2009.

BACKGROUND

Residential electronics and control standards provide an opportunity for a variety of options for securing, monitoring, and automating residences. Wireless protocols for transmission of security information permit placement of a multitude of security sensors throughout a residence without a need for running wires back to a central control panel. Inexpensive wireless cameras also allow for placement of cameras throughout a residence to enable easy monitoring of the residence. A variety of home automation control protocols have also been developed to allow for centralized remote control of lights, appliances, and environmental apparatuses (e.g., thermostats). Traditionally, each of these security, monitoring and automation protocols require separate programming, control and monitoring stations. To the extent that home automation and monitoring systems have been coupled to home security systems, such coupling has involved including the automation and monitoring systems as slaves to the existing home security system. This limits the flexibility and versatility of the automation and monitoring systems and ties such systems to proprietary architectures.

A security system alerts occupants of a dwelling and emergency authorities of a violation of premises secured by the system. A typical security system includes a controller connected by wireless or wired connections to sensors deployed at various locations throughout the secured dwelling. In a home, sensors are usually deployed in doorways, windows, and other points of entry. Motion sensors can also be placed strategically within the home to detect unauthorized movement, while smoke and heat sensors can detect the presence of fire.

A home monitoring system provides an ability to monitor a status of a home so that a user can be made aware of any monitored state changes. For example, when a sensor is tripped, real-time alerts and associated data such as video or photo clips can be sent to the user (e.g., to a network-connected computer or to a mobile device).

A home automation system enables automation and remote control of lifestyle conveniences such as lighting, heating, cooling, and appliances. Typically these various lifestyle conveniences are coupled to a controller via wireless or wired communications protocols. A central device is then used to program the various lifestyle conveniences.

Rather than having multiple devices to control each of the security, monitoring and automation environments, it is desirable to have a centralized controller capable of operating in each environment, thereby reducing the equipment needed in a dwelling. It is further desirable for such a controller to function as a gateway for external network access so that a user can control or monitor devices in locations remote from the dwelling.

Traditional home security and monitoring systems require specialized technicians and equipment to install the system and sensors. These traditional systems can take many hours to install. It is thus desirable for the security monitoring and automation controller of the present invention to incorporate an activation and provisioning workflow that allows for end-users or installers with minimal training to install the controller and associated sensors. It is further desirable for a security, monitoring and automation controller to incorporate activation and provisioning workflow that facilitates downloading of previously-stored configuration information of a previous controller or controller configuration to the controller, in order to avoid a process of reconfiguring the controller from scratch.

SUMMARY

Embodiments of the present invention provide a single platform that provides controller functionality for each of security, monitoring and automation, as well as providing a capacity to function as a bidirectional Internet gateway. Embodiments of the present invention provide such functionality by virtue of a configurable architecture that enables a user to adapt the system for the user's specific needs. Embodiments of the present invention further provide for a software-based installation workflow to activate and provision the controller and associated sensors and network. Embodiments of the present invention also provide for downloading of previously stored configuration data to the controller from a remote server.

One embodiment of the present invention provides for configuring a first security, monitoring and automation (SMA) controller by transmitting a unique identifier to a first remote computer over a network connection, wherein the unique identifier is associated with configuration data previously stored by a second remote computer, and the configuration data is compatible with the first SMA controller, receiving the configuration data, storing the configuration data in a memory of the first SMA controller, and configuring the first SMA controller with the stored configuration data.

In one aspect of this embodiment, the configuration data was provided to the second remote computer by a second SMA controller. In a further aspect, the configuration data was provided by the second SMA controller immediately subsequent to an initial configuration of the second SMA controller. In another further aspect, the configuration data was provided by the second SMA controller immediately subsequent to a modification of configuration data of the second SMA controller.

In another aspect of the above embodiment, the configuration data comprises one or more of configuration data for a home domain network, configuration data for a cellular network connection, configuration data for one or more security sensors and security zones, configuration data for one or more monitoring devices, configuration data for one or more home area network devices having an automation interface, configuration data for modular devices coupled to the first SMA controller, and widget programs and associated configuration data for those widget programs.

In another aspect of the above embodiment, the first SMA controller requests the unique identifier using a display device coupled to the first SMA controller. In another aspect of the above embodiment, the first SMA controller tests a communication path to a third remote computer subsequent to configuring the first SMA controller using the stored configuration data.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
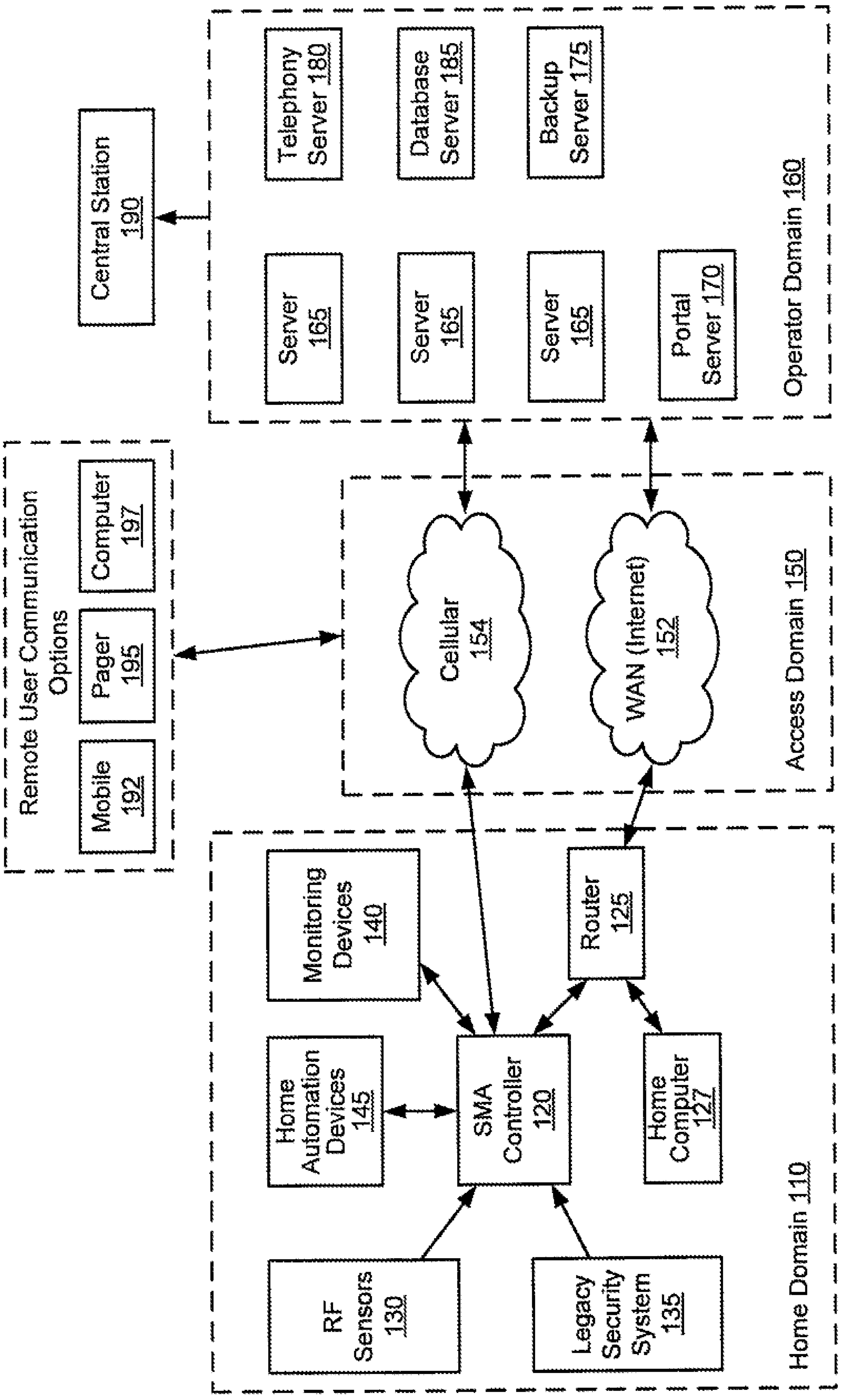
FIG. 1 is a simplified block diagram illustrating an architecture including a set of logical domains and functional entities within which embodiments of the present invention interact.

Embodiments of the present invention provide a single platform that provides controller functionality for each of security, monitoring and automation, as well as providing a capacity to function as a bidirectional Internet gateway. Embodiments of the present invention provide such functionality by virtue of a configurable architecture that enables a user to adapt the system for the user's specific needs. Embodiments of the present invention further provide for a software-based installation workflow to activate and provision the controller and associated sensors and network. In embodiments of the present invention, this workflow includes activation and provisioning through use of configuration data stored by a remote server and downloaded to the controller.

A typical security system installation requires several hours of a trained technician performing on-site procedures. One reason for this is that a typical security system uses a key pad that has a limited feedback capability and then only provides feedback in codes that require a manual to interpret. Further, a typical install requires keypad entry of hundreds of field codes to configure sensors and the central control unit to interpret signals from those sensors. For example, an installation technician must provide information for each sensor as to the type of sensor and the sensor's purpose. Many months of training are required in order to certify a technician to perform such installs. Providing such training requires a significant investment in capital by a security system provider. In addition, the on-site necessity of entry and interpretation of the many installation codes requires a significant amount of on-site time by those technicians. This is an additional investment in resources by the provider.

Embodiments of the present invention address the resource intensive issues presented by installation of traditional systems. The automated installation workflow provided by embodiments of the present invention enables a minimally-trained technician or even an end user to perform an installation of the security, monitoring and automation system. A touch screen display provides detailed information about each step of the installation workflow, and feedback about the results of each step. Embodiments of the present invention thus enable an installation to be performed with significantly reduced on-site presence of a technician, thereby conserving both monetary and human resources of a provider of security, monitoring and automation system services.

In addition, if a typical security system suffers from a failure such that the controller of the system must be replaced, then an installer of the replacement system will need to repeat the entire installation process of providing keypad sequences and recoding all zone and sensor identification information. Embodiments of the present invention provide for remotely storing configuration data and using that remotely stored configuration data to configure a replacement of the original controller. The stored configuration data can also be used in other scenarios, such as reconfiguration after a factory reset of a controller.

Architectural Overview

Embodiments of the configurable security, monitoring and automation (SMA) controller of the present invention provide not only for communicating with and interpreting signals from sensors and devices within a dwelling, but also for accessing and monitoring those sensors and devices from locations remote to the dwelling. Embodiments of the SMA controller provide such capability through linkages to external servers via access networks such as the Internet, provider network, or a cellular network. The external servers provide a portal environment through which a user can, for example, monitor the state of sensors coupled to the SMA controller in real-time, configure the controller, and provide controlling information to the SMA controller. The servers can further automatically provide information to a user via remote devices such as mobile phones, computers, and pagers. The servers further provide a connection to a traditional security central station, which can then contact authorities in the event of an alarm condition being detected by the SMA controller in the dwelling.

FIG. 1 is a simplified block diagram illustrating an architecture including a set of logical domains and functional entities within which embodiments of the present invention interact. A home domain 110 includes an embodiment of the SMA controller 120. The home domain is coupled via an access domain 150 to an operator domain 160 that includes various servers. The servers are in turn coupled to a central station 190 and to various remote user communication options.

The home domain refers to a collection of security, monitoring and automation entities within a dwelling or other location having SMA devices. SMA controller 120 is a device that provides an end-user SMA interface to the various SMA entities (e.g., radio-frequency sensors) within home domain 110. SMA controller 120 further acts as a gateway interface between home domain 110 and operator domain 160. SMA gateway 120 provides such gateway access to operator domain 160 via a network router 125. Network router 125 can be coupled to SMA controller 120 and to home network devices such as home computer 127 via either hard wired or wireless connections (e.g., WiFi, tethered Ethernet, and power-line network). A network router 125 coupled to a broadband modem (e.g., a cable modem or DSL modem) serves as one link to networks in access domain 150.

SMA devices within home domain 110 can include a variety of RF or wireless sensors 130 whose signals are received and interpreted by SMA gateway 120. RF sensors 130 can include, for example, door or window sensors, motion detectors, smoke detectors, glass break detectors, inertial detectors, water detectors, carbon dioxide detectors, and key fob devices. SMA gateway 120 can be configured to react to a change in state of any of these detectors. In addition to acting and reacting to changes in state of RF sensors 130, SMA controller 120 also can be coupled to a legacy security system 135. SMA controller 120 controls the legacy security system by interpreting signals from sensors coupled to the legacy security system and reacting in a user-configured manner. SMA gateway 120, for example, will provide alarm or sensor state information from legacy security system 135 to servers in operator domain 160 that may ultimately inform central station 190 to take appropriate action.

SMA gateway 120 can also be coupled to one or more monitoring devices 140. Monitoring devices 140 can include, for example, still and video cameras that provide images that are viewable on a screen of SMA gateway 120 or a remotely connected device. Monitoring devices 140 can be coupled to SMA gateway 120 either wirelessly (e.g., WiFi via router 125) or other connections.

Home automation devices 145 (e.g., home area network devices having an automation interface) can also be coupled to and controlled by SMA gateway 120. SMA gateway 120 can be configured to interact with a variety of home automation protocols, such as, for example, Z-Wave and ZigBee.

Embodiments of SMA controller 120 can be configured to communicate with a variety of RF or wireless sensors and are not limited to the RF sensors, monitoring devices and home automation devices discussed above. A person of ordinary skill in the art will appreciate that embodiments of the present invention are not limited to or by the above-discussed devices and sensors, and can be applied to other areas and devices.

Embodiments of SMA controller 120 can be used to configure and control home security devices (e.g., 130 and 135), monitoring devices 140 and automation devices 145, either directly or by providing a gateway to remote control via servers in operator domain 160. SMA controller 120 communicates with servers residing in operator domain 160 via networks in access domain 150. Broadband communication can be provided by coupling SMA controller 120 with a network router 125, which in turn is coupled to a wide area network 152, such as a provider network or the Internet, via an appropriate broadband modem. The router can be coupled to the wide area network through cable broadband, DSL, and the like. Wide area network 152, in turn, is coupled to servers in operator domain 160 via an appropriate series of routers and firewalls (not shown). SMA controller 120 can include additional mechanisms to provide a communication with the operator domain. For example, SMA controller 120 can be configured with a cellular network transceiver that permits communication with a cellular network 154. In turn, cellular network 154 can provide access via routers and firewalls to servers in operator domain 160. Embodiments of SMA controller 120 are not limited to providing gateway functionality via cellular and dwelling-based routers and modems. For example, SMA gateway 120 can be configured with other network protocol controllers such as WiMAX satellite-based broadband, direct telephone coupling, and the like.

Operator domain 160 refers to a logical collection of SMA servers and other operator systems in an operator's network that provide end-user interfaces, such as portals accessible to subscribers of the SMA service, that can configure, manage and control SMA elements within home domain 110. Servers in operator domain 160 can be maintained by a provider (operator) of subscriber-based services for SMA operations. Examples of providers include cable providers, telecommunications providers, and the like. A production server architecture in operator domain 160 can support SMA systems in millions of home domains 110.

Individual server architectures can be of a variety of types, and in one embodiment, the server architecture is a tiered Java2 Enterprise Edition (J2EE) service oriented architecture. Such a tiered service oriented architecture can include an interface tier, a service tier, and a data access logic tier. The interface tier can provide entry points from outside the server processes, including, for example, browser web applications, mobile web applications, web services, HTML, XHTML, SOAP, and the like. A service tier can provide a variety of selectable functionality passed along by the operator to the end user. Service tiers can relate to end user subscription levels offered by the operator (e.g., payment tiers corresponding to "gold" level service, "silver"

level service and "bronze" level service). Finally the data access logic tier provides access to various sources of data including database servers.

FIG. 1 illustrates an example set of servers that can be provided in operator domain 160. Servers 165 can support all non-alarm and alarm events, heartbeat, and command traffic between the various servers and SMA controllers 120. Servers 165 can also manage end-user electronic mail and SMS notification, as well as integration with provider billing, provisioning, inventory, tech support systems, and the like.

A portal server 170 can provide various user interface applications, including, for example, a subscriber portal, a mobile portal, and a management portal. A subscriber portal is an end-user accessible application that permits an end-user to access a corresponding SMA controller remotely via standard web-based applications. Using such a subscriber portal can provide access to the same SMA functions that an interface directly coupled to the SMA controller would provide, plus additional functions such as alert and contact management, historical data, widget and camera management, account management, and the like. A mobile portal can provide all or part of the access available to an end-user via the subscriber portal. A mobile portal can be limited, however, to capabilities of an accessing mobile device (e.g., touch screen or non-touch screen cellular phones). A management portal provides an operator representative access to support and manage SMA controllers in home domains 110 and corresponding user accounts via a web-based application. The management portal can provide tiers of management support so that levels of access to user information can be restricted based on authorization of a particular employee.

Telephony server 180 can process and send information related to alarm events received from SMA controllers 120 to alarm receivers at central monitoring station 190. A server 165 that processes the alarm event makes a request to telephony server 180 to dial the central station's receiver and send corresponding contact information. Telephony server 180 can communicate with a plurality of central stations 190. Server 165 can determine a correct central station to contact based upon user account settings associated with the transmitting SMA controller. Thus, alarms can be routed to different central stations based upon user accounts. Further, accounts can be transferred from one central station to another by modifying user account information. Telephony server 180 can communicate with alarm receivers at central station 190 using, for example, a security industry standard contact identification protocol (e.g., dual-tone multi-frequency [DTMF]) and broadband protocols.

A backup server 175 can be provided to guarantee that an alarm path is available in an event that one or more servers 165 become unavailable or inaccessible. A backup server 175 can be co-located to the physical location of servers 165 to address scenarios in which one or more of the servers fail. Alternatively, a backup server 175 can be placed in a location remote from servers 165 in order to address situations in which a network failure or a power failure causes one or more of servers 165 to become unavailable. SMA controllers 120 can be configured to transmit alarm events to a backup server 175 if the SMA controller cannot successfully send such events to servers 165.

A database server 185 provides storage of all configuration and user information accessible to other servers within operator domain 160. Selection of a type of database provided by database server 185 can be dependent upon a variety of criteria, including, for example, scalability and availability of data. One embodiment of the present invention uses database services provided by an ORACLE database. As will be discussed more fully below, the SMA controller configuration information stored by database server 185 can include all zone and sensor information, and configuration data related to monitoring devices, automation devices, routers and the like.

A server 165 in operator domain 160 provides a variety of functionality. Logically, a server 165 can be divided into the following functional modules: a broadband communication module, a cellular communication module, a notification module, a telephony communication module, and an integration module.

The broadband communication module manages broadband connections and message traffic from a plurality of SMA controllers 110 coupled to server 165. Embodiments of the present invention provide for the broadband channel to be a primary communication channel between an SMA controller 120 and servers 165. The broadband communication module handles a variety of communication, including, for example, all non-alarm and alarm events, broadband heartbeat, and command of traffic between server 165 and SMA controller 120 over the broadband channel. Embodiments of the present invention provide for an always-on persistent TCP socket connection to be maintained between each SMA controller and server 165. A variety of protocols can be used for communications between server 165 and SMA controller 120 (e.g., XML over TCP, and the like). Such communication can be secured using standard transport layer security (TLS) technologies. Through the use of an always-on socket connection, servers 165 can provide near real-time communication between the server and an SMA controller 120. For example, if a user has a subscriber portal active and a zone is tripped within home domain 110, a zone fault will be reflected in near real-time on the subscriber portal user interface.

The cellular communication module manages cellular connections and message traffic from SMA controllers 120 to a server 165. Embodiments of the present invention use the cellular channel as a backup communication channel to the broadband channel. Thus, if a broadband channel becomes unavailable, communication between an SMA controller and a server switches to the cellular channel. At this time, the cellular communication module on the server handles all non-alarm and alarm events, and command traffic from an SMA controller. When a broadband channel is active, heartbeat messages can be sent periodically on the cellular channel in order to monitor the cellular channel. When a cellular protocol communication stack is being used, a TCP socket connection can be established between the SMA controller and server to ensure reliable message delivery for critical messages (e.g., alarm events and commands). Once critical messages have been exchanged, the TCP connection can be shut down thereby reducing cellular communication costs. As with broadband communication, XMPP can be the messaging protocol used for such communications. Similarly, such communication can be secured using TLS and SASL authentication protocols. Non-critical messages between an SMA controller and a server can be sent using UDP. A compressed binary protocol can be used as a messaging protocol for such communications in order to minimize cellular costs for such message traffic. Such messages can be secured using an encryption algorithm, such as the tiny encryption algorithm (TEA). Cellular communication can be established over two network segments: the GSM service provider's network that provides a path between an SMA controller and a cellular access point, and a VPN tunnel between the access point and an operator domain data center.

A notification module of server 165 determines if and how a user should be notified of events generated by their corresponding SMA controller 120. A user can specify who to notify of particular events or event types and how to notify the user (e.g., telephone call, electronic mail, text message, page, and the like), and this information is stored by a database server 185. When events such as alarm or non-alarm events are received by a server 165, those events can be past asynchronously to the notification module, which determines if, who and how to send those notifications based upon the user's configuration.

The telephony communication module provides communication between a server 165 and telephony server 180. When a server 165 receives and performs initial processing of alarm events, the telephony communication module forwards those events to a telephony server 180 which in turn communicates with a central station 190, as discussed above.

The integration module provides infrastructure and interfaces to integrate a server 165 with operator business systems, such as, for example, billing, provisioning, inventory, tech support, and the like. An integration module can provide a web services interface for upstream integration that operator business systems can call to perform operations like creating and updating accounts and querying information stored in a database served by database server 185. An integration module can also provide an event-driven framework for downstream integration to inform operator business systems of events within the SMA system.

SMA Controller Architecture

Figure 2:
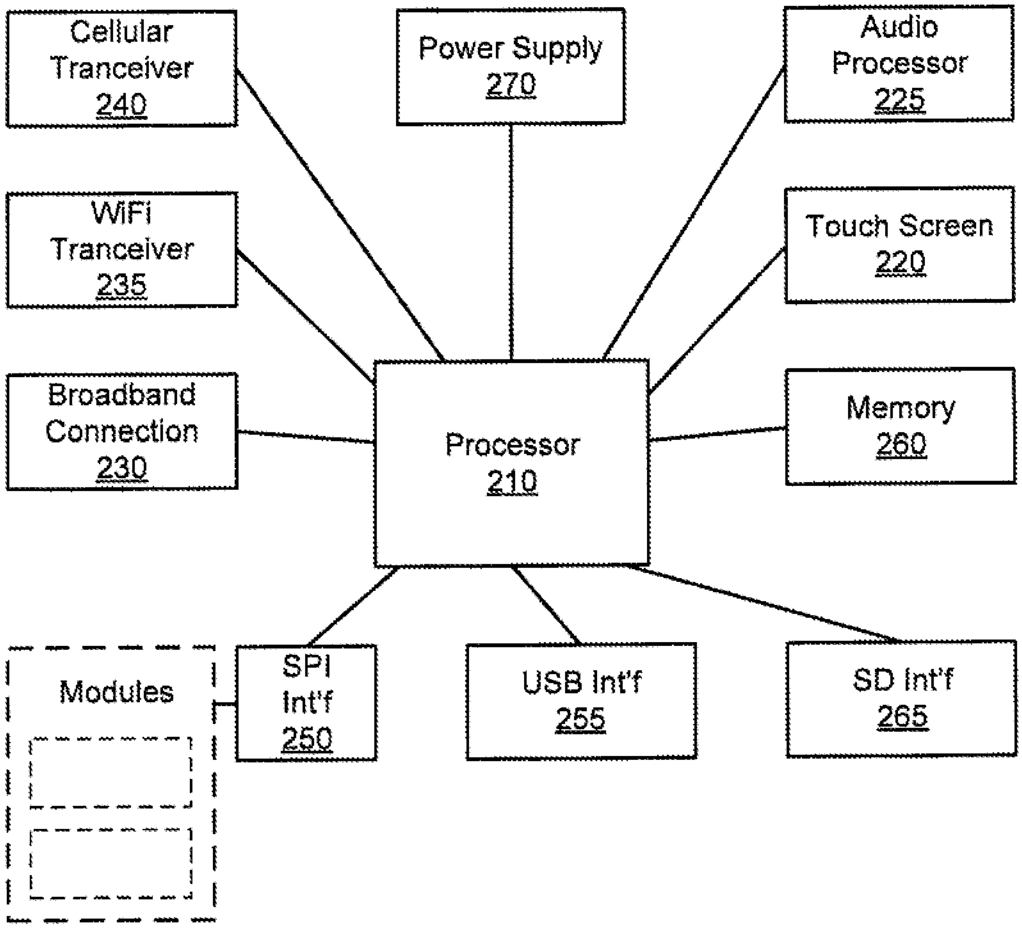
FIG. 2 is a simplified block diagram illustrating a hardware architecture of an SMA controller, according to one embodiment of the present invention.

FIG. 2 is a simplified block diagram illustrating a hardware architecture of an SMA controller, according to one embodiment of the present invention. A processor 210 is coupled to a plurality of communications transceivers, interface modules, memory modules, and user interface modules. Processor 210, executing firmware discussed below, performs various tasks related to interpretation of alarm and non-alarm signals received by SMA controller 120, interpreting reactions to those signals in light of configuration information either received from a server (e.g., server 165) or entered into an interface provided by SMA controller 120 (e.g., a touch screen 220). Embodiments of the present invention can use a variety of processors, for example, an ARM core processor such as a FREESCALE i.MX35 multimedia applications processor.

SMA controller 120 can provide for user input and display via a touch screen 220 coupled to processor 210. Processor 210 can also provide audio feedback to a user via use of an audio processor 225. Audio processor 225 can, in turn, be coupled to a speaker that provides sound in home domain 110. SMA controller 120 can be configured to provide a variety of sounds for different events detected by sensors associated with the SMA controller. Such sounds can be configured by a user so as to distinguish between alarm and non-alarm events.

As discussed above, an SMA controller 120 can communicate with a server 165 using different network access means. Processor 210 can provide broadband access to a router (e.g., router 125) via an Ethernet broadband connection PHY 130 or via a WiFi transceiver 235. The router can then be coupled to or be incorporated within an appropriate broadband modem. Cellular network connectivity can be provided by a cellular transceiver 240 that is coupled to processor 210. SMA controller 120 can be configured with a set of rules that govern when processor 210 will switch between a broadband connection and a cellular connection to operator domain 160.

In order to communicate with the various sensors and devices within home domain 110, processor 210 can be coupled to one or more transceiver modules via, for example, a serial peripheral interface such as a SPI bus 250. Such transceiver modules permit communication with sensors of a variety of protocols in a configurable manner. Embodiments of the present invention can use a transceiver to communicate with a variety of RF sensors 130 using a variety of communication protocols. Similarly, home automation transceivers (e.g., home area network devices having an automation interface) that communicate using, for example, Z-Wave or ZigBee protocols can be coupled to processor 210 via SPI 250. If SMA controller 120 is coupled to a legacy security system 135, then a module permitting coupling to the legacy security system can be coupled to processor 210 via SPI 250. Other protocols can be provided for via such plug-in modules including, for example, digital enhanced cordless telecommunication devices (DECT). In this manner, an SMA controller 120 can be configured to provide for control of a variety of devices and protocols known both today and in the future. In addition, processor 210 can be coupled to other types of devices (e.g., transceivers or computers) via a universal serial bus (USB) interface 255.

In order to locally store configuration information for SMA controller 120, a memory 260 is coupled to processor 210. Additional memory can be coupled to processor 210 via, for example, a secure digital interface 265. A power supply 270 is also coupled to processor 210 and to other devices within SMA controller 120 via, for example, a power management controller module.

SMA controller 120 is configured to be a customer premises equipment device that works in conjunction with server counterparts in operator domain 160 in order to perform functions required for security monitoring and automation. Embodiments of SMA controller 120 provide a touch screen interface (e.g., 220) into all the SMA features. Via the various modules coupled to processor 210, the SMA controller bridges the sensor network, the control network, and security panel network to broadband and cellular networks. SMA controller 120 further uses the protocols discussed above to carry the alarm and activity events to servers in the operator domain for processing. These connections also carry configuration information, provisioning commands, management and reporting information, security authentication, and any real-time media such as video or audio.

Figure 3:
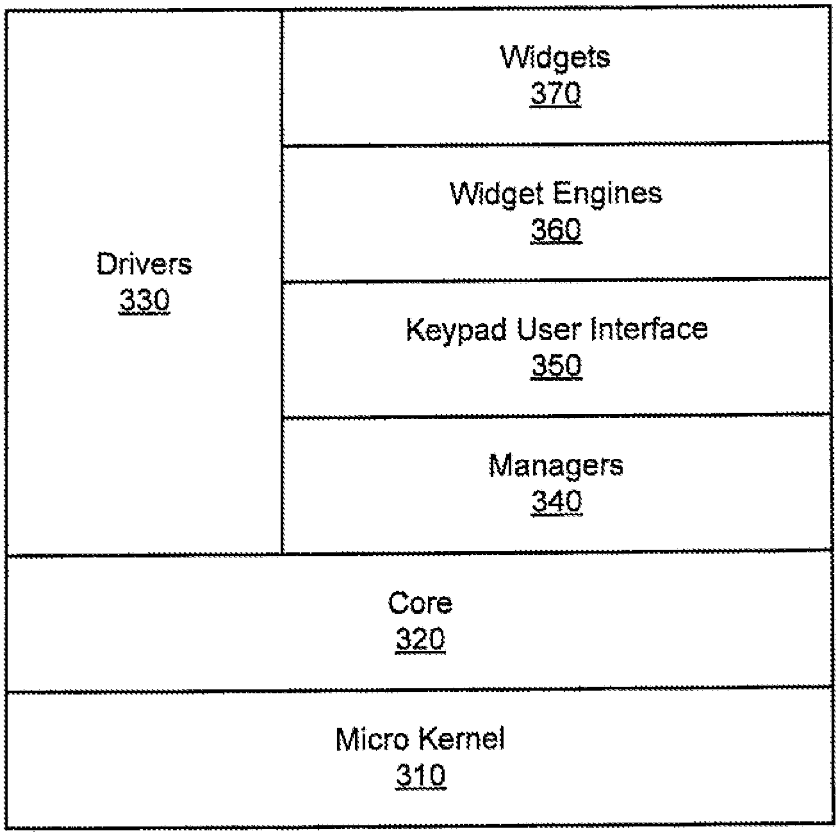
FIG. 3 is a simplified block diagram illustrating a logical stacking of an SMA controller's firmware architecture, usable with embodiments of the present invention.

FIG. 3 is a simplified block diagram illustrating a logical stacking of an SMA controller's firmware architecture, usable with embodiments of the present invention. Since SMA controller 120 provides security functionality for home domain 110, the SMA controller should be a highly available system. High availability suggests that the SMA controller be ready to serve an end-user at all times, both when a user is interacting with the SMA controller through a user interface and when alarms and other non-critical system events occur, regardless of whether a system component has failed. In order to provide such high availability, SMA controller 120 runs a micro-kernel operating system 310. An example of a micro-kernel operating system usable by embodiments of the present invention is a QNX real-time operating system. Under such a micro-kernel operating system, drivers, applications, protocol stacks and file systems run outside the operating system kernel in memory-protected user space.

Such a micro-kernel operating system can provide fault resilience through features such as critical process monitoring and adaptive partitioning. As a result, components can fail, including low-level drivers, and automatically restart without affecting other components or the kernel and without requiring a reboot of the system. A critical process monitoring feature can automatically restart failed components because those components function in the user space. An adaptive partitioning feature of the micro kernel operating system provides guarantees of CPU resources for designated components, thereby preventing a component from consuming all CPU resources to the detriment of other system components.

A core layer 320 of the firmware architecture provides service/event library and client API library components. A client API library can register managers and drivers to handle events and to tell other managers or drivers to perform some action. The service/event library maintains lists of listeners for events that each manager or driver detects and distributes according to one of the lists.

Driver layer 330 interacts with hardware peripherals of SMA controller 120. For example, drivers can be provided for touch screen 220, broadband connection 230, WiFi transceiver 235, cellular transceiver 240, USB interface 255, SD interface 265, audio processor 225, and the various modules coupled to processor 210 via SPI interface 250. Manager layer 340 provides business and control logic used by the other layers. Managers can be provided for alarm activities, security protocols, keypad functionality, communications functionality, audio functionality, and the like.

Keypad user interface layer 350 drives the touch screen user interface of SMA controller 120. An example of the touch screen user interface consists of a header and a footer, widget icons and underlying widget user interfaces. Keypad user interface layer 350 drives these user interface elements by providing, for example, management of what the system Arm/Disarm interface button says and battery charge information, widget icon placement in the user face area between the header and footer, and interacting with widget engine layer 360 to display underlying widget user interface when a widget icon is selected.

In embodiments of the present invention, typical SMA controller functions are represented in the touch screen user interface as widgets (or active icons). Widgets provide access to the various security monitoring and automation control functions of SMA controller 120 as well as providing support for multi-media functionality through widgets that provide, for example, news, sports, weather and digital picture frame functionality. A main user interface screen can provide a set of icons, each of which represents a widget. Selection of a widget icon can then launch the widget. Widget engine layer 360 includes, for example, widget engines for native, HTML and FLASH-based widgets. Widget engines are responsible for displaying particular widgets on the screen. For example, if a widget is developed in HTML, selection of such a widget will cause the HTML widget engine to display the selected widget or touch screen 220. Information related to the various widgets is provided in widget layer 370.

Figure 4:
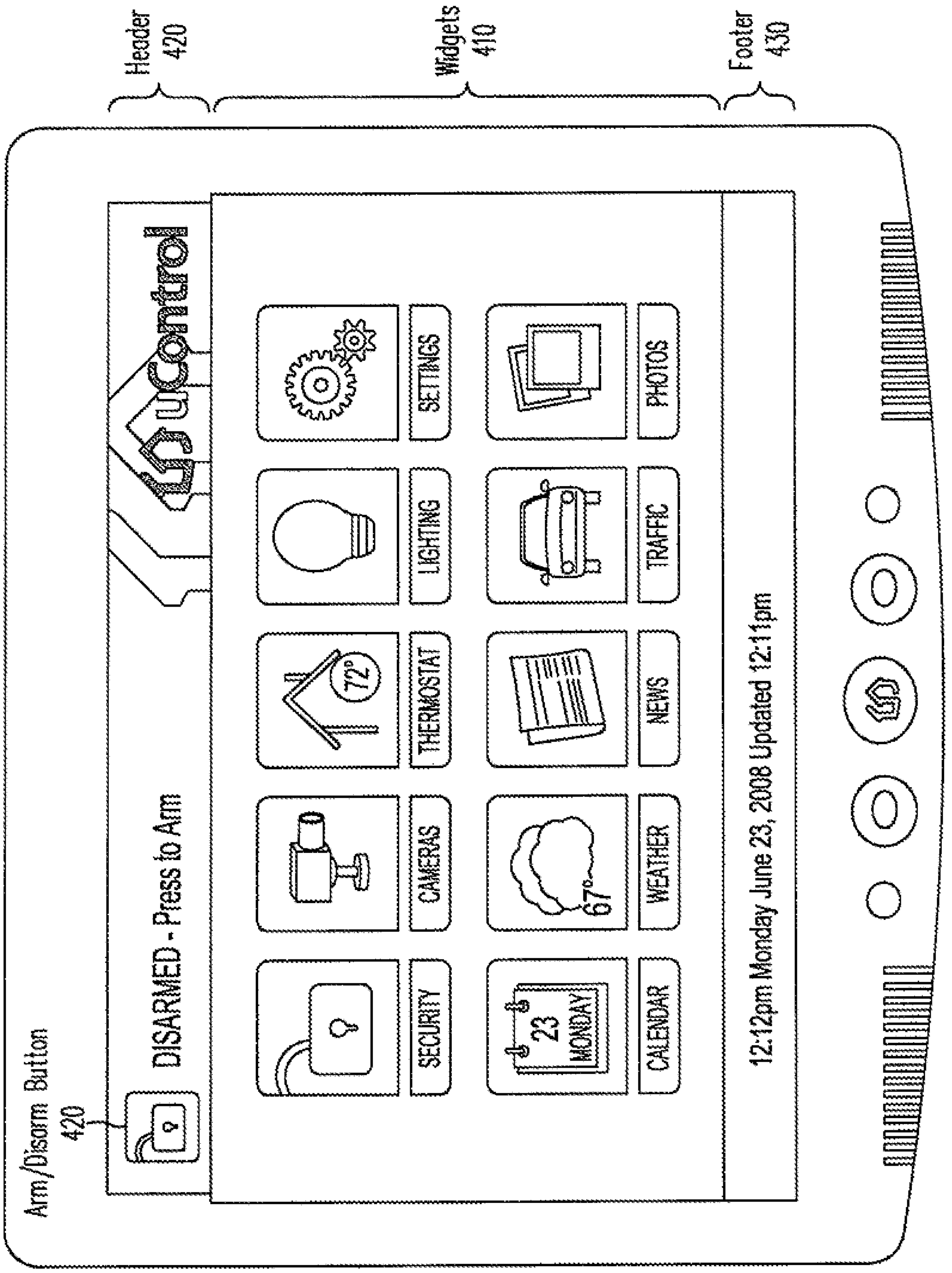
FIG. 4 is an illustration of an example user interface for an SMA controller 120, according to an embodiment of the present invention.

FIG. 4 is an illustration of an example user interface for an SMA controller 120, according to an embodiment of the present invention. The illustrated user interface provides a set of widget icons 410 that provide access to functionality of SMA controller 120. As illustrated, widgets are provided to access security functionality, camera images, thermostat control, lighting control, and other settings of the SMA controller. Additional widgets are provided to access network-based information such as weather, news, traffic, and digital picture frame functionality. A header 420 provides access to an Arm/Disarm button 425 that allows for arming the security system or disarming it. Additional information can be provided in the header, such as, for example, network status messages. A footer 430 can provide additional status information such as time and date, as displayed.

A user can select widgets corresponding to desired functionality. Embodiments of the present invention provide for access to widgets via portal server 170. A provider of operator domain 160 can determine functionality accessible to users, either for all users or based upon tiers of users (e.g., subscription levels associated with payment levels). A user can then select from the set of accessible widgets and the selected widgets will be distributed and displayed on the user interface of SMA controller 120. Configurability of SMA controller 120 is also driven by user determined actions and reactions to sensor stimulus.

SMA Controller Configurability

In accord with embodiments of the present invention, SMA controller 120 can be configured by a user in order to provide desired functionality in home domain 110. In addition to the hardware configurable options discussed above (e.g., modules coupled to SPI interface 250), SMA controller 120 provides for additional configuration through the use of software and/or firmware. For example, SMA controller 120 can be configured to receive signals from a variety of security sensors (e.g., RF sensors 130) and to associate those sensors with the physical environment of home domain 110. In addition, SMA controller 120 can be configured to receive still and video information from one or more cameras, provide a variety of programs and utilities to a user, and is configurable to communicate with a variety of home automation devices.

Figure 5:
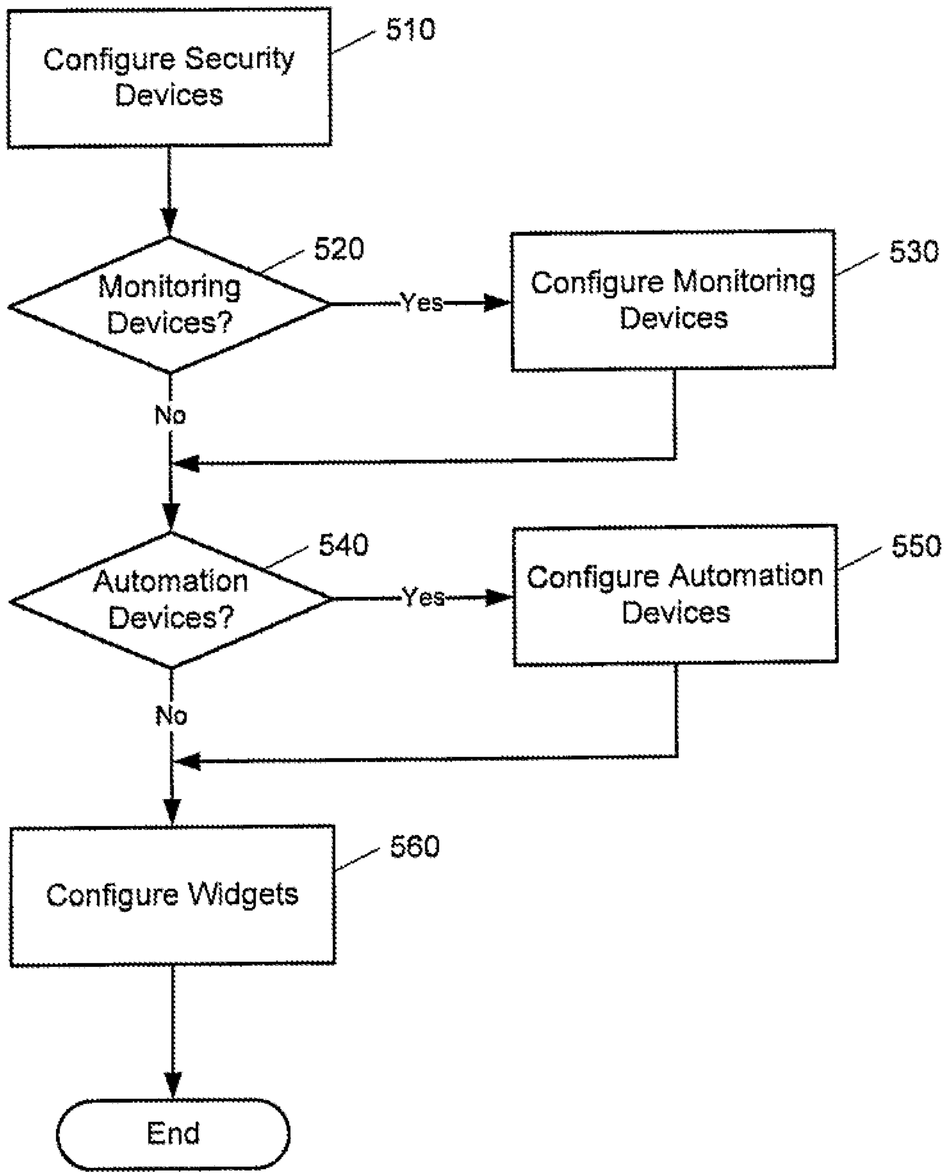
FIG. 5 is a simplified flow diagram illustrating steps performed in a configuration process of an SMA controller, in accord with embodiments of the present invention.

FIG. 5 is a simplified flow diagram illustrating one example of steps performed in a configuration process of an SMA controller, in accord with embodiments of the present invention. Embodiments of an SMA controller will typically be configured with security sensor information, either from RF sensors 130 or from a legacy security system 135. Therefore, an SMA controller will be configured to access and interpret information related to those security sensors (510).

A determination can then be made as to whether or not a user is including security cameras in home domain 110 (520). If cameras are included in the home domain, then a series of steps related to camera configuration is performed (530). Similarly, a determination can be made as to whether or not home automation devices are to be controlled by the SMA controller (540). If so, then a series of steps can be performed to configure the SMA controller to access those home automation devices (550).

A user can then perform steps necessary to configuring widgets accessible via the SMA controller (560). As discussed above, the user may access a portal server (e.g., 170) to select and configure those widgets that are desirable to be accessed at SMA controller 120. Once these configuration steps are performed, the SMA controller can be made available to perform tasks related to securing, monitoring, and providing automation control to home domain 110.

As each of these configuration steps are performed, the SMA controller can store the configuration data in a local memory (e.g., memory 260) and transmit the configuration data to an operator domain server 165 for storage (e.g., in database server 185). Alternatively, transmission of the configuration data can occur after all configuration steps in FIG. 5 have been completed. Configuration data can be transmitted either via broadband or cellular connection to the operator domain.

SMA controller 120 can be configured to receive and interpret signals from a variety of security sensors. Such sensors can include, for example, door/window sensors that can detect opening and closing of a door or window, motion detectors that can detect movement in an area of interest, smoke detectors, glass break detectors, inertia detectors, and key fobs. In order to usefully interpret signals from such detectors, embodiments of SMA controller 120 can search for signals from such sensors and be configured with information related to the location and tasks of those sensors.

SMA Controller Activation and Provisioning

As discussed above, embodiments of SMA controller 120 can be configured to monitor and control a variety of security sensors, cameras and automation devices. Embodiments of SMA controller 120 can be further configured to provide an end-user and installer intuitive guided activation and provisioning mechanism for installation of the SMA controller. Through the use of such a guided activation and provisioning mechanism, embodiments of the SMA controller will not require specialized technicians to perform such an installation. Instead, embodiments of the SMA controller are provided with an extensible software-based (e.g., firmware) architecture for an activation workflow that guides the end-user or installer through each step of the activation process and which performs various network and sensor configuration tasks unseen to the person conducting the activation process and without need for user interaction.

Figure 6:
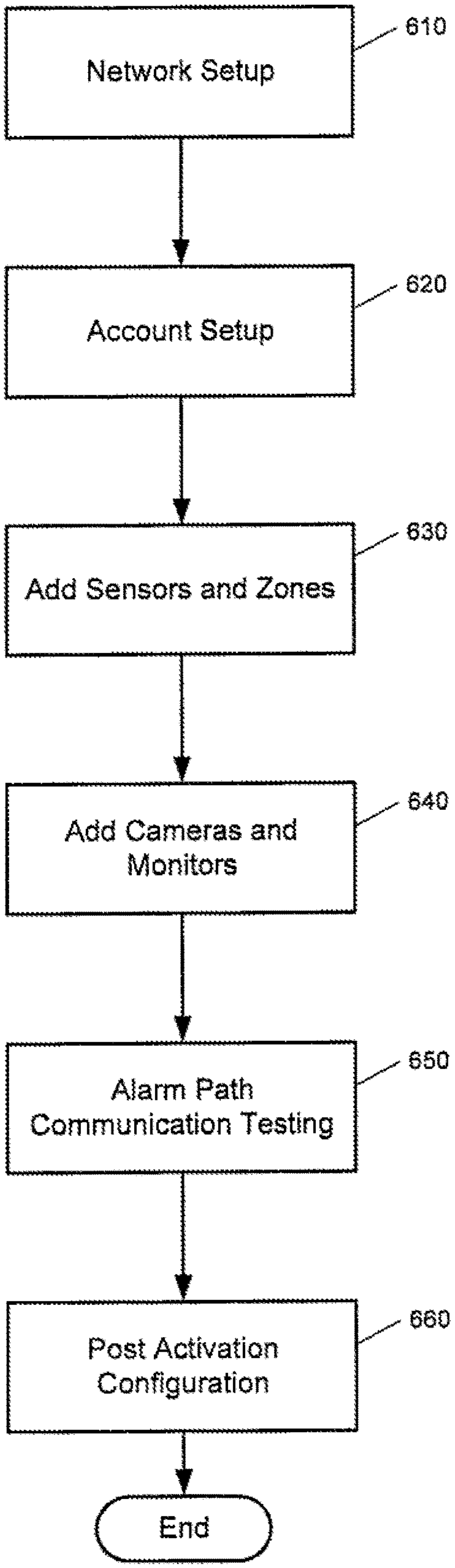
FIG. 6 is a simplified flow diagram illustrating an example of a general workflow for activation and provisioning of an SMA controller, in accord with embodiments of the present invention.

FIG. 6 is a simplified flow diagram illustrating one example of a general workflow for activation and provisioning of an SMA controller 120. The general workflow diagram includes high-level setup tasks that will be described in greater detail below. A network setup 610 can be performed in which the SMA controller 120 is used to configure a home domain router (e.g., router 125) and to create and secure a private WiFi network usable by the SMA controller and other devices that communicate with the SMA controller. Network setup tasks can also include, for example, connectivity testing from home domain 110 to servers in operator domain 160 and firmware updates. An account setup process 620 can be performed using an interface coupled to SMA controller 120 by which a person conducting the activation can provide subscriber information to servers in the operator domain. Security sensors and associated zones can be configured (630) and monitoring cameras can be coupled to the SMA controller's network (640). The general activation workflow can also include tasks related to alarm path communication testing 650, in which a determination can be made that alarm information is being properly received by central station 190. Finally, a variety of post-activation configuration tasks can be performed (660), including, for example, providing a variety of security codes and delay times, and transmitting configuration data of the SMA controller to a server in operator domain 160.

The workflow illustrated in FIG. 6 is intended as one example of a variety of high level tasks that can be performed using an SMA controller 120 in performing the activation process. The variety of steps involved in activation can be subdivided and supplemented in a number of ways and activation workflows of embodiments of the present invention should not be considered as limited to those steps illustrated in FIG. 6. Further, beyond steps requiring a prior configuration of a network for communication, the ordering of the steps illustrated in FIG. 6 is meant as an example and not a requirement. Further, in some configurations, the SMA controller may be configured to provide one or more of security, monitoring and automation control, and not necessarily all three. Thus, steps related to the configuration of any of these that are not needed for a particular home domain may be avoided.

Figure 7:
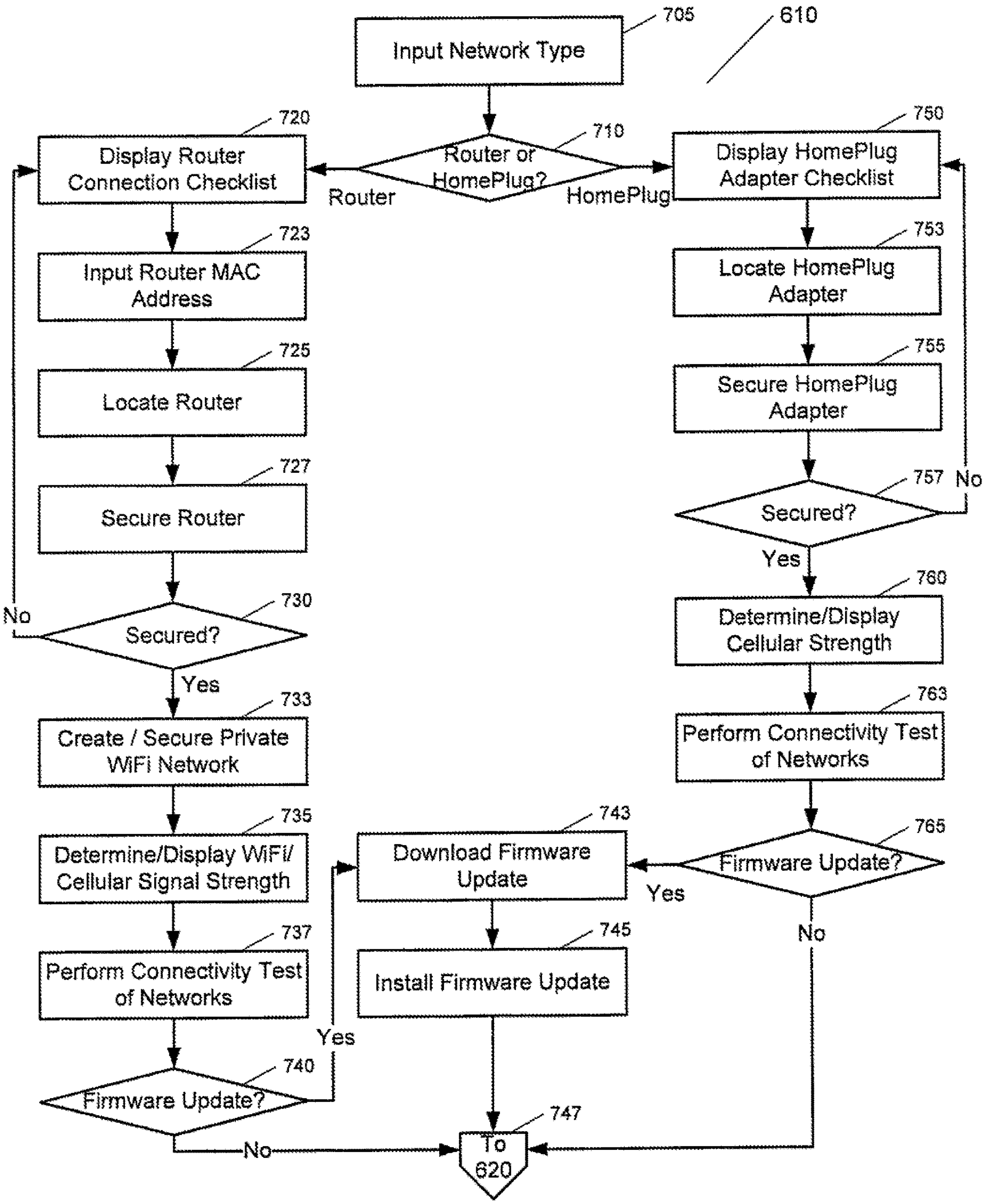
FIG. 7 is a simplified flow diagram illustrating one embodiment of a process flow for network setup usable in embodiments of the present invention.

FIG. 7 is a simplified flow diagram illustrating one embodiment of a process flow for network setup 610. Through the use of such a network setup process flow, embodiments of SMA controller 120 can perform tasks related to securing a router 125 in home domain 110 in order that home security and monitoring communications can be performed using a secured network. Since embodiments of SMA controller 120 envision the use of a variety of home domain networking options, an opportunity is provided for the person performing the installation to input an appropriate network type through which the SMA controller communicates in the home domain being configured (705). The opportunity to provide this information can be given through the use of a display and touch screen coupled to SMA controller 120. FIG. 7 illustrates workflows related to two different home networking options (e.g., a wireless router or a power-line network adapter (e.g., HomePlug)), but embodiments of SMA controller 120 are not limited to the use of these networking options. Different workflows can be provided for additional networking options as those become available or desired by an SMA provider, and embodiments of SMA controller 120 are not limited to those illustrated in FIG. 7. For example, an SMA controller 120 can be coupled to a router 125 via tethered Ethernet (e.g., a twisted pair connection), which would not necessarily require configuration of a secured wireless or power-line network. Thus, a different workflow can be provided for such a connection.

Figure 13A:
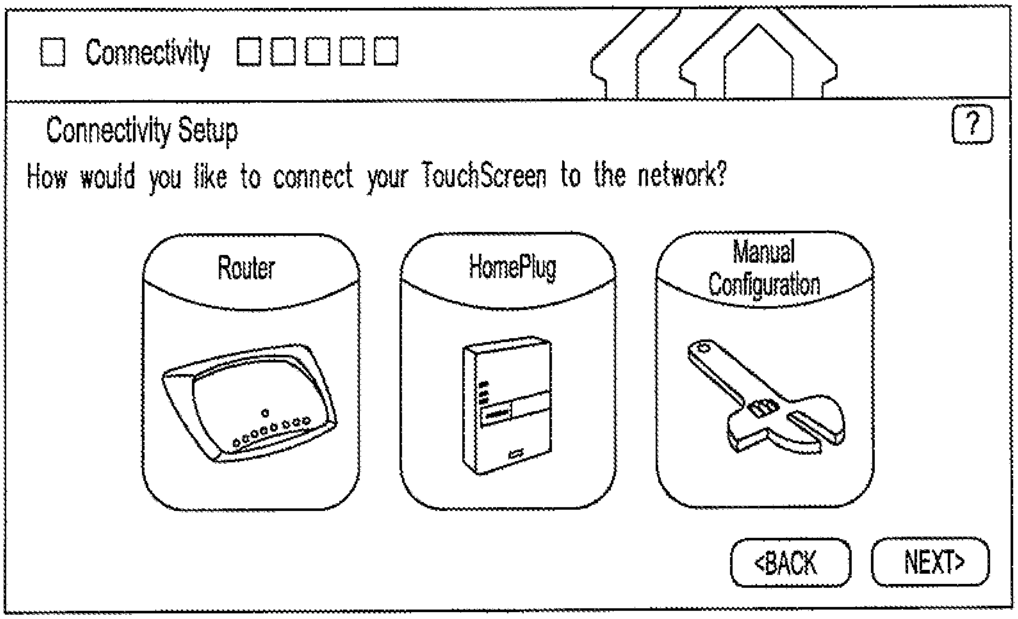
FIGS. 13A-R illustrate examples of displays provided by an SMA controller in accord with embodiments of the present invention.

FIG. 13A illustrates an example of a display providing networking options for a user of SMA controller 120. A user can select one of the options through the use of the touch screen. A determination can then be made as to which type of networking option was selected by the person performing the install (710). That selection determines the appropriate workflow for configuring the network.

Figure 13B:
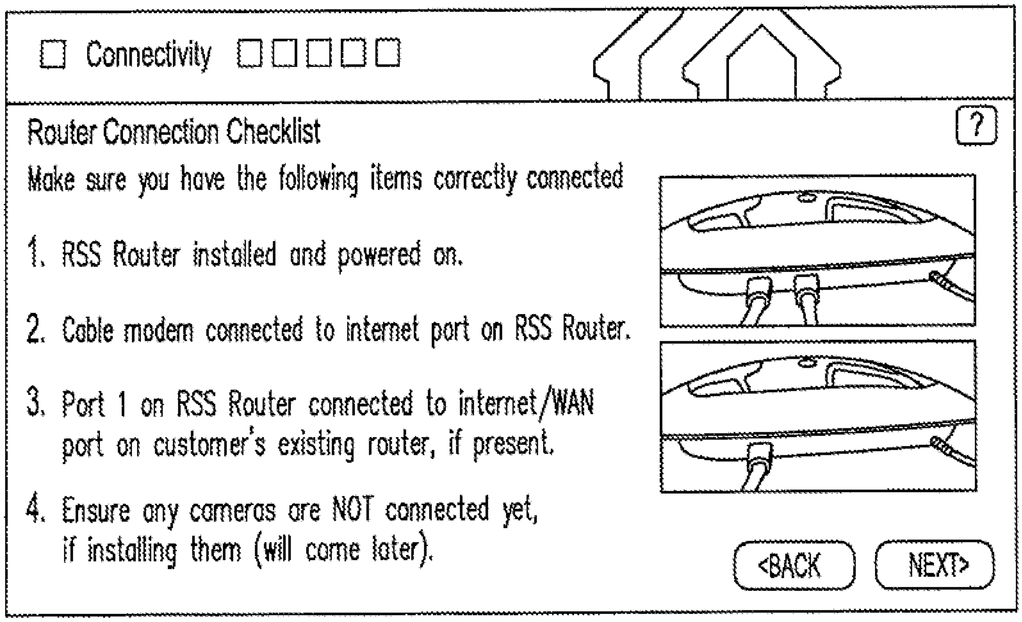

FIG. 13B illustrates a router connection check list display that can be provided to a user upon selection of a wireless network type (720). FIG. 13B illustrates with words and pictures a proper connection of a WiFi-capable router usable for network connections in conjunction with SMA controller 120. A person performing the install of the SMA controller can confirm through use of the touch screen that the steps illustrated in the router connection check list have been performed.

Figure 13C:
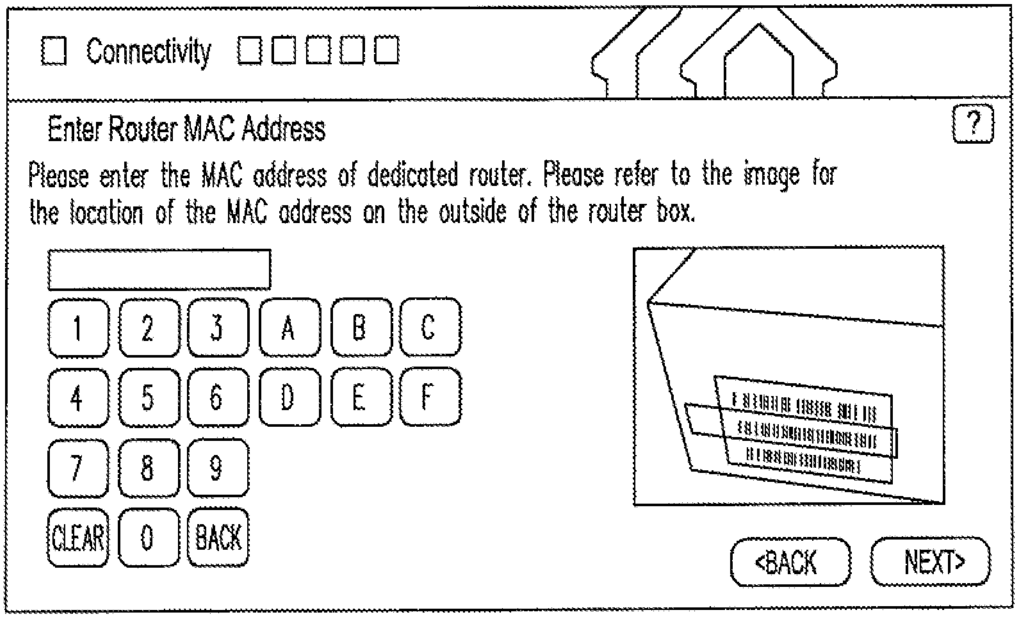

FIG. 13C illustrates a display requesting input of a router MAC address associated with router 125 (723). As illustrated, this display can include a picture showing where the person performing the activation can locate the router MAC address and what the router MAC address looks like. The installer can then use the displayed touch pad to input the router MAC address (723). Once entered, SMA controller 120 can store the router MAC address in an appropriate memory location (e.g., memory 260). Once the installer confirms input of the router MAC address, the SMA controller can perform tasks related to locating the corresponding router (e.g., pinging the MAC address using either WiFi transceiver 235 or the broadband module 230) (725). Alternatively, the SMA controller can use WiFi transceiver 235 and broadband module 230 to scan for available routers in home domain 110. The SMA controller can then display the MAC addresses of the available routers for selection by the person performing the activation.

Figure 13D:
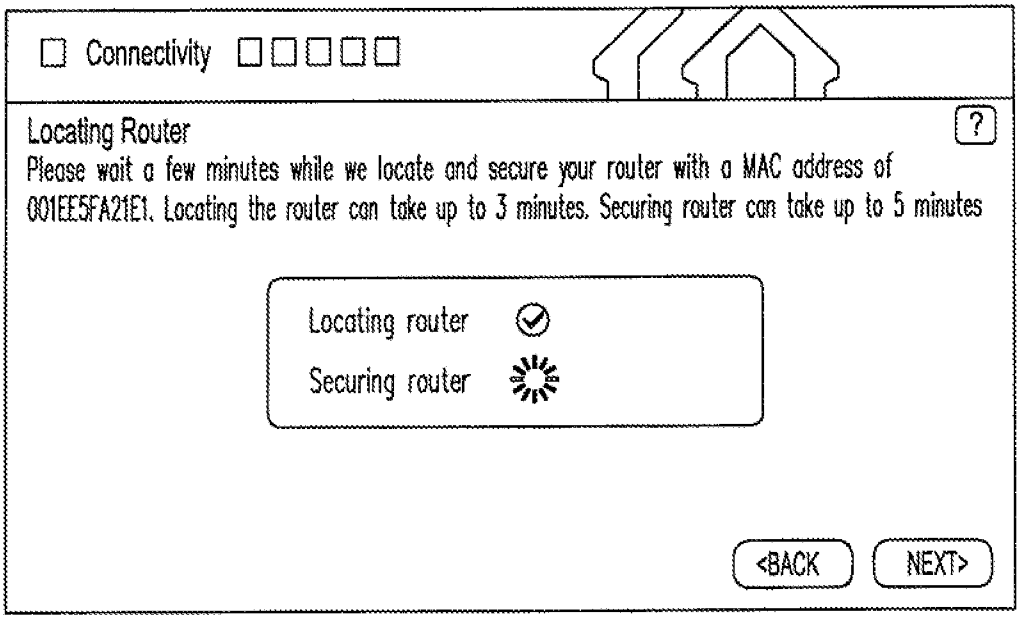

FIG. 13D illustrates a display that can be provided on the SMA controller touch screen display during a process of locating and provisioning the router associated with the input MAC address. SMA controller 120 will attempt to communicate with router 125 through the use of, for example, WiFi transceiver 235 or a broadband connection module 230. Once located, the SMA controller can communicate with the router using, for example, a Home Network Administration Protocol (HNAP) in order to secure the router. Securing the router can take a number of forms including, for example, providing a randomly-generated password and initiating a WEP2 security protocol (727). A determination can then be made as to whether the router was located and secured (730). If the router was not properly located and secured, then the process flow can return to the router connection check list 720 for another attempt at entry of the MAC address and locating and securing the router. Alternatively, the provider of the router and SMA controller can secure the router using remote access, prior to or in conjunction with installation of the SMA controller.

If the router has been located and secured, then the process flow can continue to a creation and securing of a private network (e.g., private WiFi network) on the router (733). Again, commands transmitted to the router for creation and securing of the private WiFi network can be provided through use of the HNAP protocol in accord with appropriate commands stored in the firmware of SMA controller 120. It should be noted that this process of securing a private WiFi network can be combined with securing the router.

Figure 13E:
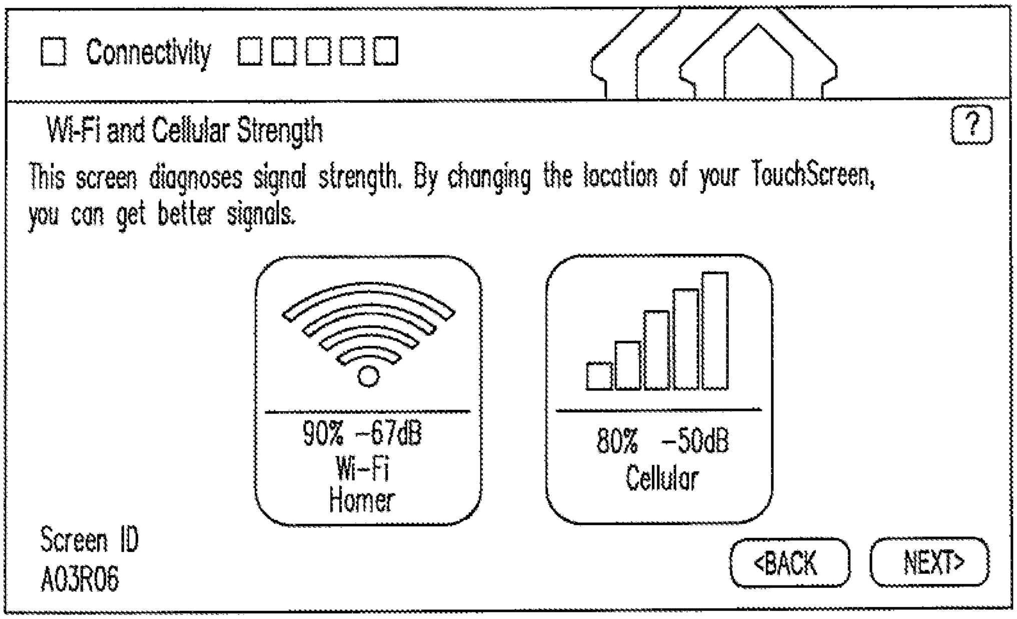

Once router 125 is secured and the private WiFi network has been created and secured, SMA controller 120 can interpret the strength of radio signals being received by WiFi transceiver 235 and cellular transceiver 240 (735). The SMA controller can then display the WiFi and cellular signal strengths using a display such as that illustrated in FIG. 13E, showing graphical representations of the radio signal strength. A person performing the install can then opt to move SMA controller 120 to a different location within home domain 110 to optimize the displayed WiFi and cellular signal strengths.

The SMA controller can be provisioned for a particular cellular (e.g., GSM) network, as pre-configured by a provider of the SMA controller. When the SMA controller communicates with a server in the operator domain (as discussed below), any configuration updates, including those related to GSM provisioning, will be downloaded from the server to the SMA controller. The SMA controller will provide signal strength information regarding the cellular network for which the SMA controller is provisioned, and will use that cellular network as an available communication path.

Figure 13F:
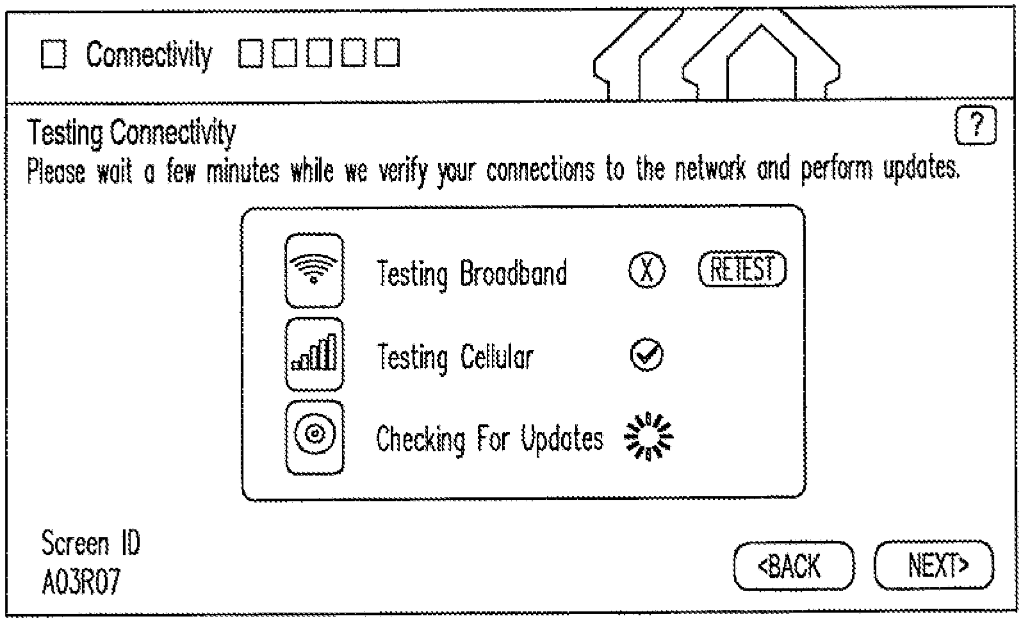

FIG. 13F illustrates an image that can be displayed when SMA controller 120 performs a connectivity test of the broadband/WiFi and cellular networks (737). During such a connectivity test, SMA controller 120 can communicate with servers in operator domain 160 via either router 125 or a cellular network 150. One or more signals can be transmitted between the SMA controller and the server in the operator domain in order to confirm connectivity and quality of the connection.

Once connectivity has been established and confirmed through the available networks, SMA controller 120 can communicate with an operator domain server (e.g., server 165) to determine whether a firmware or configuration update is available for the SMA controller (740). If there are no updates, then the workflow can proceed to the next activation stage (e.g., account setup 620) (747). If an update is available, then the SMA controller can download and store the update from the server (743). Upon completion of the update download, the SMA controller can perform a process to install the update (e.g., firmware) and reboot (745). Once the update has been installed, the activation process flow can continue to the next stage (747).

FIG. 7 also illustrates a similar activation process should the selected home network be a power-line network environment (e.g., HomePlug). A power-line network adapter check list can be displayed on a touch screen coupled to SMA controller 120 (750). The SMA controller can attempt to locate the power-line network adapter (753) and if successful, can send appropriate commands to the power-line network adapter to secure the power-line network adapter (755). Such commands can include providing a randomly generated password and the like. A determination can then be made as to whether the power-line network adapter was successfully located and secured (757), and if not the process can return to the display of the power-line network adapter check list for another attempt.

If the power-line network adapter is successfully located and secured, then the SMA controller can determine cellular signal strength through the use of cellular transceiver 240 and then display that signal strength using a display similar to that illustrated in FIG. 13E (760). A connectivity test can then be performed for both the broadband/power-line network and cellular networks (763). As discussed above, such a connectivity test can include sending a signal via the available communication modes to a server in operator domain 160.

Once connectivity to the servers has been established, the SMA controller can determine whether a firmware or configuration update is available (765), and if not can proceed to the next activation stage (747). If an update is available, then SMA controller 120 can download and store the update (743) and install the update (745). Once the update has been completed, then the SMA controller can continue to the next activation stage (747).

It should be noted that in the absence of the presence of an available broadband communication path to the remote servers, the SMA controller can still determine connectivity via the provisioned cellular network. A configuration workflow can make such a determination and provide the appropriate signal strength and connectivity testing.

Figure 8:
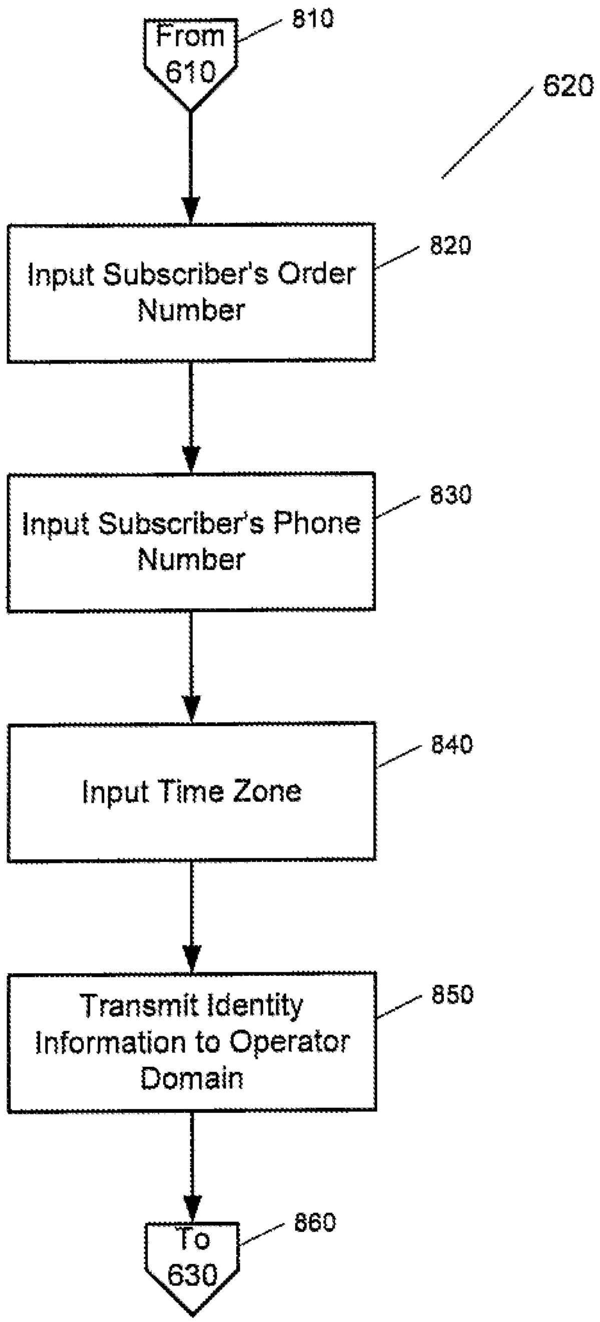
FIG. 8 is a simplified flow diagram illustrating an example of an account setup workflow usable by embodiments of the present invention.

FIG. 8 is a simplified flow diagram illustrating an example of an account setup workflow 620, in accord with embodiments of the present invention. Once a network has been configured and connectivity established to the operator domain of a provider of SMA services, a person conducting the activation process may then be required to provide account information to the provider so that the SMA controller can access software and services available to the subscribing end-user.

Figure 13G:
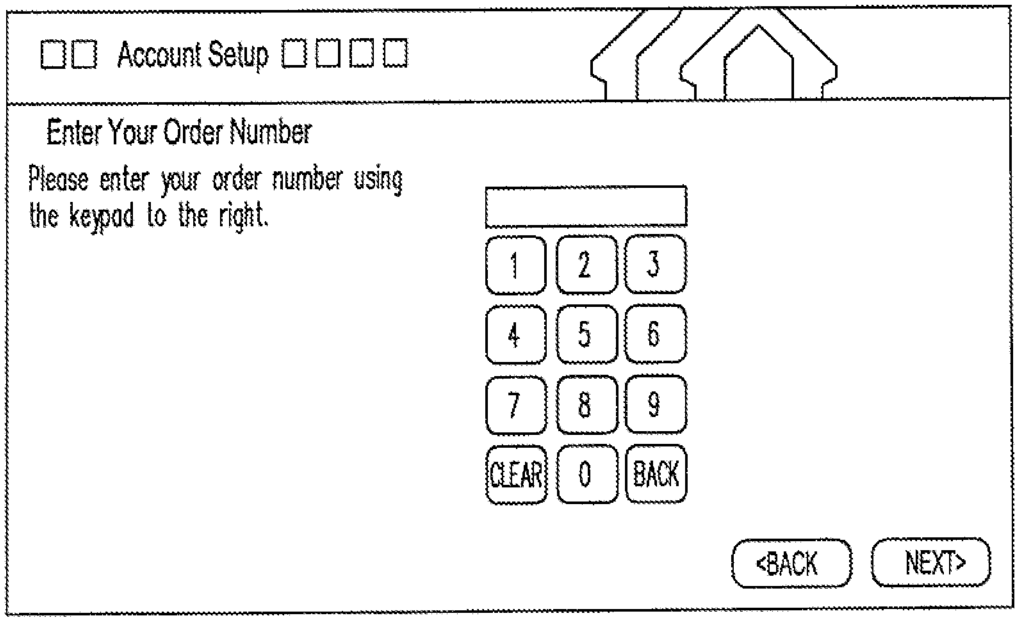

As illustrated, the process of FIG. 8 is entered after completion of the network process 610 (810). An opportunity is provided for input of a subscriber's order number or other identification of the end-user subscriber (820). FIG. 13G illustrates one example of an order number entry display for a touch screen coupled to SMA controller 120. A person conducting the install can enter the customer's order number using the displayed touch pad, and the order number can be stored by the SMA controller in a local memory (e.g., memory 260). Similarly, an opportunity is provided for the person conducting the install to input the subscriber's telephone number (830) and the subscriber's time zone (840), which can also be stored. To the degree that differing providers of SMA services may require additional or different information to be provided to identify a subscriber, the SMA controller can be configured to request that information and to store that information in preparation for transmission to a server in the operator domain. Once all the required account information has been provided, SMA controller 120 can transmit the identifying information to a server in operator domain 160 via the configured network (850). In addition, the SMA controller can provide information identifying the SMA controller hardware (e.g., serial number or other hardware identification), along with network address information, that can be associated with the account information in the operator domain (e.g., in database server 185).

Through the use of this information, the provider of SMA services can verify the on-site setup of the SMA controller. In addition, the provider can also track the hardware installed in the home domain for installation inventory purposes, as well as future firmware updates for the SMA controller.

Figure 9:
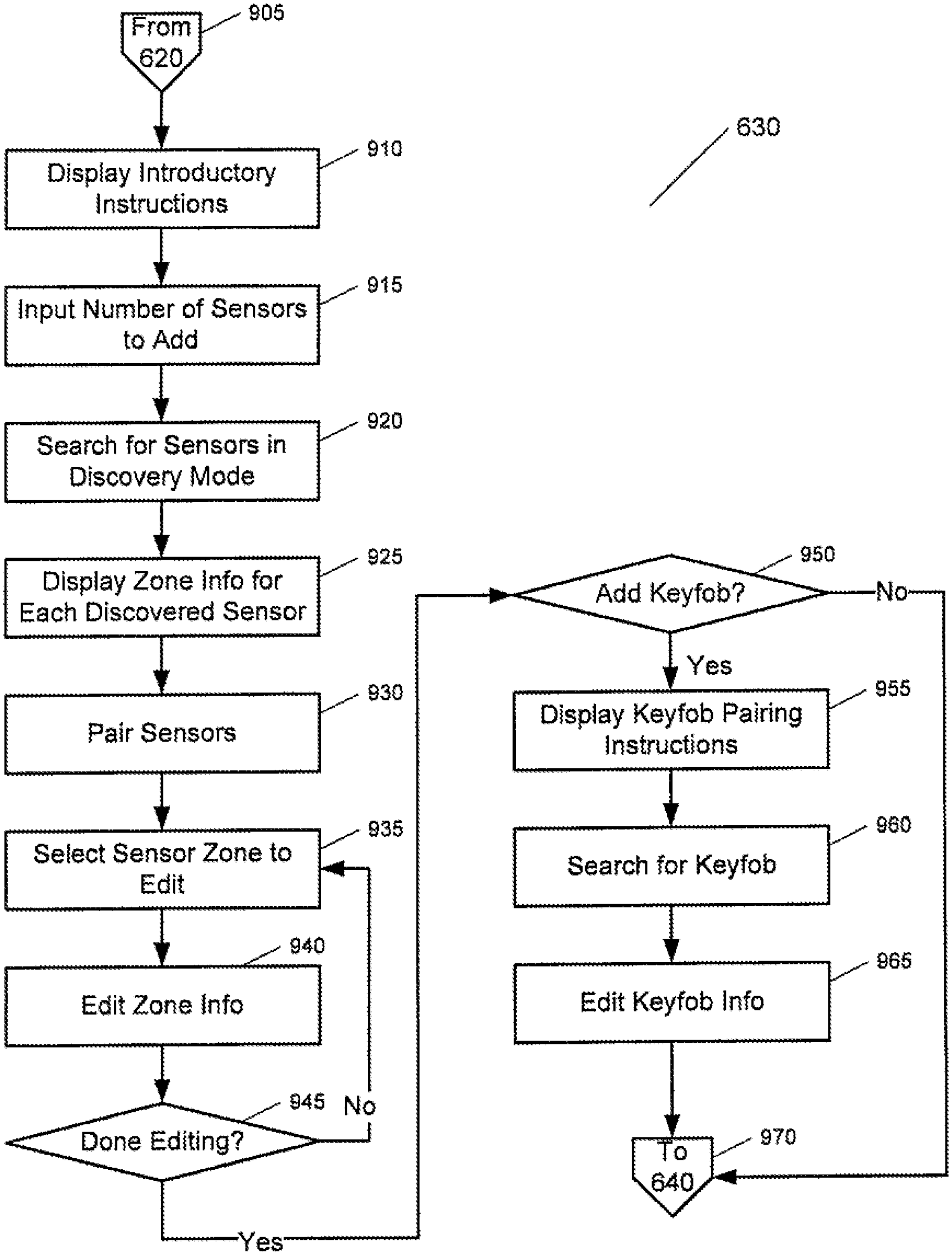
FIG. 9 is a simplified flow diagram illustrating a process for configuring security sensors usable in embodiments of the present invention.
Figure 13H:
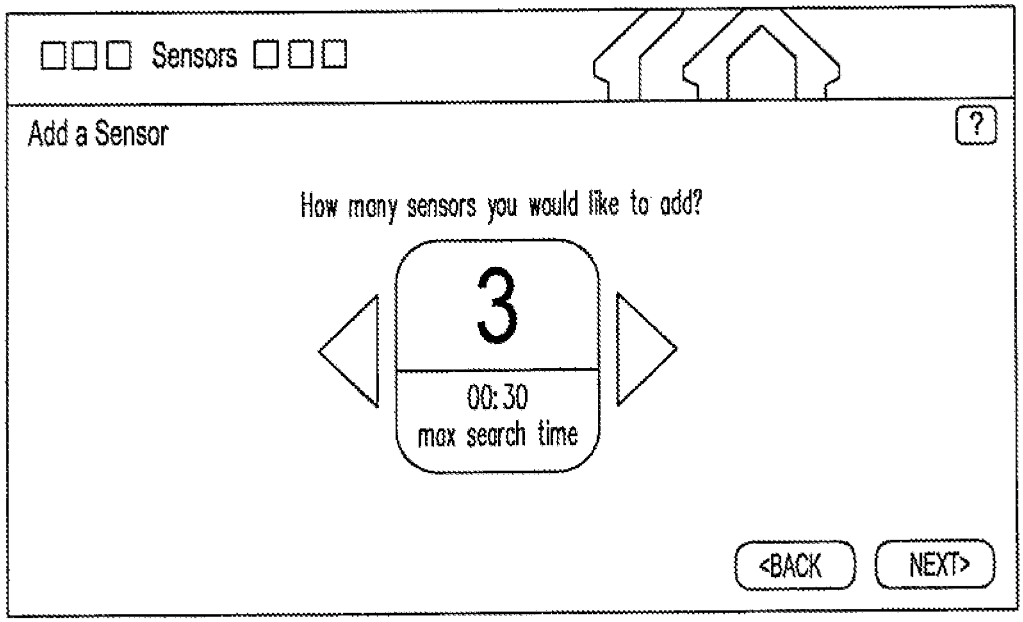

FIG. 9 is a simplified flow diagram illustrating a process for configuring security sensors (e.g., 510), in accord with embodiments of the present invention per sensor setup stage 630. As illustrated, this sensor configuration stage flows from account setup stage 620 (905). A user of a security system incorporating SMA controller 120 (e.g., an installation technician or resident of home domain 110) can decide, based upon the needs within the home domain, the types and number of security sensors needed to secure the home domain. The SMA controller, via a touch screen input device, for example, can display introductory instructions related to the sensor configuration process (910). The introductory instructions can include, for example, textual and/or visual instructions for putting standard sensors that are packaged with the SMA controller into discovery mode. The SMA controller can then provide an input display for the person performing the configuration to input how many sensors the SMA controller should search for during this process (915). FIG. 13H illustrates an example display for selecting a number of sensors an installer would like to add to the system. The illustrated display also provides a search time that automatically adjusts to the selected number of sensors.

Figure 13I:
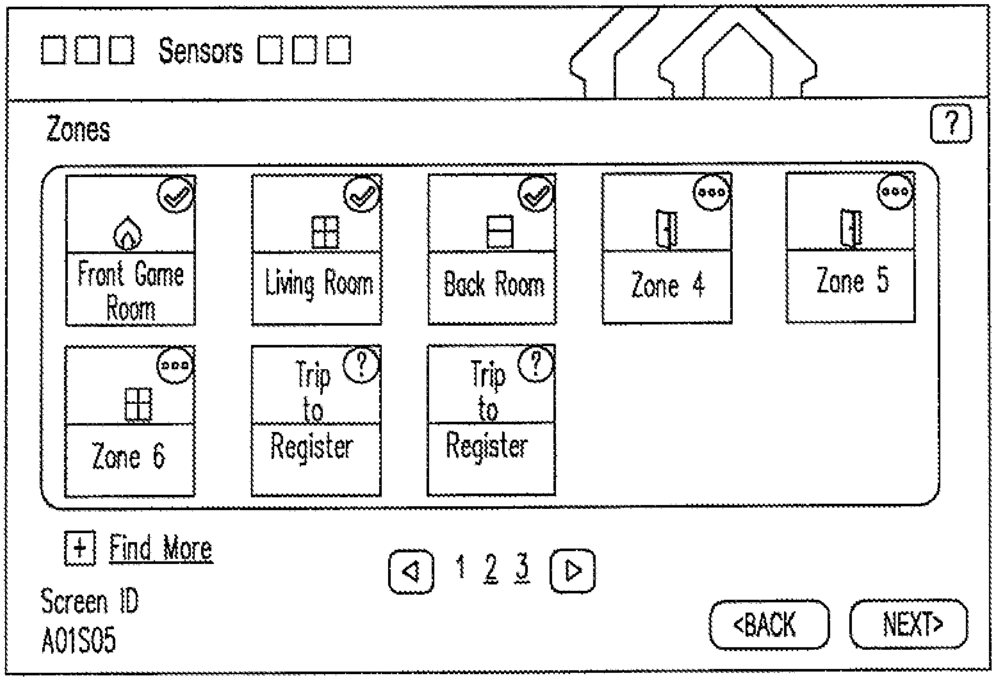

The SMA controller can then search for all sensors that are in discovery mode (920). Additionally, the SMA controller can display a remaining search time indication. A linking message from a sensor can provide information including, for example, a unique identification number for the sensor and sensor type information. An SMA controller touch screen interface can then display zone information associated with each discovered sensor (925). FIG. 13I illustrates an example of a detected zones display that can be provided by the SMA controller. Each sensor can then be paired (e.g., by tripping the sensor) (930). The search and pairing process provides detailed information regarding each sensor to the SMA controller.

Once presented with the information related to all the located sensors, a user can then edit that information to provide specifics as to physical, or zone, location of the sensor within the home domain and other characteristics related to the zone of the sensor. The person performing the activation process can select a sensor zone to edit (935) and then define or edit the information related to that sensor (940). The information related to the sensors and zone can then be stored in a local memory of SMA controller 120 (e.g., memory 260). The SMA controller can also transmit the sensor zone information to be stored in a server in operator domain 160 via the broadband connection.

Figure 13J:
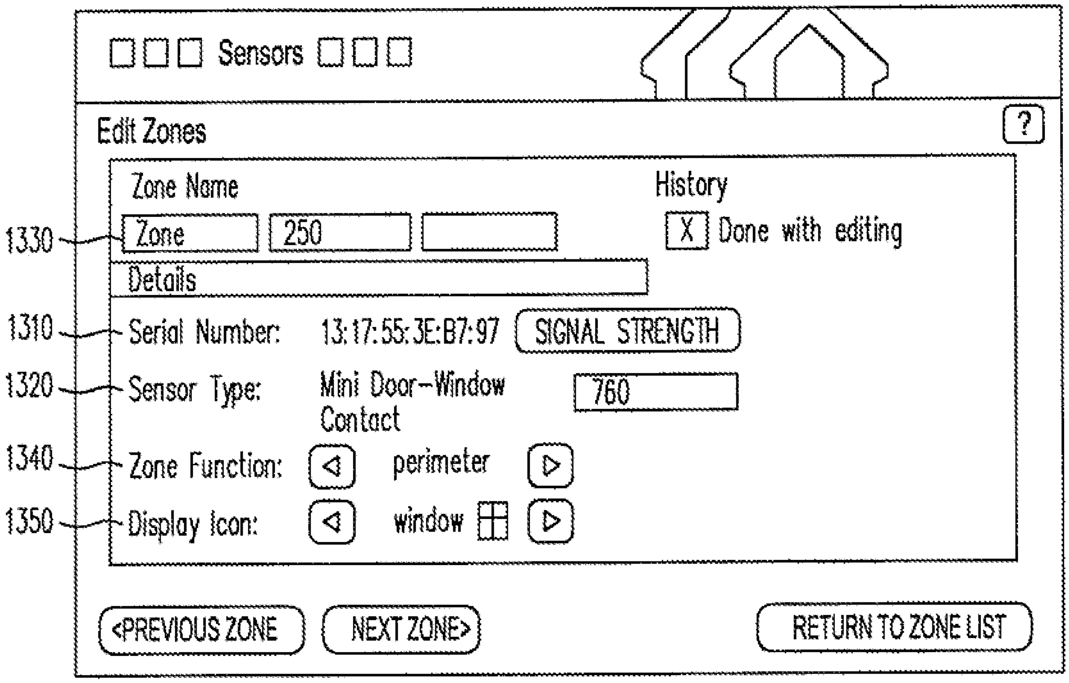

FIG. 13J is an illustration of a display that can be provided by embodiments of the present invention to permit editing of sensor information (e.g., sensor zone information). As illustrated, the display can provide information such as a unique identifier of the sensor (serial number 1310) and sensor type (sensor type 1320). As indicated above, unique identifier and sensor type information is provided by the sensor during the search and location process. Through a display such as that illustrated in FIG. 13J, a user performing the activation can define additional zone characteristics related to the sensor. For example, a user can define or select a zone name 1330 to associate with the sensor. The zone name can be entered, for example, by the user through use of a touch screen-based keyboard or selected from a list of common names displayed on the touch screen.

A zone function 1340 can also be provided to be associated with the sensor. A zone function determines behavior of the zone and is dependent on the zone type. For example, a door/window sensor can function as an entry/exit zone or as a perimeter zone. Each zone type can have one or more configurable zone functions. For example, a motion detector can have a zone function of interior follower, a smoke/heat detector can have a zone function of 24-hour fire monitoring, a glass-break detector can have a zone function of a perimeter zone, and an inertia detector can have an entry/exit zone function or a perimeter zone function.

Selection of a zone function definition can alter how the security system acts and reacts to signals received from a sensor in that zone. The following table illustrates examples of zone functions and their associated action/reaction definitions, according to one embodiment of the present invention.

TABLE 1

| Zone Function | Definition |
|---|---|
| Entry/Exit | Allow exiting the home domain when the system is arming and will begin an entry delay when opened if the system is armed. Zone can be bypassed and can have specific tones assigned for open and close events. |
| Perimeter | Generate an alarm immediately if tripped while the system is armed. Can be bypassed and can have specific tones assigned for open and close events. |
| Interior Follower | Protect the internal spaces of the home domain and trigger an immediate alarm if the system is armed in away mode. Zone is not armed when the system is in armed stay mode. Can be bypassed and can have specific activity/non activity tones assigned. |
| 24-Hour Fire | Generate an immediate fire alarm if triggered. Zone cannot be bypassed. |

TABLE 1-continued

| Zone Function | Definition |
|---|---|
| 24-Hour Monitor | Generate notifications in the home and will beep the keypad but will not sound the full alarm. Can be bypassed. |
| 24-Hour Environmental | Generates notifications, beeps keypads, and sounds the siren to let people within the home domain know to evacuate the premises. Cannot be bypassed. |
| 24-Hour Inform | Will never generate an alarm, even if the system is armed. Upon triggering of the sensor will make the configured sound and send events to the operator domain. Can be bypassed. |

By defining such zones, a user can control how the security functions of SMA controller 120 react to various sensor triggers.

A user can also configure a display icon 1350 associated with the sensor zone. In many cases, the available icons will be limited to one type of icon that graphically relates to the sensor type. But, for example, with a door/window sensor, icons can be made available that illustrate a door or a window as appropriate. FIG. 13J further illustrates a signal strength button 1360 that, when selected, can display strength of the signal between the wireless hub located within SMA controller 120 and the associated sensor. Alternatively, signal strength can be displayed on the display of FIG. 13J.

Sensor zone information, entered through the use of a display such as that illustrated in FIG. 13J, can be stored in local data tables that are stored in memory 260 of SMA controller 120. In addition, sensor zone information can also be transmitted via access domain 150 to servers in operator domain 160 for storage (e.g., database server 185). By storing the sensor zone information in servers in the operator domain, the information is available to a user accessing a portal server 170 (e.g., for monitoring of sensor events). Operator domain storage of configuration information allows remote access to the configuration information (e.g., using a portal server 170). Operator domain storage further allows provisioning a replacement SMA controller should, for example, an original SMA controller become unusable or an SMA controller undergo a factory reset and need reconfiguration.

A user performing an activation/configuration process of the SMA controller can be given an opportunity to edit each discovered sensor zone (945). Once the user has completed the process of editing sensor zones, the user can be provided an opportunity to add a key fob-type device (950). If the user chooses to add the key fob-type device, pairing instructions for key fobs can be displayed (955). Once the key fob-type device is put into a discovery mode, the person performing the activation can instruct the SMA controller to search for the key fob-type device (960). Once the key fob-type device has been found, the user can edit the key fob information in a manner similar to the zone information editing (965). Information such as a person to be associated with a particular key fob and the like can be provided. Once a key fob-type device has been added or addition of a key fob has been bypassed, the activation process can continue to the next stage (970). Again, the information related to the added key fobs can be transmitted by the SMA controller to the operator domain for storage and monitoring.

Figure 10:
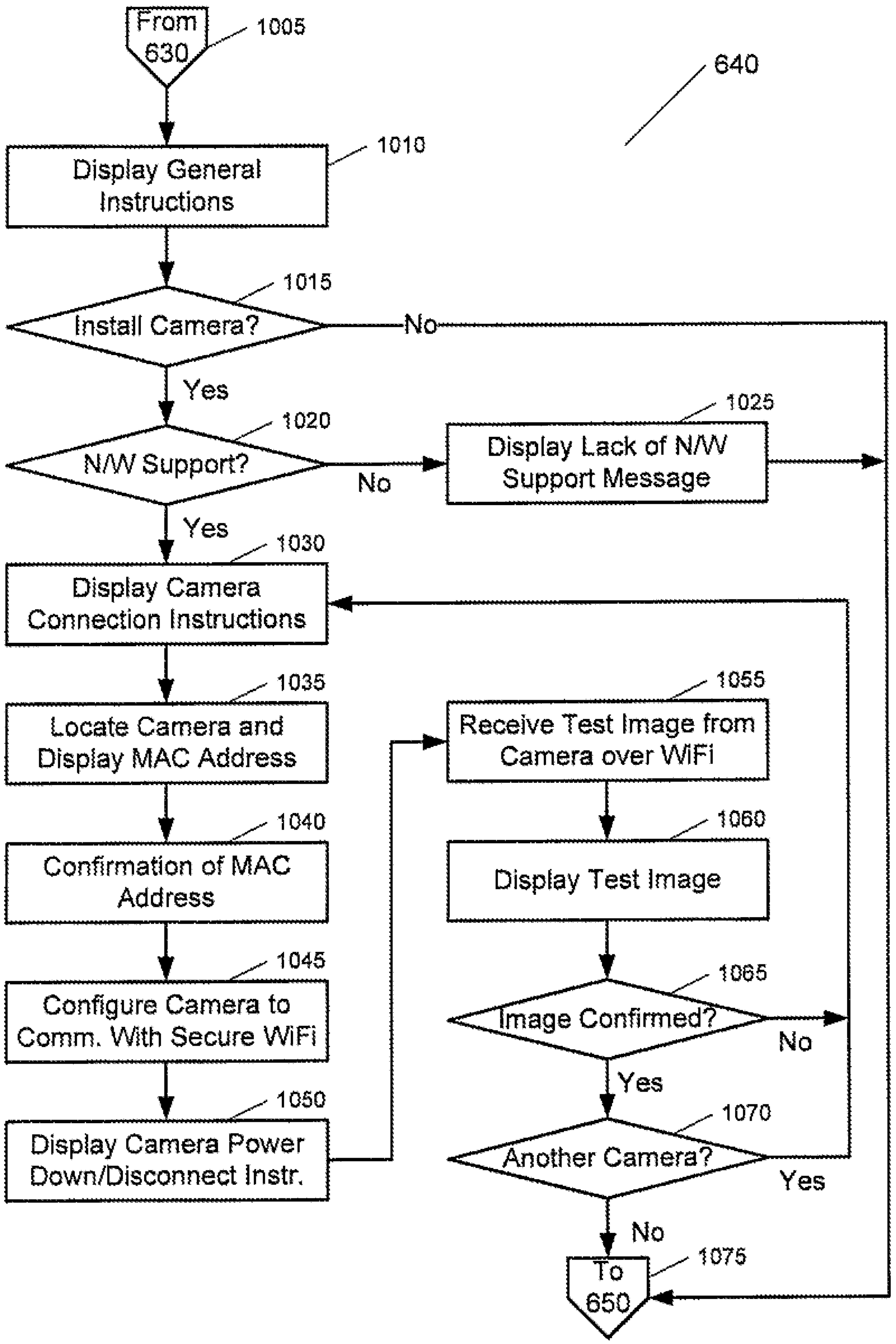
FIG. 10 is a simplified flow diagram illustrating a process for adding cameras or other monitoring devices during the activation process of an SMA controller usable in embodiments of the present invention.

FIG. 10 is a simplified flow diagram illustrating a process for adding cameras or other monitoring devices during the activation process of an SMA controller. FIG. 10 illustrates details related to process step 640 of FIG. 6. Although FIG. 10 and the accompanying description mentions camera-type monitoring devices, it should be understood that other types of monitoring devices that are RF connected to the SMA controller can also be incorporated in the following discussion.

The process illustrated in FIG. 10 can be entered into after performing processes related to step 630 (1005). SMA controller 120 can display, on an associated touch screen display, general instructions related to activation and installation of a camera monitoring device (1010). An opportunity can then be provided for the person performing the activation to indicate whether one or more camera monitoring devices will be installed (1015). If no camera is to be installed, then the process can continue on to the next stage of the activation workflow (1075). If the user indicates that they wish to install a camera, then a determination can be made by the SMA controller as to whether the configured network supports a camera monitoring device (1020). For example, if the configured network does not support WiFi connections but the designated camera monitoring device requires a WiFi network, then a camera monitoring device installation cannot proceed. In such a case, the SMA controller can display a message indicating lack of network support for such a camera monitoring device (1025) and then the process can proceed to the next stage of the activation workflow (1075). Typically, though, the camera monitoring device installation workflow will not be entered if the previously configured network cannot support a camera monitoring device (e.g., a power-line network).

If the person performing the activation wishes to install a camera and the configured network supports such a camera, then the SMA controller can display instructions for preparing the camera monitoring device to be configured to communicate with the secure WiFi network of the SMA controller (1030). For example, an initial configuration of a wireless camera may require an initial hardwired connection to router 125 in order for the SMA controller to provide appropriate instructions for configuration of the camera. Thus, the instructions displayed by the SMA controller may include text and pictures of how to couple the camera monitoring device to the router for this stage of the process.

The SMA controller can also provide the user performing the activation process an opportunity to indicate when the camera monitoring device is coupled to the router or otherwise ready for configuration. The SMA controller can then communicate with the router (e.g., using HNAP) to locate the camera and to receive a MAC address of the camera from the router (1035).

Figure 13K:
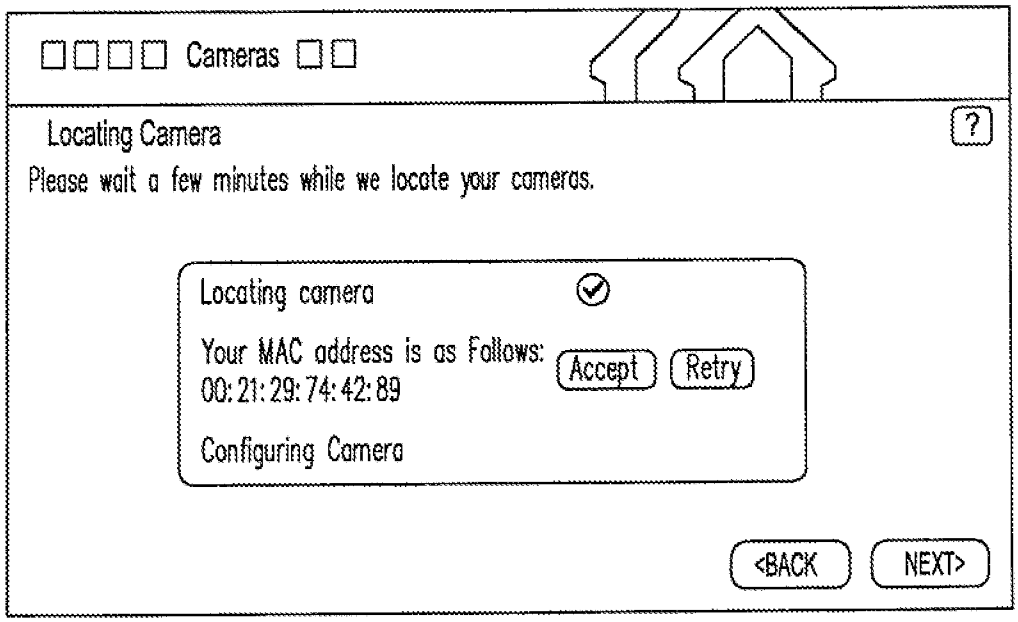

FIG. 13K illustrates a display that can be provided on a touch screen of SMA controller 120 during a process of locating the camera monitoring device and displaying the found MAC address. As illustrated in FIG. 13K, the SMA controller can give the person performing the activation process an opportunity to accept the found MAC address or to perform a retry operation to discover another appropriate MAC address (1040). Once confirmed, the SMA controller can then configure the camera monitoring device to communicate wirelessly with the router using the secure WiFi network and, hence, the SMA controller (1045). The SMA controller can use the display of FIG. 13K to provide positive notification of the process of camera configuration.

Figure 13L:
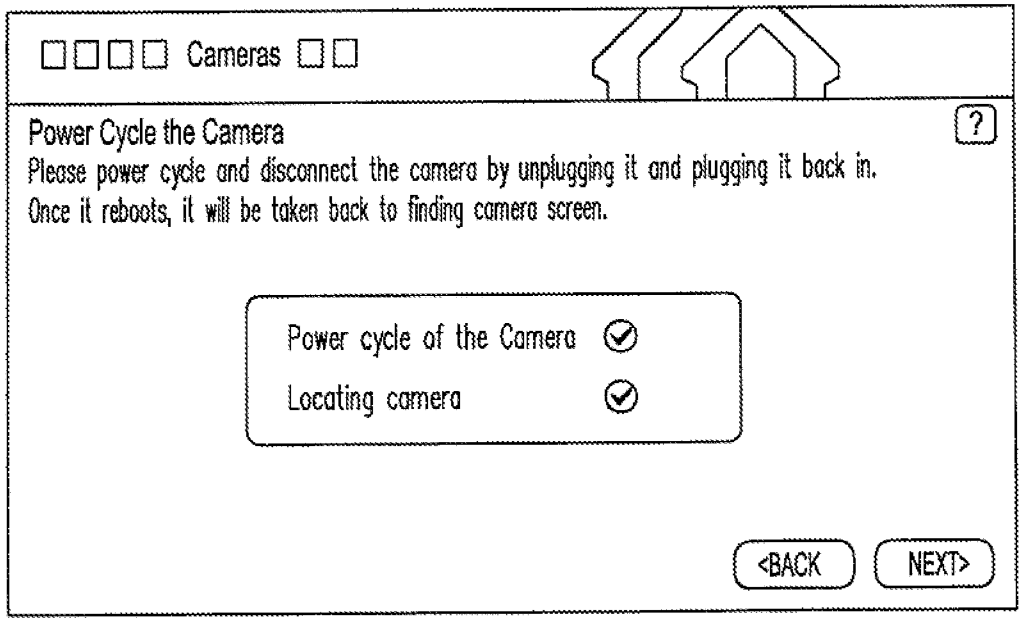

Once the camera configuration process has been performed, the SMA controller can display additional instructions related to re-configuring the camera monitoring device hardware to communicate wirelessly over the secured WiFi (1050). FIG. 13L illustrates an example of a display providing such instructions. In the illustrated example, the person performing the activation process is instructed to cycle power to the camera monitoring device and to disconnect the Ethernet cable connecting the camera with the router. When the camera is powered back up, the camera will then acquire an IP address over the secured WiFi network from router.

During the configuration process, the SMA controller can pass a variety of information to the camera, including, for example, an administrative user name and password, camera name, camera description, time zone, current time, language, user session name and password for list of users allowed to access the camera, network settings such as IP address and name servers, protocol settings, motion detection settings, and desired camera image settings such as resolution and video adjustments. In addition, the camera can provide information to the SMA controller for storage, such as, for example, device type, manufacturer, model number, and other control information. All of this information can be passed between the SMA controller and the camera monitoring device without user interaction beyond the initial configuration of the camera hardware.

Once the SMA controller and camera are configured to communicate with one another, then images generated by the camera can be displayed on a display device associated with the SMA controller. The process flow illustrated in FIG. 10 provides for a test image to be received from the camera over the secure WiFi network (1055) and displayed on the display device coupled to the SMA controller (1060). The SMA controller can then give the user performing the activation process an opportunity to confirm receipt of the image (1065), and if no image has appeared can return the process flow back to the initial configuration instructions for the camera monitoring device (1030). If the image is successfully received and confirmed, then an opportunity can be given for configuration of a subsequent camera monitoring device (1070). The SMA controller can also transmit the monitoring device configuration information to a server in operator domain 160 for storage, as with the sensor zone configuration information. Should the user opt to not configure a subsequent camera monitoring device then the process flow can continue to the next stage of the activation workflow (1075).

Figure 11:
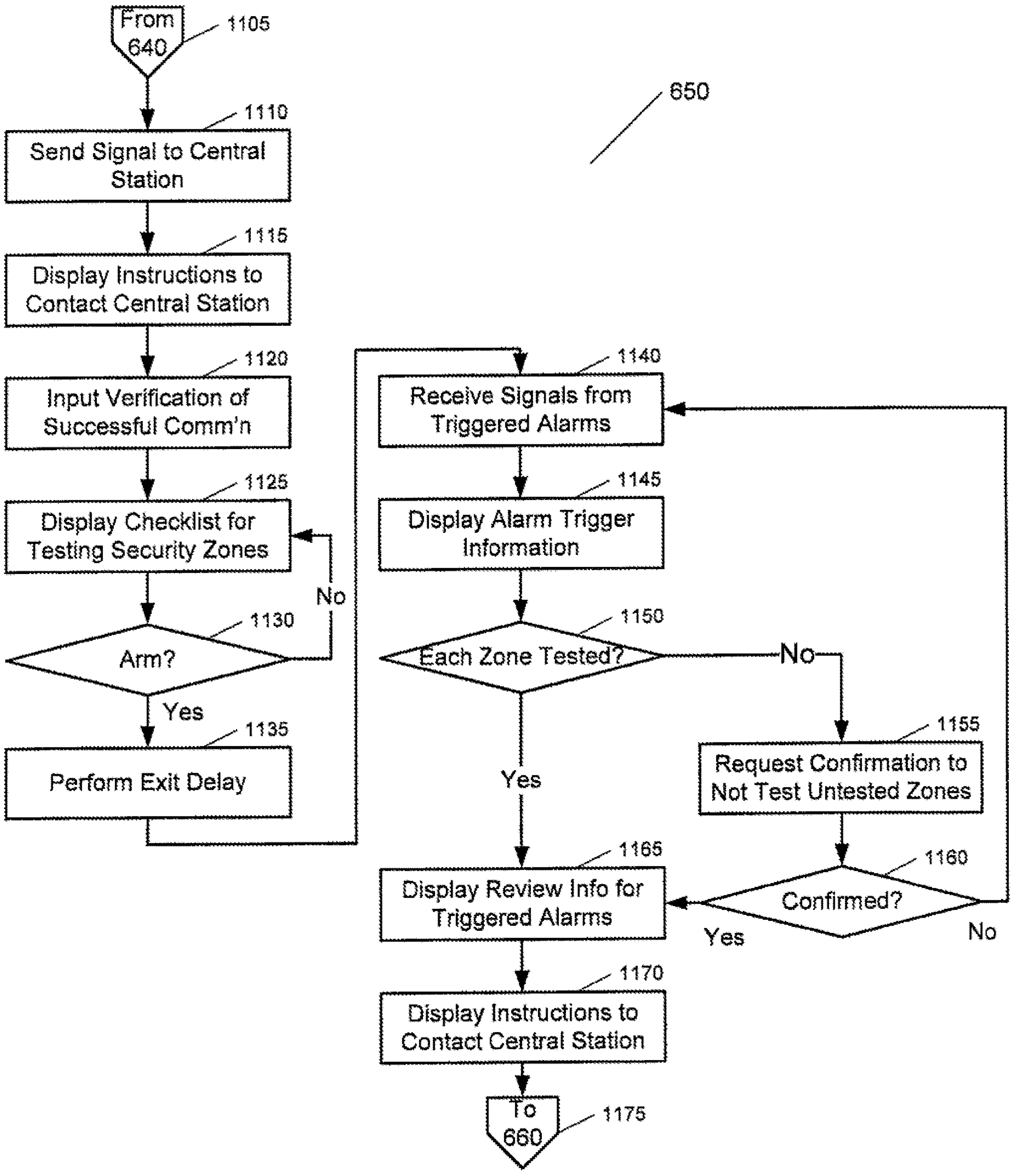
FIG. 11 is a simplified flow diagram illustrating an example process flow for alarm path communication testing usable in embodiments of the present invention.

FIG. 11 is a simplified flow diagram illustrating an example process flow for alarm path communication testing 650. As discussed above, the process for FIG. 11 is performed subsequent to configuration of the SMA controller network and various alarm sensors. The process illustrated in FIG. 11 can be used to confirm the communication path between SMA controller 120 and central station 190. Both a general communication with the central station can be tested as well as receipt and interpretation of events associated with specific sensors coupled to the SMA controller.

Figure 13M:
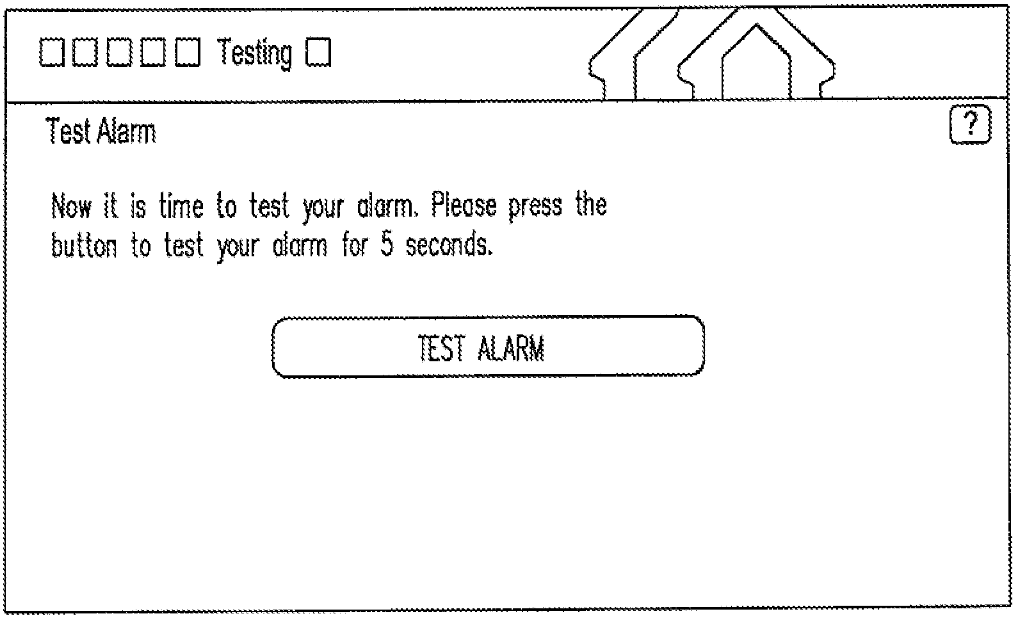
Figure 13N:
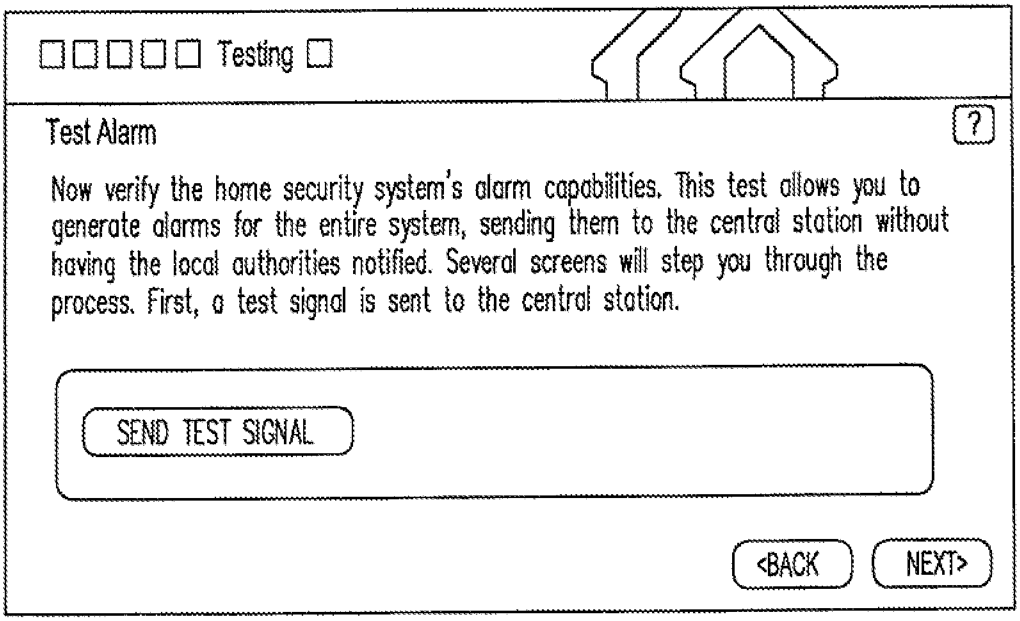

As illustrated in FIG. 11, the process for alarm path communication testing can be entered subsequent to configuration of the network (1105). To confirm the presence of a communication path with an appropriate central monitoring station, the SMA controller can send a signal to the central station (1110). FIG. 13M illustrates an example of a test alarm display that can be displayed on a touch screen associated with SMA controller 120 to begin the alarm test process. As illustrated, a test button is displayed that should be pressed to begin the alarm test sequence. FIG. 13N illustrates an example display that can be used to prompt a user performing the activation to send the test signal. A central station will receive a message (e.g., a "Contact ID 601—Manual Trigger Test Report") and the user will not be given an opportunity to get past this screen until an acknowledgement message is received from an alarm server in operator domain 160 (e.g., server 165).

Once the acknowledgement is received, the SMA controller can display instructions to the user performing the activation process to contact the appropriate central station to confirm the alarm transmission (1115). Such instructions can include, for example, a phone number for the central station that can be provided by a server in the operator domain upon the initial account setup process 620. The SMA controller can give the user performing the activation process an opportunity to input a verification of a successful communication with the central station (1120). In an alternative embodiment, the SMA controller can be configured to receive an automated confirmation of communication to central station 190 from the central station or from an operator domain server 165. The SMA controller can then display information regarding the automated confirmation on a coupled display to the user performing the activation process.

Figure 13O:
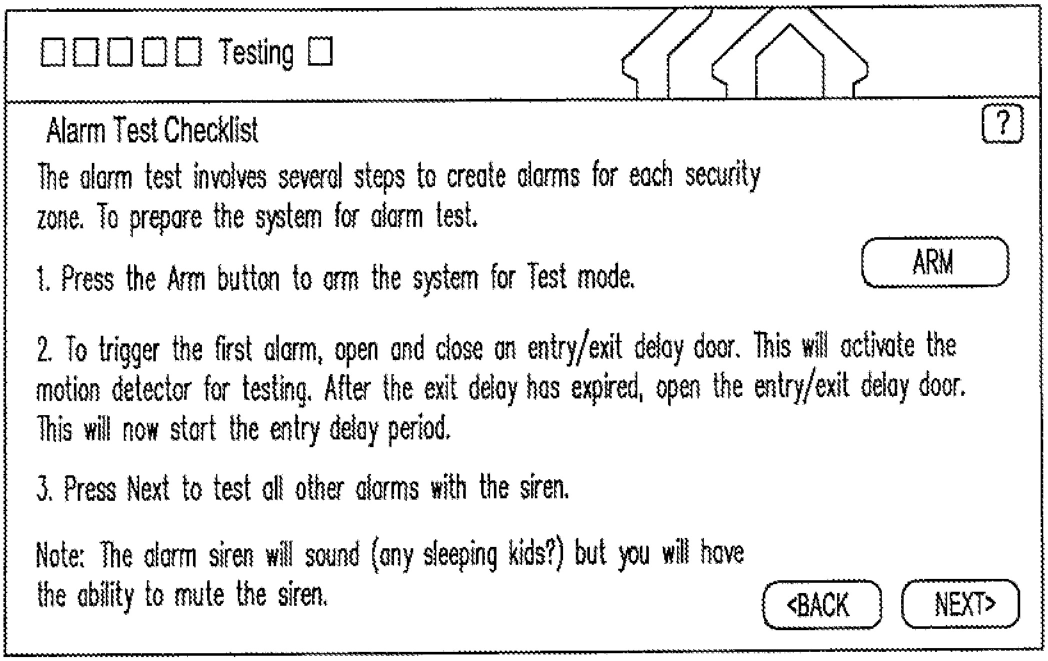

Once the communication path with the central station has been confirmed, the SMA controller can display a check list for testing each configured zone of the system (1125). FIG. 13O illustrates an example of such an alarm test check list that can be displayed in accord with embodiments of the present invention. As illustrated, the check list provides the user an opportunity to arm the system for test mode (1130). Once armed, the SMA controller performs an exit delay sequence (1135) during which, if a sensor is tripped, no alarm will be sent to the central station if the alarm is reset from a tripped state. The check list then provides for the user performing the activation process to trigger an alarm sensor, which will then transmit an alarm signal to the SMA controller (1140).

Figure 13P:
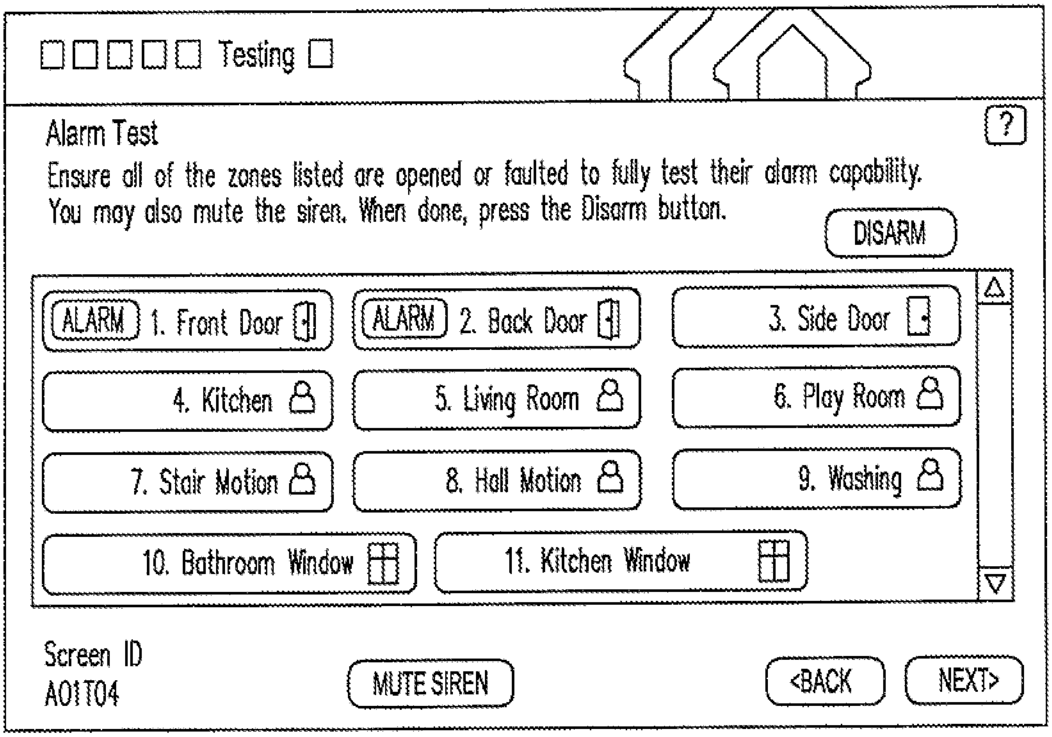

When the alarm sensor is triggered, the SMA controller can display information related to the alarm trigger (1145). FIG. 13P illustrates an example of an alarm test display that can be provided by embodiments of the present invention. Each triggered zone is illustrated in the alarm test zone display. When the user has triggered all desired alarms, the user can input to go to the next step. The SMA controller can then determine whether each configured zone has been tested (1150), and, if not, the SMA controller can request confirmation from the user to not test the untested zones (1155). In the event that the user wishes to test additional zones, the SMA controller can provide an opportunity to trigger additional alarms (1140).

Figure 13Q:
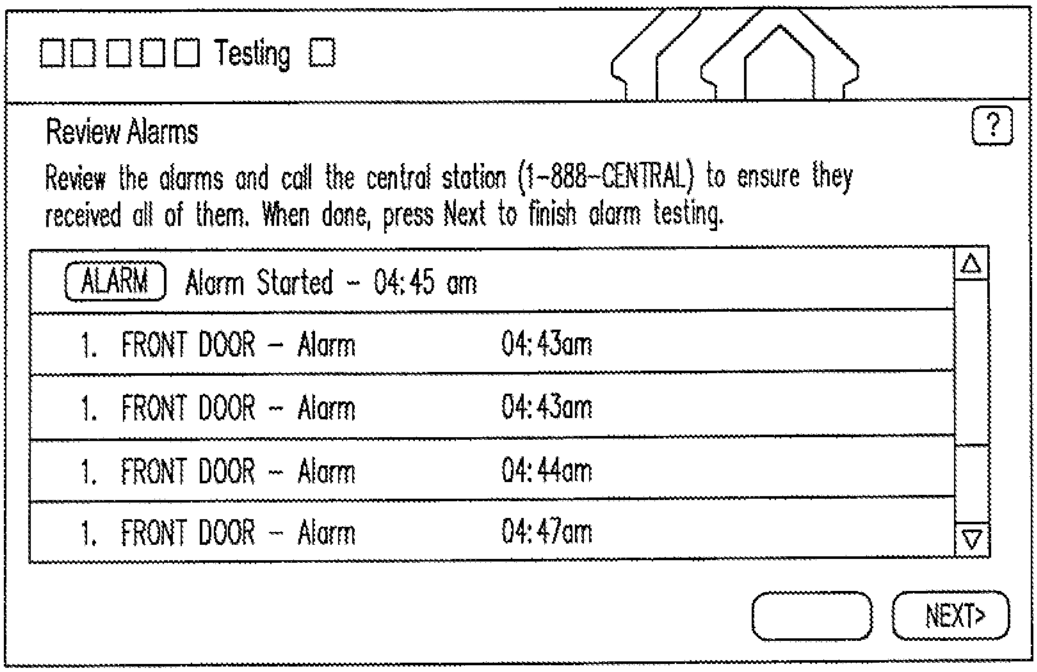

If each zone has been tested or each desired zone has been tested, then the SMA controller can display review information for the various triggered alarms (1165). FIG. 13Q illustrates an example of a review alarms display that can be provided by SMA controller in accord with embodiments of the present invention. In addition, instructions to contact the central station to confirm the various alarm information has been received can also be displayed (1170). The user performing the activation process can go through the alarm review list with the central station representative to confirm proper receipt of all alarm information. Once this alarm review process has been completed, the process can continue on to the next stage of the configuration workflow (1175).

In an alternative embodiment, the SMA controller can be configured to receive an automated confirmation of communication of alarm information to central station 190 from the central station or from an operator domain server 165. The SMA controller can then display information regarding the automated confirmation on a coupled display to the user performing the activation process. Such an automated process of alarm information confirmation decreases the time that is needed to perform an installation and testing of the SMA controller setup.

Figure 12:
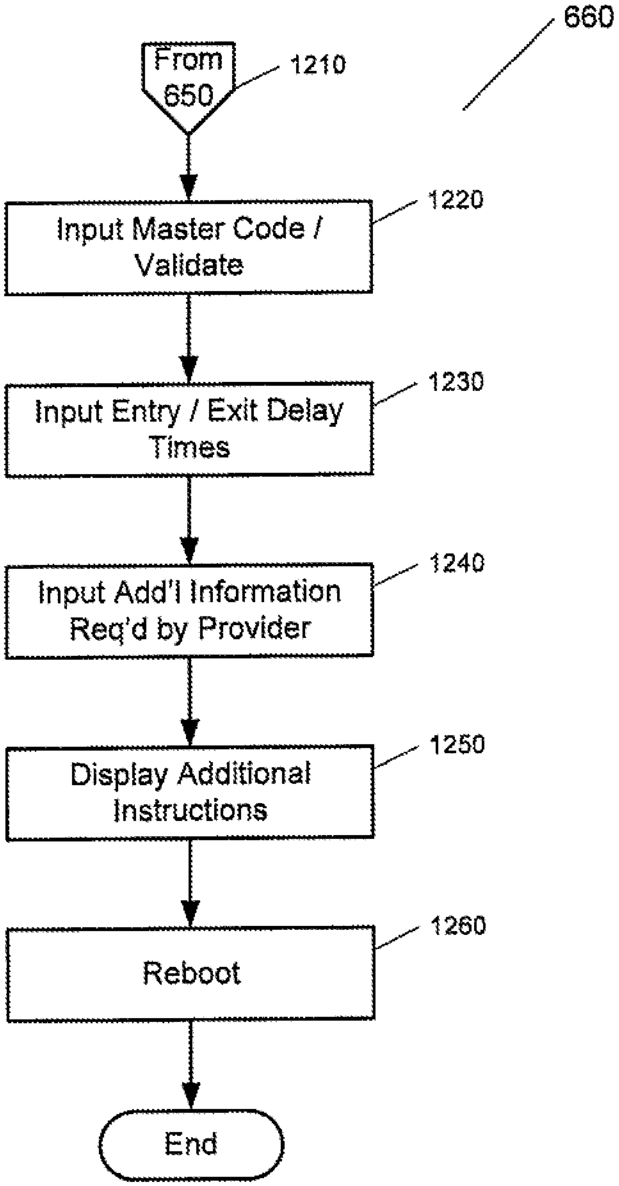
FIG. 12 is a simplified flow diagram illustrating a process for post activation workflow usable in embodiments of the present invention.

FIG. 12 is a simplified flow diagram illustrating a process for post activation workflow 660. The process illustrated in FIG. 12 provides for configuration steps not performed under any other section of the general workflow to be performed, as well as steps to complete securing the SMA controller.

Figure 13R:
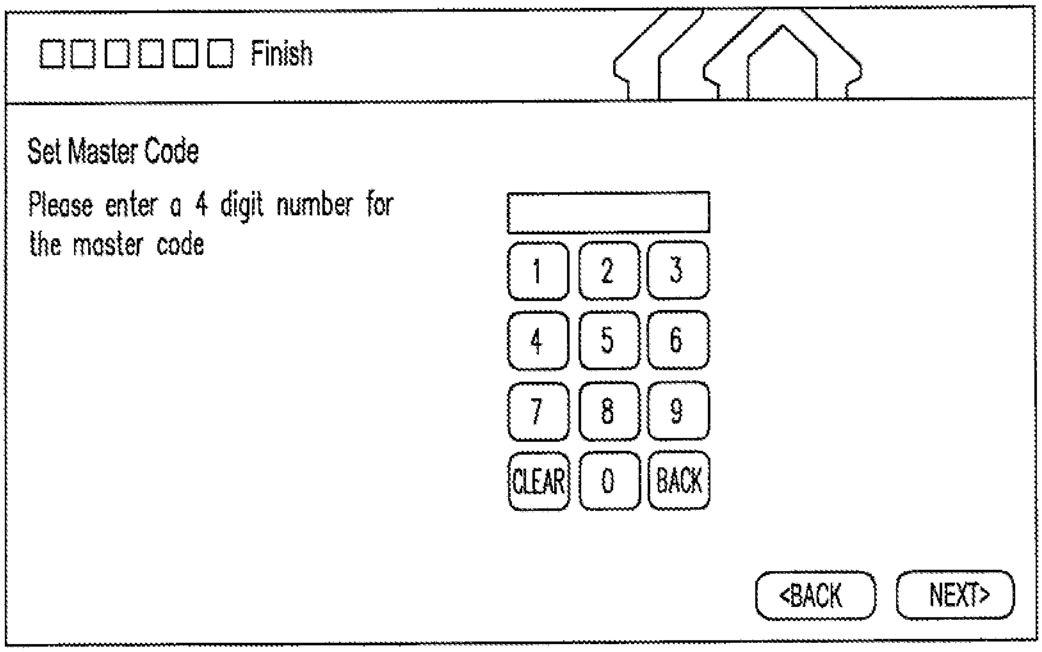

The workflow of FIG. 12, as illustrated, is entered after completion of the alarm path communication testing sequence 650 (1210). The user performing the activation process can be given an opportunity to enter a master code for SMA controller 120 (1220). FIG. 13R illustrates an example display that can be provided by the SMA controller for setting the master code. As illustrated, a keypad can be provided on the touch screen display and a four-digit number can be entered by the user. The SMA controller then stores the master code for subsequent use. Additionally, the user can be given an opportunity to input alarm event entry and exit delay times (1230). As discussed above, such entry and exit delay time relate to how long the SMA controller will wait after an alarm sensor has been triggered to send an alarm event to a central station and to sound a siren within home domain 110. Default values for entry and exit delay can be displayed and adjustment buttons can be provided by which the user can adjust those delay times to their preference. The entry and exit delays can then be stored on the SMA controller for use during operation.

In an alternate embodiment, steps 1210-1230 can be avoided during the installation procedure by assigning default values for the master code, delay times, and the like. The end user can then at a later time set those values through use of interfaces provided on a display coupled to the SMA controller. Use of default values can reduce the amount of time needed for the install of the SMA controller in the home domain.

The SMA controller can then be configured to provide for any additional information that a provider of operator domain 160 wishes to acquire from a subscribing user (1240). A provider of SMA services can modify these process flow steps as desired or necessitated. Any additional instructions that are desired to be provided to the user performing the activation process can be provided on the display associated with the SMA controller (1250) and then the system can be rebooted to activate the SMA controller in accord with all the settings that have been provided during the activation workflow (1260).

The software architecture that provides for the above-described activation/provisioning workflow is customizable to the demands of a provider of the SMA services. Embodiments of the firmware architecture that provides the activation/provisioning workflow can be implemented, for example, using XML-type control files that define each step of the workflow and the display that accompanies that step of the workflow.

Figure 14:
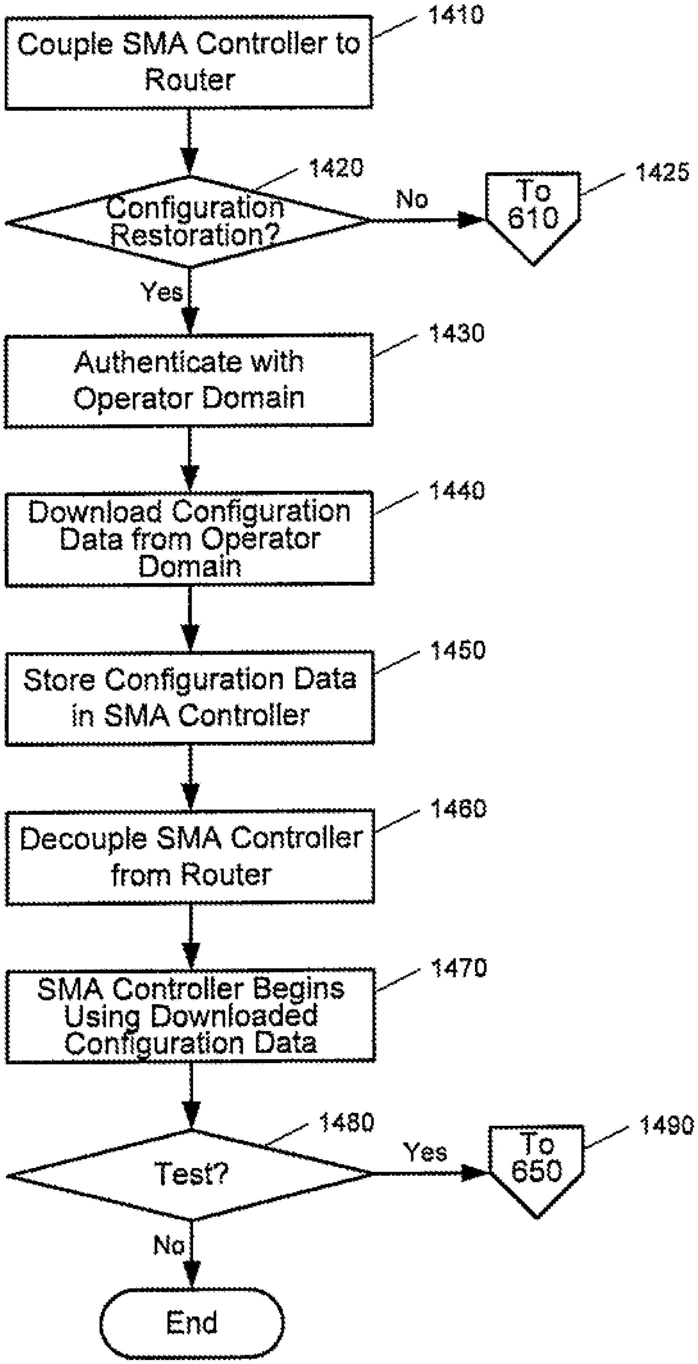
FIG. 14 is a simplified flow diagram illustrating an example of a configuration data restoration workflow for configuring an SMA controller using configuration data previously stored on a remote server, in accord with embodiments of the present invention.

FIG. 14 is a simplified flow diagram illustrating an example of a configuration data restoration workflow for configuring an SMA controller using configuration data previously stored on a remote server (e.g., database server 185 in operator domain 160), in accord with embodiments of the present invention. The workflow in FIG. 14 is an alternative to the activation/provisioning workflow discussed above, allowing for quick restoration of all settings of an SMA controller in the event of, for example, an SMA controller replacement or factory reset. As discussed above, as an SMA controller proceeds with the activation/provisioning workflow steps described above, configuration data is stored both locally (e.g., in memory 260) and transmitted for storage in the operator domain (e.g., in a database server 185). The remotely-stored configuration data can also be updated each time a configuration setting on the SMA controller is changed during normal use (e.g., a change to a pass code or additions of sensors). If an SMA controller requires stored configuration data, then the stored configuration data can be downloaded to the home domain. SMA controller to restore the SMA controller to the same configuration without the need for a complete reiteration of the activation/provisioning workflow.

When an unconfigured SMA controller is intended to execute the configuration data restoration workflow, the SMA controller will be introduced into a home domain 110 that has previously been configured per FIG. 7, or the like. But since the unconfigured SMA controller does not have the wireless network information used to configure the secured private network, the SMA controller cannot immediately communicate with that network. Thus, the SMA controller can be coupled directly to the router using a tethered link so that the router can communicate over access domain 150 (1410). Alternatively, the SMA controller can communicate with the router using an unsecured WiFi or power-line network connection.

Once the SMA controller is in communication with router 125, the SMA controller can provide a query to a user of the SMA controller as to whether the present installation is a full installation or a restoration installation (e.g., an RMA installation) (1420). If the selection is for a full installation, then the process continues to a network setup workflow 610 (1425), discussed above. If the selection is for a restoration installation, then the system prompts for the user to provide one or more of a subscriber identifier and an alternative unique identifier (e.g., an RMA authorization code) to authenticate the SMA controller to a server in operator domain 160 (1430).

Once authentication of the SMA controller has occurred, a download is performed of SMA controller configuration data previously stored by a server in the operator domain (1440). The SMA controller can request a download of the previously stored configuration data from the operator domain server, or the operator domain server can automatically perform download operations to the SMA controller once the subscriber identifier is authenticated. The server in the operator domain can search for previously stored configuration data that is associated with the subscriber identifier/unique identifier. All the corresponding previously-stored configuration data is downloaded to the SMA controller and stored in the SMA controller memory in the same manner (e.g., formats and locations) as if it were entered on the SMA controller input device (1450). This previously stored configuration data includes not only information about security sensors and zone configurations, but also network configuration information (e.g., information about the previously configured private network), monitoring and home automation devices, as well as widget programs and their configurations.

Once all configuration data has been downloaded and stored on the SMA controller, the SMA controller can be decoupled from the router (if a tethered connection was used for communication between the router and the SMA controller and will not be used for operational communications) (1460) and begin operations using the downloaded configuration data (1470). The router can automatically reconfigure itself to use the downloaded configuration data or may need to be restarted to use the downloaded configuration data. Once the SMA controller is operating using the downloaded configuration data, the person performing the install can be given the option of testing the device communication path (e.g., FIGS. 11 and 12) (1480). If the decision is to perform testing, then the activation/provisioning workflow can proceed to testing 650 (1490). If the decision is to not perform testing, then the activation/provisioning workflow can end.

The restoration installation workflow of FIG. 14 is one example of steps that can be conducted to enable restoration of configuration data. As discussed above, a provider may require different information from a person conducting the install in order to perform a restoration installation. For example, the provider can require a pass code in addition to the subscriber identification information. The provider may not require the phone number and time zone information for a restoration installation.

In another alternative embodiment, the SMA controller can be introduced to the home domain by resetting the router to factory defaults, rather than maintaining the previously configured settings. The SMA controller can then be coupled to the router using WiFi or tethered connection, as with the original installation detailed above. Once the configuration data has been provided to the SMA controller from the remote server, the SMA controller can use the data to automatically reconfigure the router to provision the secure network to the secured network's original configuration (i.e., corresponding to the network settings saved by the previous SMA controller in the home domain). In addition, the information needed for WiFi or other Ethernet-enabled monitoring devices to exchange data with the SMA controller is also provided when the router is reconfigured.

The result of a restoration installation is an install that bypasses the steps involved in an initial installation and results in an SMA controller that is provisioned in the same manner as a previous SMA controller, including network information, sensor and zone information, automation device information, monitoring device information, and widget program configuration.

With the exception of the restoration installation, the activation/provisioning workflow described above is designed to be performed entirely using SMA controller 120 without the use of any external computing resources or input device beyond a touch screen display associated with the SMA controller and any updates provided by a remote server. Displayed instructions and input screens are incorporated with the software (e.g., firmware) of the SMA controller such that a non-technical end-user or an installation technician without specialized training can perform an install of the SMA controller, along with the associated security sensors, camera monitoring devices, and network routing devices. In addition, since much of the network configuration is performed automatically by the SMA controller, the amount of typing of addresses and other information, and hence the opportunity for errors in such typing, is dramatically reduced. Since the installation process is performed using only a display coupled to the SMA controller, the need for additional equipment, such as a computer to perform the installation, is eliminated, and thereby the cost of performing installations is also reduced. Further, the streamlined process for performing the installation, coupled with the elimination of lengthy typing of addresses and the like, results in a faster installation process with less frustration than is found for typical systems. Thus, if a technician is performing such an installation, the cost for each installation is reduced due to the reduction in the need for installation technician time. Persons of ordinary skill in the art will understand that all of these factors provide advantages to systems embodying the present invention over traditional systems that require additional equipment to perform installations and specialized technician training, thereby increasing the costs for performing such installations.

An Example Computing and Network Environment

As shown above, the present invention can be implemented using a variety of computer systems and networks. An example of one such computing and network environment is described below with reference to FIGS. 15 and 16.

Figure 15:
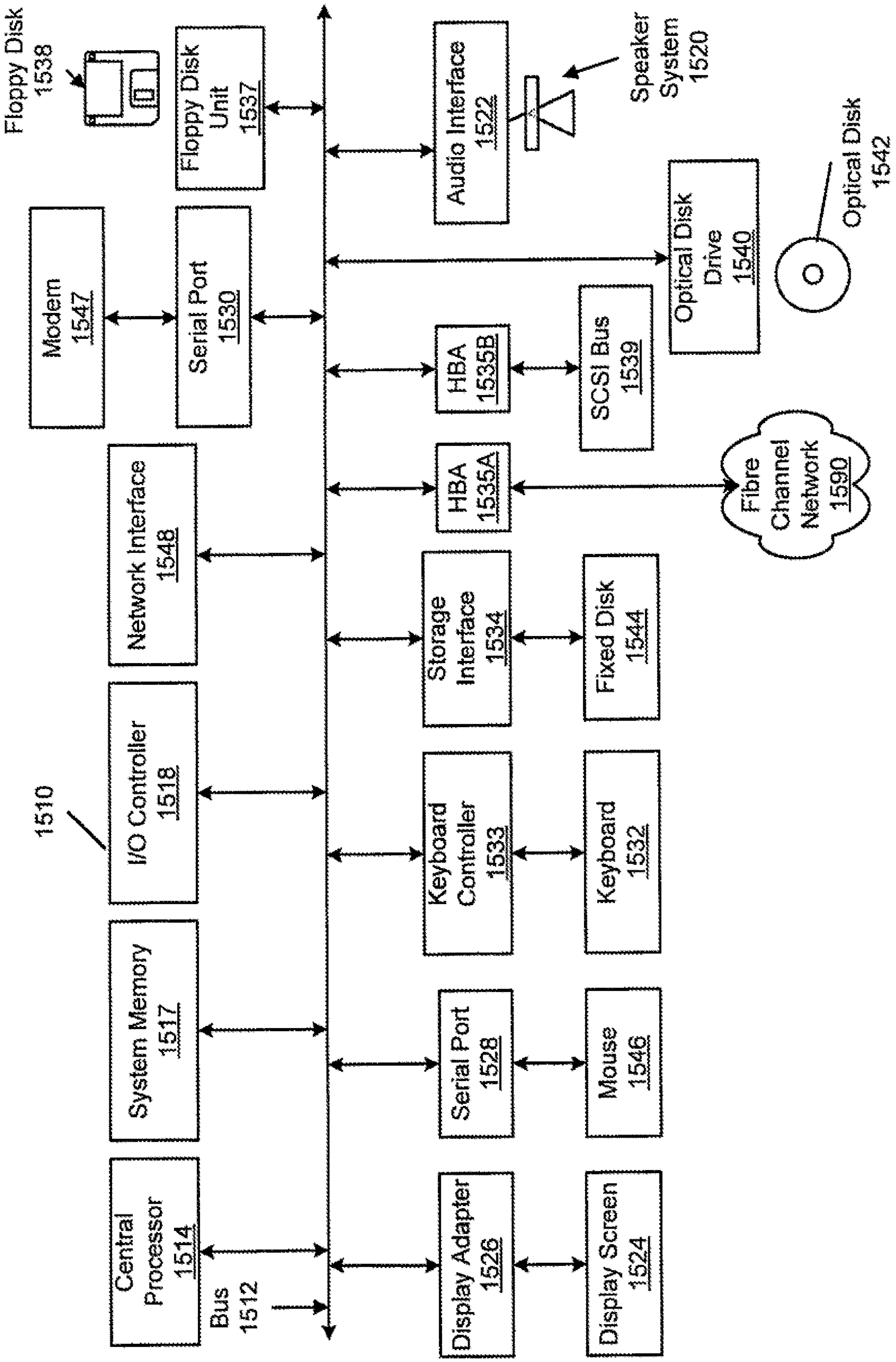
FIG. 15 illustrates a block diagram of a computer system suitable for implementing aspects of the present invention.

FIG. 15 depicts a block diagram of a computer system 1510 suitable for implementing aspects of the present invention (e.g., servers 165, portal server 170, backup server 175, telephony server 180, and database server 185). Computer system 1510 includes a bus 1512 which interconnects major subsystems of computer system 1510, such as a central processor 1514, a system memory 1517 (typically RAM, but which may also include ROM, flash RAM, or the like), an input/output controller 1518, an external audio device, such as a speaker system 1520 via an audio output interface 1522, an external device, such as a display screen 1524 via display adapter 1526, serial ports 1528 and 1530, a keyboard 1532 (interfaced with a keyboard controller 1533), a storage interface 1534, a floppy disk drive 1537 operative to receive a floppy disk 1538, a host bus adapter (HBA) interface card 1535A operative to connect with a Fibre Channel network 1590, a host bus adapter (HBA) interface card 1535B operative to connect to a SCSI bus 1539, and an optical disk drive 1540 operative to receive an optical disk 1542. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows data communication between central processor 1514 and system memory 1517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1510 are generally stored on and accessed via a computer-readable medium, such as a hard disk drive (e.g., fixed disk 1044), an optical drive (e.g., optical drive 1540), a floppy disk unit 1537, or other storage medium. Additionally, applications can be in the form of electronic signals modulated in accordance with the application and data communication technology when accessed via network modem 1547 or interface 1548.

Storage interface 1534, as with the other storage interfaces of computer system 1510, can connect to a standard computer-readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 15 need not be present to practice the present invention. The devices and subsystems can be interconnected in different ways from that shown in FIG. 15. The operation of a computer system such as that shown in FIG. 15 is readily known in the art and is not discussed in detail in this application. Code to implement the present invention can be stored in computer-readable storage media such as one or more of system memory 1517, fixed disk 1544, optical disk 1542, or floppy disk 1538. The operating system provided on computer system 1510 may be MS-DOS®, MS-WINDOWS®, OS/2®, UNIX®, Linux, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 16:
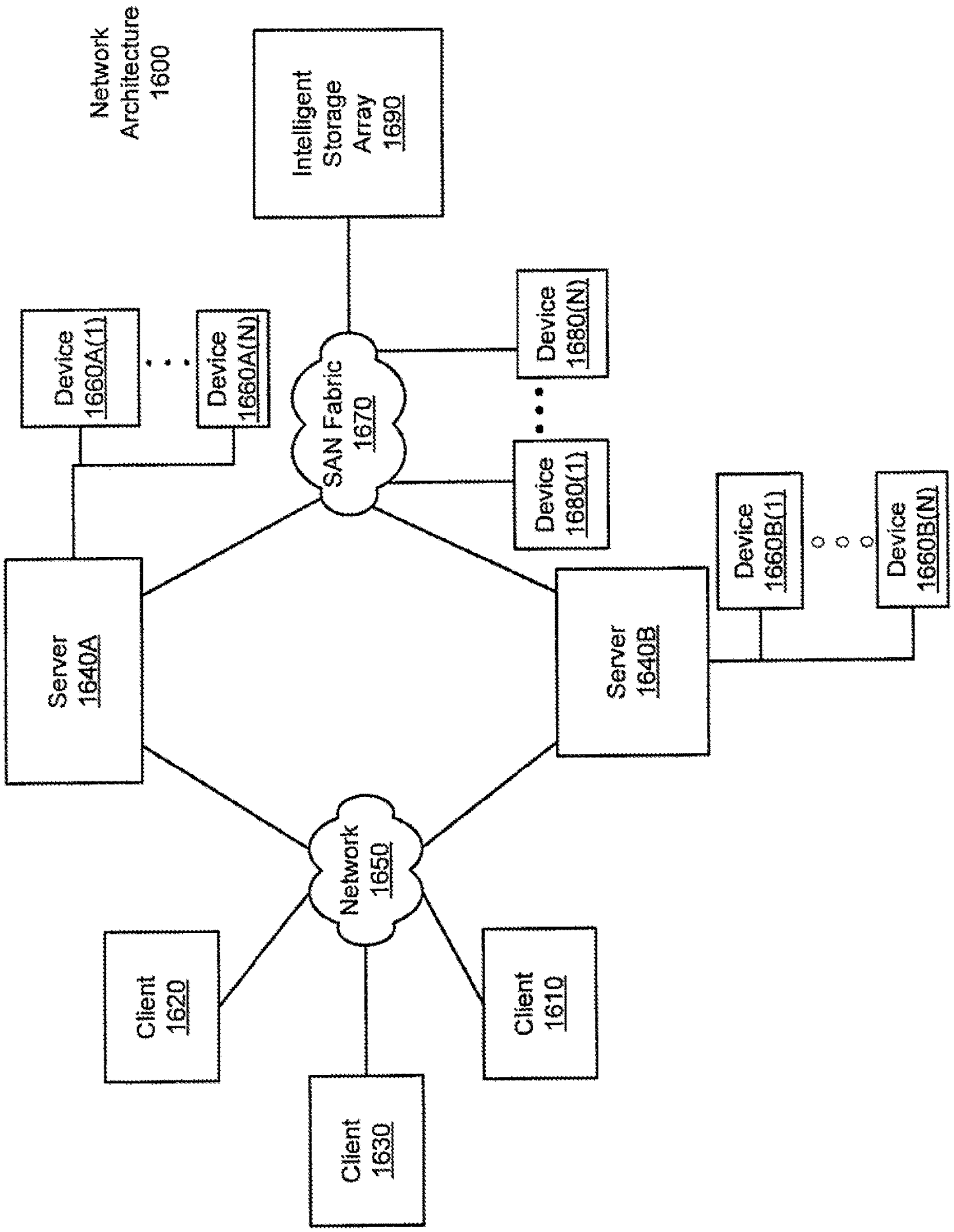
FIG. 16 illustrates a simplified block diagram of a network environment suitable for implementing aspects of the present invention.

FIG. 16 is a block diagram depicting a network architecture 1600 in which client systems 1610, 1620 and 1630, as well as storage servers 1640A and 1640B (any of which can be implemented using computer system 1610), are coupled to a network 1650. Storage server 1640A is further depicted as having storage devices 1660A(1)-(N) directly attached, and storage server 1640B is depicted with storage devices 1660B(1)-(N) directly attached. Storage servers 1640A and 1640B are also connected to a SAN fabric 1670, although connection to a storage area network is not required for operation of the invention. SAN fabric 1670 supports access to storage devices 1680(1)-(N) by storage servers 1640A and 1640B, and so by client systems 1610, 1620 and 1630 via network 1650. Intelligent storage array 1690 is also shown as an example of a specific storage device accessible via SAN fabric 1670.

With reference to computer system 1510, modem 1547, network interface 1548 or some other method can be used to provide connectivity from each of client computer systems 1610, 1620 and 1630 to network 1650. Client systems 1610, 1620 and 1630 are able to access information on storage server 1640A or 1640B using, for example, a web browser or other client software (not shown). Such a client allows client systems 1610, 1620 and 1630 to access data hosted by storage server 1640A or 1640B or one of storage devices 1660A(1)-(N), 1660B(1)-(N), 1680(1)-(N) or intelligent storage array 1690. FIG. 16 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

The invention claimed is:

1. A method comprising:
- receiving, via a computing device located at a premises, an indication of a quantity of premises devices;
- determining, based on the quantity of premises devices, a period of time;
- causing, based on the period of time, activation of a search mode, wherein the computing device is configured to search, in the search mode, for one or more premises devices located at the premises; and
- storing, to a memory, an indication of the one or more premises devices located at the premises.

2. The method of claim 1, further comprising:
- receiving, from each of the one or more premises device, discovery information for the respective premises device.

3. The method of claim 2, wherein the discovery information comprises identification information for the respective premises device, sensor type information for the respective premises device, or both.

4. The method of claim 1, wherein the one or more premises devices are in a discovery mode capable of being discovered during the search mode.

5. The method of claim 1, further comprising:
- determining zone information for each of the one or more premises devices based on the searching.

6. The method of claim 1, further comprising:
- receiving, by the computing device and from at least one premises device of the one or more premises devices, an activation signal; and
- pairing, by the computing device and based on the activation signal, with the at least one premises device.

7. The method of claim 1, wherein the computing device comprises a gateway device.

8. An apparatus comprising:
- one or more processors; and
- memory storing instructions that, when executed by the one or more processors, cause the apparatus to:
  - receive, via the apparatus located at a premises, an indication of a quantity of premises devices;
  - determine, based on the quantity of premises devices, a period of time;
  - cause, based on the period of time, activation of a search mode, wherein the apparatus is configured to search, in the search mode, for one or more premises devices located at the premises; and
  - store, to another memory, an indication of the one or more premises devices located at the premises.

9. The apparatus of claim 8, wherein the instructions, when executed, further cause the apparatus to:
- receive, from each of the one or more premises device, discovery information for the respective premises device.

10. The apparatus of claim 9, wherein the discovery information comprises identification information for the respective premises device, sensor type information for the respective premises device, or both.

11. The apparatus of claim 8, wherein the one or more premises devices are in a discovery mode capable of being discovered during the search mode.

12. The apparatus of claim 8, wherein the instructions, when executed, further cause the apparatus to:
- determine zone information for each of the one or more premises devices based on the searching.

13. The apparatus of claim 8, wherein the instructions, when executed, further cause the apparatus to:
- receive, from at least one premises device of the one or more premises devices, an activation signal; and
- pair, based on the activation signal, with the at least one premises device.

14. The apparatus of claim 8, wherein the apparatus comprises a gateway device.

15. A system, comprising:
- one or more premises devices located at a premises; and
- a computing device located at the premises, the computing device configured to:
  - receive an indication of a quantity of premises devices;
  - determine, based on the quantity of premises devices, a period of time;
  - cause, based on the period of time, activation of a search mode, wherein the computing device is configured to search, in the search mode, for the one or more premises devices located at the premises; and
  - store, to memory, an indication of the one or more premises devices located at the premises.

16. The system of claim 15, wherein the computing device is further configured to:
- receive, from each of the one or more premises device, discovery information for the respective premises device.

17. The system of claim 16, wherein the discovery information comprises identification information for the respective premises device, sensor type information for the respective premises device, or both.

18. The system of claim 15, wherein the one or more premises devices are in a discovery mode capable of being discovered during the search mode.

19. The system of claim 15, wherein the computing device is further configured to:
- determine zone information for each of the one or more premises devices based on the searching.

20. The system of claim 15, wherein computing device is further configured to:
- receive, from at least one premises device of the one or more premises devices, an activation signal; and pair, based on the activation signal, with the at least one premises device.

* * * * *